US012638921B2

(12) United States Patent
Valverde et al.

(10) Patent No.: US 12,638,921 B2
(45) Date of Patent: May 26, 2026

(54) HAPTICS AND SENSING SYSTEMS FOR AN INPUT DEVICE

(71) Applicant: Logitech Europe S.A., Lausanne (CH)

(72) Inventors: Nuno Miguel Pereira dos Anjos Valverde, Bandon (IE); Florent Berney, Echallens (CH); James O'Connor, Cork (IE); Cyril Yves Anthony Drezet, Dommartin (CH); Vasco Eugenio Michele Foletti, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 206 days.

(21) Appl. No.: 18/479,056

(22) Filed: Sep. 30, 2023

(65) Prior Publication Data

US 2025/0068244 A1      Feb. 27, 2025

Related U.S. Application Data

(60) Provisional application No. 63/578,121, filed on Aug. 22, 2023.

(51) Int. Cl.
*G06F 3/01* (2006.01)
*G06F 3/0354* (2013.01)

(52) U.S. Cl.
CPC .......... *G06F 3/016* (2013.01); *G06F 3/03543* (2013.01)

(58) Field of Classification Search
CPC ............................ G06F 3/016; G06F 3/03543
See application file for complete search history.

(56) References Cited

U.S. PATENT DOCUMENTS 7,030,857 B2    4/2006   Okeeffe et al.
11,301,054 B1   4/2022   Drezet et al.
(Continued)

OTHER PUBLICATIONS

U.S. Appl. No. 18/479,055, "Corrected Notice of Allowability", Nov. 4, 2025, 4 pages.
(Continued)

*Primary Examiner* — Tadesse Hailu
(74) *Attorney, Agent, or Firm* — Kilpatrick Townsend & Stockton LLP

(57) ABSTRACT

In some embodiments, a computer mouse comprises a housing, a multi-tiered and depressible keyplate including a first tier and a second tier, a haptic element, a subchassis configured to support and directly couple the haptic element to a bottom surface of the first tier of the keyplate, and a sensor (e.g., force sensor, keypress detection sensor, and the like). In some cases, when depressed by a threshold distance, the second tier of the multi-tiered depressible keyplate makes contact with the sensor, causing the sensor to detect that the multi-tiered depressible keyplate is depressed. In some aspects, the multi-tiered depressible keyplate is a monolithic structure such that the first and second tiers move as a single unit relative to the housing when the multi-tiered depressible keyplate is depressed. In some embodiments, haptic energy generated by the haptic element is coupled to the first tier of the multi-tiered depressible keyplate, and a pressing force pushing the multi-tiered depressible keyplate down is coupled to the sensor via the second tier of the multi-tiered depressible keyplate.

20 Claims, 67 Drawing Sheets
(43 of 67 Drawing Sheet(s) Filed in Color)

(56) References Cited

U.S. PATENT DOCUMENTS

| | | | |
|---|---|---|---|
| 12,326,978 | B2 | 6/2025 | Valverde et al. |
| 12,481,364 | B2 | 11/2025 | Valverde et al. |
| 2004/0034282 | A1 | 2/2004 | Arthur, III |
| 2014/0225832 | A1* | 8/2014 | Wright ................ G06F 3/03543 |
| | | | 345/163 |
| 2017/0220139 | A1 | 8/2017 | Forde et al. |
| 2017/0315616 | A1* | 11/2017 | Kim ........................ G06F 3/016 |
| 2018/0260043 | A1* | 9/2018 | Forde ................. G06F 3/03543 |
| 2019/0079584 | A1* | 3/2019 | Bonanno ............. G06F 3/03543 |
| 2020/0004352 | A1* | 1/2020 | McLoughlin ....... G06F 3/03543 |
| 2021/0255711 | A1* | 8/2021 | Wang .................... G06F 3/0213 |
| 2021/0318764 | A1 | 10/2021 | Knoppert et al. |
| 2022/0171470 | A1 | 6/2022 | Drezet et al. |

OTHER PUBLICATIONS

U.S. Appl. No. 18/479,055, "Corrected Notice of Allowability", Sep. 18, 2025, 5 pages.

U.S. Appl. No. 18/479,055, "Notice of Allowance", Jun. 10, 2025, 8 pages.

U.S. Appl. No. 18/479,057, "Non-Final Office Action", Aug. 27, 2024, 11 pages.

U.S. Appl. No. 18/479,057, "Notice of Allowance", Feb. 24, 2025, 7 pages.

* cited by examiner

400

500

*Haptic Device*

*1700*

Haptic Device

*1800*

1840   1830   1850

1820

1810

1900

2000

2010

1. Mouse body ——▼ Force exerted on mouse body during electrical actuation
2. Keyplate ——▲ Force exerted on the keyplate during electrical actuation Flexible carrier, design factor K3

Haptic element

Load transfer element (actuator), design factor A

Preload spring, design factor K2 main keyplate hinge, design factor K1 fasteners carrier to keyplate fasteners to device body sensing element

Device body, system foundation

Preload and lifting prevention elements

Haptic Device

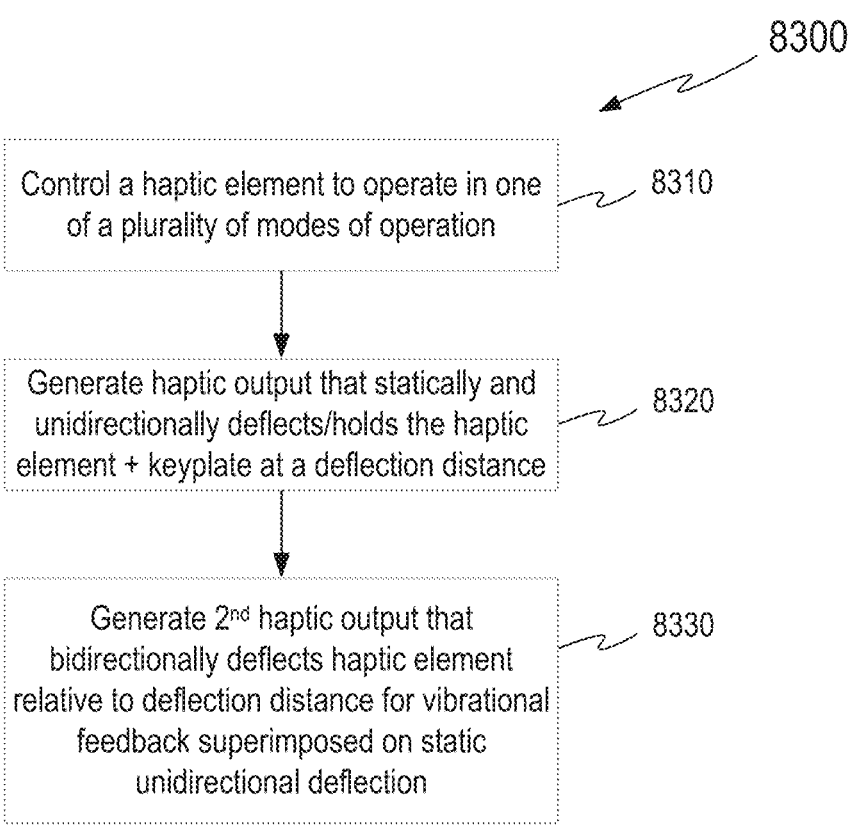

8300

Control a haptic element to operate in one of a plurality of modes of operation — 8310

Generate haptic output that statically and unidirectionally deflects/holds the haptic element + keyplate at a deflection distance — 8320

Generate 2nd haptic output that bidirectionally deflects haptic element relative to deflection distance for vibrational feedback superimposed on static unidirectional deflection — 8330

FIG. 83

HAPTICS AND SENSING SYSTEMS FOR AN INPUT DEVICE

CROSS REFERENCE PARAGRAPH FOR PRIORITY

This application claims the benefit and priority of U.S. Provisional Application No. 63/578,121, filed on Aug. 22, 2023, and titled "HAPTICS AND SENSING SYSTEMS FOR AN INPUT DEVICE," which are hereby incorporated by reference in their entirety for all purposes.

BACKGROUND

Haptic and sending technology can relate to any technology that can create an experience of touch by generating forces, vibrations, or motions that are imparted on a user. Haptic devices may incorporate tactile sensors that measure forces exerted by the user on an interface, which can be used, for example, to modulate an amount of haptic feedback. Simple haptic devices are common in the form of game controllers, joysticks, steering wheels, and smart phones. The sense of touch may be classified as passive and active, and the term "haptic" is often associated with active touch to communicate or recognize objects.

Although the fields of sensing and haptics have undergone significant improvements, research, and development over recent years, better solutions are needed to incorporate sensing and/or haptics in computer peripheral devices to improve user experiences with more robust and feature rich enhancements that haptics can provide.

SUMMARY

In some embodiments, a computer mouse comprises: a housing, a depressible keyplate disposed within the housing, the keyplate including a top surface and a bottom surface, a carrier platform including a top side and disposed within the housing, a haptic element coupled to a top side of the carrier platform, a biasing system configured to couple the carrier platform to the housing and provide a pre-loading force that pushes the haptic element coupled to the carrier platform against the bottom surface of the depressible keyplate, and a limiter element operable to physically limit a movable range of the keyplate in one direction that prevents the top surface of the keyplate to deflect past an adjacent top surface of the housing due to the pre-loading force, the top surface of the keyplate and the adjacent top surface of the housing forming a continuous contour when the depressible keyplate is in a non-depressed, neutral position. The biasing system can include a mechanical fastener that mechanically couples the carrier to the housing and allows movement of the carrier platform relative to the housing over the movable range and a biasing element that compresses when the mechanical faster is coupled to the housing. A combination of the biasing element and mechanical fastener can provide the pre-loading force that pushes the haptic element against the bottom surface of the depressible keyplate. In some aspects, a combination of the keyplate, haptic element, and carrier are operable to be depressed together in response to a pressing force on the top surface of the keyplate. The biasing element (e.g., a mechanical spring) can provide a restoring force that causes the combination of the keyplate, haptic element, and carrier to move from any depressed position of the movable range back to the neutral position where the top surface of the keyplate is in a continuous contoured alignment with the adjacent top surface of the housing.

In some embodiments, the limiter element is coupled to the keyplate and includes a lip that extends laterally beyond an end of the keyplate, wherein the lip of the limiter element contacts a portion of the housing and prevents an edge of the top surface of the keyplate to deflect significantly past the adjacent top surface of the housing. The limiter element can be integrated with the keyplate or integrated with the carrier platform, can be a rigid, mechanical structure, can be flexible and may be spring loaded or include soft bumpers, can be a piston-type structure with a pogo pin or reversed pogo pin configuration, or any combination thereof. The housing can include a top case of the computer mouse. In some cases, a soft layer covers the top case and top surface of the depressible keyplate of the computer mouse. In some cases, the carrier platform is a flexible carrier platform and operates as a biasing element that provides the pre-loading force that pushes the haptic element against the bottom surface of the depressible keyplate, a combination of the keyplate, haptic element, and carrier platform are operable to be depressed together in response to a pressing force on the top surface of the keyplate, and the flexible carrier platform provides a restoring force that causes the combination of the keyplate, haptic element, and carrier to move from any depressed position of the movable range back to a neutral position where the top surface of the keyplate is in planar alignment with the top surface of the housing.

In some embodiments, a computer mouse comprises a housing, a depressible keyplate coupled to the housing, the keyplate including a top surface and a bottom surface, a carrier platform including a top side and disposed within the housing, a haptic element coupled to a top side of the carrier platform, a biasing system configured to couple the carrier platform to the housing and provide a pre-loading force that pushes the haptic element coupled to the carrier platform against the bottom surface of the depressible keyplate, and a limiter element operable to physically limit a movable range of the keyplate in opposition to the pre-loading force that pushes the haptic element coupled to the carrier platform against the bottom surface of the depressible keyplate. In certain embodiments, the biasing system includes a mechanical fastener that mechanically couples the carrier to the housing and allows movement of the carrier platform relative to the housing over the movable range, and a biasing element (e.g., a mechanical spring) that compresses when the mechanical faster is coupled to the housing. A combination of the biasing element and mechanical fastener can provide the pre-loading force that pushes the haptic element against the bottom surface of the depressible keyplate. A combination of the keyplate, haptic element, and carrier can be operable to be depressed together in response to a pressing force on the top surface of the keyplate.

The biasing element can provide a restoring force that causes the combination of the keyplate, haptic element, and carrier to move from any depressed position of the movable range back to a neutral position where the top surface of the keyplate is in a continuous contoured alignment with an adjacent top surface of the housing. In some embodiments, the limiter element is coupled to the keyplate, and wherein the limiter element includes a lip that extends laterally beyond an end of the keyplate, wherein the lip of the limiter element contacts a portion of the housing and prevents an edge of the top surface of the keyplate to deflect significantly past the adjacent top surface of the housing. The limiter element can be integrated with the keyplate, can be a rigid, mechanical structure and integrated with the carrier platform, can be flexible and may be spring loaded or include soft bumpers, and/or can be a piston-type structure with a pogo pin or reversed pogo pin configuration. In some cases, the housing includes a top case of the computer mouse, and the computer mouse can further include a silicone layer covering the top case and top surface of the depressible keyplate of the computer mouse.

In some embodiments, a computer mouse comprises a housing, a multi-tiered and depressible keyplate including a first tier and a second tier, a haptic element, a subchassis configured to support and directly couple the haptic element to a bottom surface of the first tier of the keyplate, and a sensor (e.g., force sensor, keypress detection sensor, and the like). In some cases, when depressed by a threshold distance, the second tier of the multi-tiered depressible keyplate makes contact with the sensor, causing the sensor to detect that the multi-tiered depressible keyplate is depressed. In some aspects, the multi-tiered depressible keyplate is a monolithic structure such that the first and second tiers move as a single unit relative to the housing when the multi-tiered depressible keyplate is depressed. In some embodiments, haptic energy generated by the haptic element is coupled to the first tier of the multi-tiered depressible keyplate, and a pressing force pushing the multi-tiered depressible keyplate down is coupled to the sensor via the second tier of the multi-tiered depressible keyplate. The first and second tiers can be vertically aligned such that the second tier is positioned below the first tier. The first tier of the multi-tiered depressible keyplate can be tuned to resonant at a frequency of operation of the haptic driving element. In some embodiments, the haptic element is not directly coupled to the second tier of the keyplate, and haptic energy generated by the haptic element is substantially localized in the first tier of the multi-tiered depressible keyplate. In certain embodiments, the first tier is flexible and the second tier is stiff relative to the first tier. The subchassis, in some embodiments, is not directly coupled to the multi-tiered depressible keyplate and not directly coupled to the housing of the computer mouse. The first tier can include a first end and the second tier includes a second end, and wherein the first tier is coupled to the second tier via the first end and the second end.

In further embodiments, a computer mouse comprises a depressible keyplate having a bottom side, a haptic element coupled to the bottom side of the depressible keyplate, a flexible subchassis configured to support and provide a preloading force to push the haptic element against the bottom surface of the depressible keyplate, a sensing element, and a load transfer element configured between and coupled to a bottom of the flexible subchassis and a top of the sensing element, the load transfer element operable to transfer a force load from the keyplate and flexible chassis to the sensing element. The computer mouse can further include an outer housing having an opening (e.g., aperture), the outer housing defining an outer shell of the computer mouse, wherein the depressible keyplate is configured within the opening of the outer housing and an inner chassis disposed within the outer housing and configured to couple to and provide structural support to the combination of the keyplate, haptic element, flexible subchassis, load transfer element, and sensor, wherein the depressible keyplate is floating and decoupled from the outer housing. In some embodiments, a soft, compliant layer seamlessly covers the keyplate and outer housing. The haptic element can be structurally integrated with the depressible keyplate. The flexible subchassis can be tuned to include static portions and dynamic portions, where the static portions have an increased stiffness and the dynamic portions are tuned to a resonant frequency of the haptic element. Some embodiments can further include a limiter element operable to physically limit a movable range of the keyplate in opposition to the preloading force that pushes the haptic element coupled to the flexible subchassis against the bottom surface of the depressible keyplate. In some cases, the depressible keyplate is a left or right mouse button on the computer mouse. The flexible subchassis can be configured as a leaf spring. In some cases, the load transfer element is comprised of a soft, compliant material that dampers vibration. In certain embodiments, the soft, compliant material is comprised of a foam, polyurethane, rubber, polymer, or TPE. In some cases, the haptic element can be a piezoelectric element.

In further embodiments, a computer mouse includes a housing, a depressible keyplate including a bottom surface, and a haptic element coupled to the bottom surface of the depressible keyplate. The haptic element can be configured to operate in a plurality of modes of operation including a first mode and a second mode. In the first mode of operation, the haptic element can generate a haptic output that statically and unidirectionally deflects and holds the haptic element and coupled keyplate at a deflection distance. In the second mode of operation, the haptic element can generate a second haptic output that bidirectionally deflects the haptic element relative to the deflection distance thereby generating a vibrational feedback that is superimposed on the unidirectional deflection at the deflection distance. In some aspects, the deflection distance corresponds to a control signal. The haptic element can be a piezoelectric device and the control signal is a voltage applied to the haptic element. In some implementations, the haptic output in the first mode of operation unidirectionally deflects the keyplate to the deflection distance within 10 ms, thereby generating a single pulse feedback effect on the keyplate. The vibrational feedback can be controlled independently relative to the deflection distance. In some cases, the vibrational feedback is controlled by the control signal that defines a positive and negative deflection distance of the vibrational feedback. In some embodiments, the vibrational feedback is controlled by the control signal that defines a force of the vibrational feedback. In certain embodiments, the vibrational feedback is controlled by the control signal that defines a time to full deflection of the vibrational feedback. In some cases, the second mode of operation generates a press-and-hold haptic feedback characterized in that in response to receiving a pressing force on a top surface of the keyplate, the haptic element is unidirectionally deflected and held at the deflection distance, the haptic element generates the vibrational feedback when the haptic element is deflected at the deflection distance while the pressing force is detected on the top surface of the keyplate, and the haptic element returns to the first mode of operation after the pressing force is removed from the top surface of the keyplate. In some cases, the keyplate is a left or right main button of the computer mouse.

In certain embodiments, a method of operating a computer mouse includes: controlling, by one or more processors, a haptic element to operate in one of a plurality of modes of operation including a first mode of operation and a second mode of operation, wherein the haptic element is coupled to a keyplate of the computer mouse; generating a haptic output that statically and unidirectionally deflects and holds the haptic element and coupled keyplate at a deflection distance when the haptic element is in the first mode of operation; and generating a second haptic output that bidirectionally deflects the haptic element relative to the deflection distance thereby generating a vibrational feedback that is superimposed on the unidirectional deflection at the deflection distance when the haptic element is in the second mode of operation. In some cases, the one or more processors control the haptic element by a control signal that defines the deflection distance of the unilateral deflection of the haptic element. In some cases, the vibrational feedback is controlled by the control signal that defines a positive and negative deflection distance of the vibrational feedback. In some aspects, the haptic element is a piezoelectric device and the control signal is a voltage applied to the haptic element. In some embodiments, the haptic output in the first mode of operation unidirectionally deflects the keyplate to the deflection distance within 10 ms, thereby generating a single pulse feedback effect on the keyplate. In some cases, the vibrational feedback is controlled independently relative to the deflection distance. In some embodiments, the one or more processors control the haptic element by a control signal that defines a positive and negative deflection distance of the vibrational feedback, a force of the vibrational feedback, a time to full deflection of the vibrational feedback, or any combination thereof. In some aspects, in the second mode of operation a press-and-hold haptic feedback is generated and characterized in that in response to receiving a pressing force on a top surface of the keyplate, the haptic element is unidirectionally deflected and held at the deflection distance, the haptic element generates the vibrational feedback when the haptic element is deflected at the deflection distance while the pressing force is detected on the top surface of the keyplate, and the haptic element returns to the first mode of operation after the pressing force is removed from the top surface of the keyplate. In some cases, the keyplate is a left or right main button of the computer mouse.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features of the various embodiments described above, as well as other features and advantages of certain embodiments of the present invention will be more apparent from the following detailed description taken in conjunction with the accompanying drawings, in which:

FIG. 20 represents a deformable layer encapsulating and enclosing the keyplate, according to certain embodiments;

FIG. 30 includes a soft element that allows compliance in the system to take in the tolerances and required compression loads between the rigid elements, according to certain embodiments;

FIG. 83 is a simplified flow chart showing aspects of a method for operating a computer mouse, according to certain embodiments.

Throughout the drawings, it should be noted that like reference numbers are typically used to depict the same or similar elements, features, and structures.

DETAILED DESCRIPTION

Figure 1:
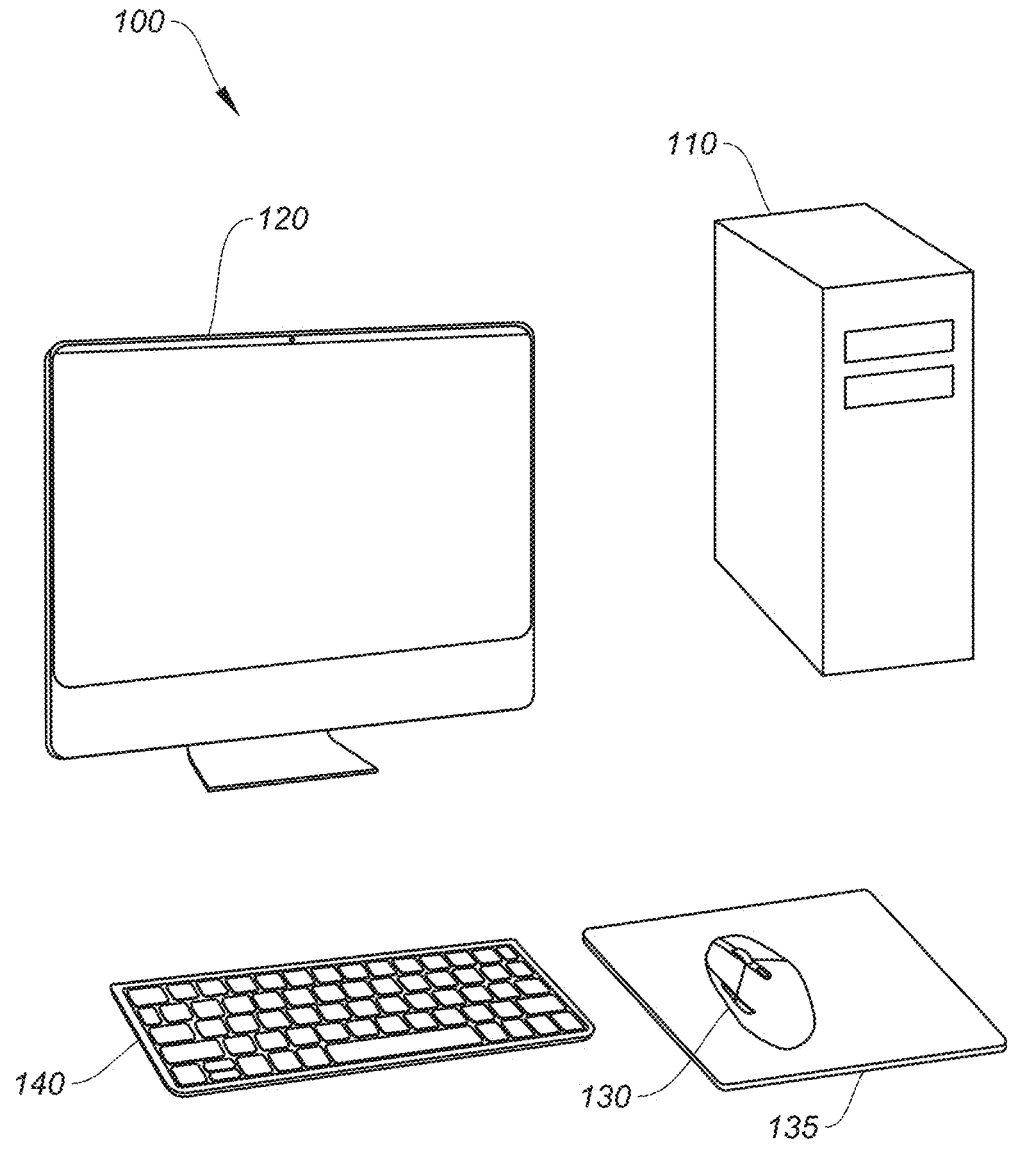
FIG. 1 shows a simplified diagram of a computer system, according to certain embodiments.

Aspects of the present disclosure relate generally to computer peripheral devices, and more particularly to input devices, such as computer mice, according to certain embodiments.

In the following description, various examples of systems and methods for improving a haptic feedback user experience are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to help prevent any obfuscation of the novel features described herein.

The following high-level summary is intended to provide a basic understanding of some of the novel innovations depicted in the figures and presented in the corresponding descriptions provided below. Aspects of the invention include the implementation of sensing and haptic elements in input devices to receive user inputs and provide haptic outputs. This description is generally organized in sections that cover innovations in haptic effects and filtering, mechanical designs, haptic applications, sensing applications, and design combinations thereof, among other related topics, that are outlined, in part, in this introduction to provide a cursory guide to the document layout rather than provide a comprehensive overview thereof.

In a haptics-implemented computer peripheral device, a user input may include a force received from a user's finger that is applied to a clicking architecture including haptic and sensing devices (e.g., piezo element) that can, for example, convert the input force to a voltage. The induced voltage can be used to control various functions on an input device including generating various control signals (e.g., button press, scrolling, scroll function, etc.), as further discussed below. The haptic devices can further be used to generate haptic output signals such as vibro-tactile haptic sensations that can simulate certain physical phenomena including a button depression and wheel rotation, among other performance parameters typically associated with mechanical input elements. That is, a haptic output can convincingly recreate a sensation of physically depressing and actuating key, rotating a wheel, flipping a switch, or other physical input, using haptic vibrations. In some aspects, sensing and actuation for haptic feedback can be performed on the same haptic element, or on separate haptic elements. Despite the many advantages that can be available in haptic driven computer peripheral devices, haptics are yet to be successfully and commercially implemented as a main source of user interaction in computer peripherals, including integrating sensing and feedback in the same system.

In order to facilitate the transfer of haptic energy and ensure the transmissibility of excitation (vibrations) from the haptic element to a desired input element, the haptic element can be mechanically coupled to the input element directly or indirectly (e.g., though a plurality of materials). Thus, some embodiments described herein provide a mechanical architecture that ensures a pre-loading force, pushing the haptic element directly against a bottom surface of an input element to ensure a good mechanical connection. While a pre-load force may ensure mechanical coupling between the haptic element and input element for an efficient transfer of haptic energy between the two, a pre-load force may cause the input element to lift past its default (unpressed) position and create a step, thereby breaking the (aesthetic) form continuity between the housing and input element at its rest state and compromising ergonomics and aesthetics in the overall industrial design, which can be exacerbated further by certain soft and flexible outer layers (e.g., silicone, rubber, fabric, etc.) of the input device. Some aspects of the invention are directed to systems that can provide a pre-loading force to facilitate a robust mechanical contact between a haptic element and a corresponding keyplate (or other input element) for providing good transfer of haptic energy therebetween, while providing a system architecture that prevents the input element from moving past a default position (or any desired position as would be appreciated by one of ordinary skill in the art with the benefit of this disclosure) to improve both ergonomics and aesthetics of an input device, as well as preventing deformation of the system over time (e.g., creep in plastic an soft materials). These aspects and more are shown and further described below (see, e.g., FIGS. 14A-18).

Figure 48A:
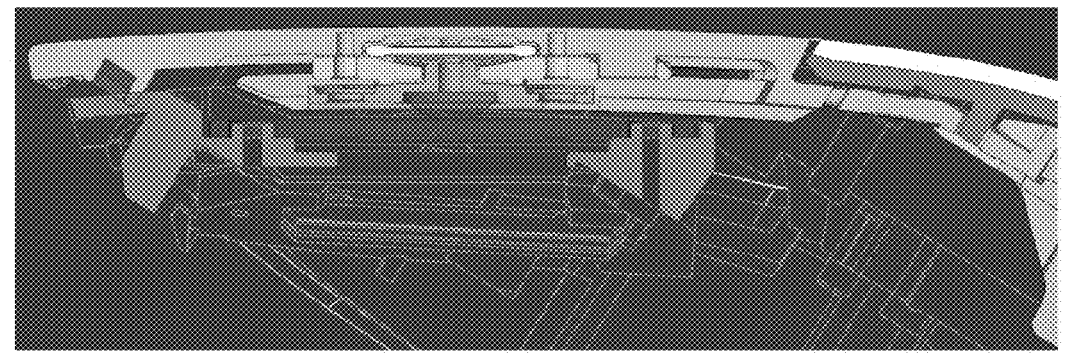
FIG. 48A shows an embedded multi-tiered keyplate with a haptic element integrated in a mouse topcase, according to certain embodiments.

In some embodiments, a multi-tiered depressible keyplate can be used to isolate and efficiently transfer haptic energy to the user with reduced haptic energy transfer to other areas of the computer mouse (see, e.g., FIG. 48A). Some alternative embodiments utilize a novel flexible subchassis (e.g., a leaf spring-like structure) that provides both a preloading force to ensure a good mechanical connection between the haptic element and keyplate and a good transfer of force on the keyplate (e.g., a keypress event) to a sensor via a load transfer element, as shown for example in FIGS. 48B-48C.

In further embodiments, haptic elements on a computer mouse can be used to provide static and unidirectional feedback that can deflect and hold a keyplate at a deflection distance. In some aspects, a second haptic feedback can be superimposed on top of the static deflection to create complex and rich haptic feedback experiences for the user, as further described below at least with respect to FIGS. 4-5.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows a simplified diagram of a computer system 100, according to certain embodiments. Computer system 100 can include computer 110, monitor 120, input device 130, and keyboard 140. In some embodiments, input device 130 can be a computer mouse, a remote control device, a game controller (e.g., game pad, joystick, flight stick, etc.) or elements thereof (e.g., hat switch), a smart phone, or other suitable device that can be used to convert analog inputs into digital signals for computer processing. For computer system 100, input device 130 can be configured to control various aspects of computer 110 and monitor 120. Input device 130 is referred to throughout this disclosure as a computer mouse and any of the inventive concepts considered herein may be applied to computer mouse 130 or any suitable input device, as would be appreciated by one of ordinary skill in the art with the benefit of this disclosure.

Computer 110 can be any suitable computing device including, but not limited to, a desktop computer, a laptop computer, a tablet or "phablet" computer, a smart phone, a PDA, a wearable devices (e.g., smart watches, smart glasses), virtual reality/augmented reality (AR/VR) system, or the like. In some embodiments, input device 130 can be configured to provide control signals for movement tracking (e.g., two-dimensional (2D) movement on a planar surface, three-dimensional (3D) "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of a myriad of additional features that would be understood by one of ordinary skill in the art. Computer 110 may include a machine readable medium (not shown) that is configured to store computer code, such as mouse driver software, where the computer code is executable by a processor (see, e.g., processor 210 of FIG. 2) of computer 110 to control aspects of computer 110 via input device 130, keyboard 140, or the like. The various embodiments described herein generally refer to input device 130 as a computer mouse or similar input device, however it should be understood that input device 130 can be any suitable input/output (I/O) device (e.g., user interface device, control device, input unit, or the like) that may be adapted to utilize the novel embodiments described and/or contemplated herein. More specifically, the embodiments that follow tend to focus on incorporation of haptic devices on a computer mouse, however it should be understood that the concepts described, taught, and suggested herein can be applied to other types of input devices including the non-exhaustive list of input devices above, including gamepads, trackballs, presenters, keyboards, AR/VR controllers, and the like, as would be appreciated by one of ordinary skill in the art with the benefit of this disclosure. Furthermore, the inventive described herein are shown on relatively flat surfaces, but could be applied to non-flat surfaces, simple or complex contours, shapes, and the like.

Figure 2:
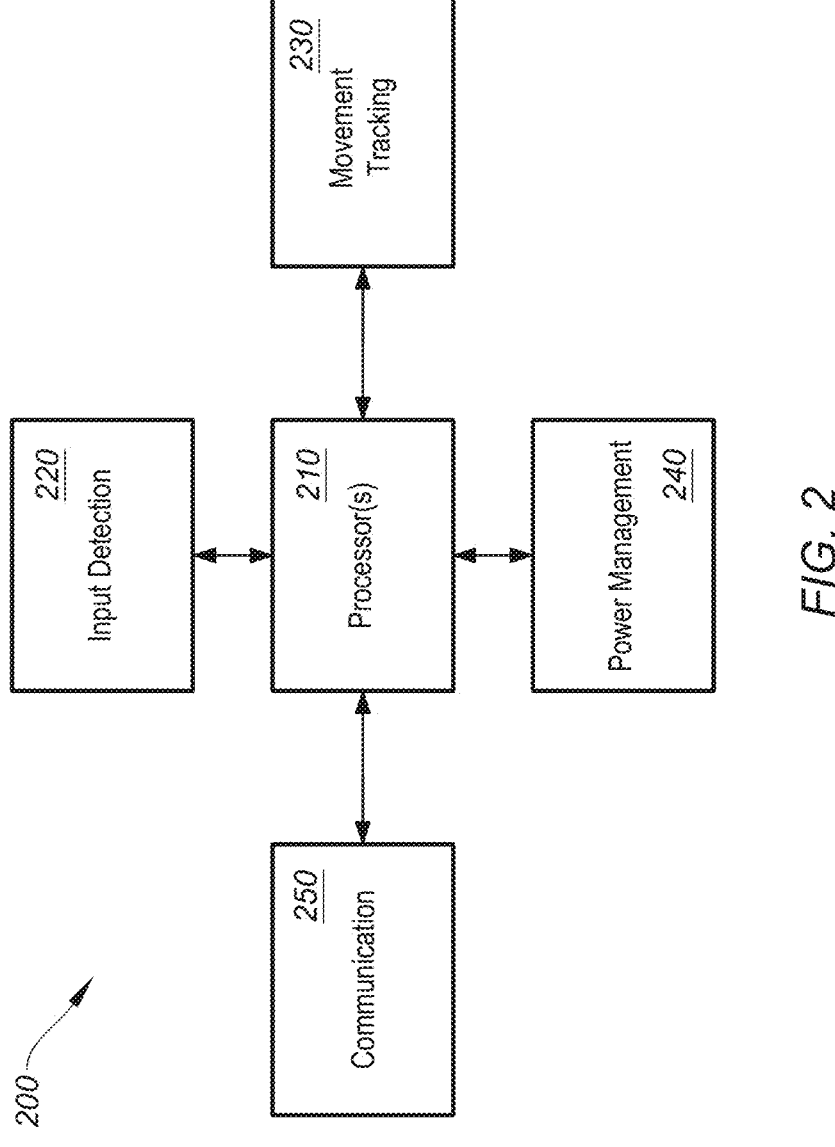
FIG. 2 shows a simplified block diagram of a system to operate an input device, according to certain embodiments.

FIG. 2 shows a simplified block diagram of a system 200 to operate input device 130, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or described to prevent obfuscation of the novel features described herein.

In certain embodiments, processor(s) 210 may include one or more microprocessors (μCs) and can be configured to control the operation of system 200. Alternatively or additionally, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 200. For example, communications block 250 may include a local processor to control communication with computer 110 (e.g., via Bluetooth, Bluetooth LE, RF, IR, hardwire, ZigBee, Z-Wave, Logitech Unifying®, Logitech Bolt®, or other communication protocol). In some embodiments, multiple processors may enable increased performance characteristics in system 200 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Input detection block 220 can control the detection of button activation (e.g., main buttons, side buttons, a scroll wheel button, etc.), scroll wheel and/or trackball manipulation (e.g., rotation detection), sliders, switches, touch sensors (e.g., one and/or two-dimensional touch pads), and the like. In some embodiments, input detection block 220 can detect when a key plate (e.g., left mouse button) is depressed with a sufficient force (e.g., a threshold force) such that it contacts and activates a force sensor. The force sensor may generate a corresponding control signal (e.g., human interface device (HID) signal) to control a computing device (e.g., computer 110) communicatively coupled to the input device (e.g., instantiating a "left click" on the computer). Alternatively, the functions of input detection block 220 can be subsumed by processor 210, or in combination therewith.

In some aspects, input detection block 220 can control the operating of haptic devices implemented on an input device. For example, input signals generated by haptic devices can be received and processed by input detection block 220. For example, an input signal can be an input voltage, charge, or current generated by a piezoelectric device in response to receiving a force (e.g., user interaction) on its surface. In some embodiments, input detection block 220 may control an output of one or more haptic devices on input device 130. For example, certain parameters that define characteristics of the haptic feedback can be controlled by input detection block 220. Some input and output parameters can include a press threshold, release threshold, feedback sharpness, feedback force amplitude, feedback duration, feedback frequency content (e.g., sinusoidal or otherwise), over voltage (e.g., using different voltage levels at different stages), and feedback modulation over time. These characteristics are further described below. Alternatively, haptic input/output control can be performed by processor 210 or in combination therewith.

In some embodiments, input detection block 220 can detect a user press or touch gesture on one or more input, touch and/or force sensitive surfaces on input device 130. Input detection block 220 can include one or more input, touch/force sensitive surfaces, or touch/force sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Touch and/or force detection and sensors can be used to put a system in a "ready" mode, so that latency can be reduced when a user initiates movement or input to the system. Certain embodiments of input device 130 may or may not utilize touch/force detection or touch/force sensing capabilities.

Input detection block 220 can include touch, force, and/or proximity sensing capabilities. Some examples of the types of touch/force/proximity sensors may include, but are not limited to, resistive sensors (e.g., based on carbon loaded plastics which have different electrical characteristics depending on the force (FSR), interpolated FSR, etc.), piezo-electric elements and MEMS, capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), load cells, strain gauges, acoustic sensors (e.g., piezo-buzzer coupled with microphones to detect the modification of a wave propagation pattern related to touch points, ultrasonic sensors, etc.), or the like.

Movement tracking block 230 can be configured to track a movement of input device 130. Movement tracking block 230 can use optical sensors such as light-emitting diodes (LEDs) and an imaging array of photodiodes to detect a movement of input device 130 relative to an underlying surface. Input device 130 may optionally include movement tracking hardware that utilizes coherent (laser) light. In certain embodiments, an optical sensor is disposed on the bottom side of input device 130. Movement tracking block 230 can provide positional data (e.g., X-Y coordinate data) or lift detection data. For example, an optical sensor can detect when a user lifts input device 130 off of a work surface and can send that data to processor 210 for further processing. In some embodiments, processor 210, movement tracking block 230 (which may include an additional dedicated processor), or a combination thereof may perform some or all of the novel functions described herein including modifying a number of image sensor pixels used for different modes of operation (e.g., a first mode of operation and a second mode of operation), changing an image sensor frame rate for different modes of operation, and changing a number of memory slots used for different modes of operation, as further described below.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse." Accelerometers can further determine if input device 130 has been lifted off of a surface and provide movement data that may include the velocity, physical orientation, and acceleration of input device 130. In some embodiments, gyroscope(s) can be used in lieu of or in conjunction with accelerometer(s) to determine movement or input device orientation.

Power management block 240 can be configured to manage power distribution, recharging, power efficiency, and the like, for input device 130. In some embodiments, power management block 240 can include a battery (not shown), a USB-based recharging system for the battery (not shown), power management devices (e.g., low-dropout voltage regulators—not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to enable communication between input device 130 and computer 110, or other devices and/or peripherals, according to certain embodiments. Communications block 250 can be configured to provide wireless connectivity (e.g., radio-frequency (RF), Bluetooth, BLE, infra-red (IR), ZigBee, Z-Wave, Logitech Unifying, or the like) to computer 110 or other wireless devices. System 200 may include a hardwired connection to computer 110 (e.g., USB, FireWire, etc.). For example, input device 130 can be configured to receive a Universal Serial Bus (USB) cable to enable bi-directional electronic communication with computer 110 or other external devices. Some embodiments may utilize different types of cables or connection protocol standards to establish hardwired communication with other entities. In some embodiments, processor 210, communication block 250, or a combination thereof may perform some of the novel functions described herein.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 240 and/or movement tracking block 230 may be integrated with processor(s) 210 instead of functioning as a separate entity.

In some embodiments, a haptic device can be implemented on an input device to operate as both an input and output user interface. For example, a haptic element (e.g., piezo-electric elements, piezo-resistive elements, etc.) can generate a charge, voltage, or current that is proportional to an amount of physical stress (e.g., user press on the surface of haptic element) of the piezo crystal. The generated voltage (input signal) can be proportional to the input force and the input signal can be used to detect a button press (e.g., left/right button mouse click) when a threshold voltage is reached. In response to a detected button press, the same (or different) haptic element can be controlled by elements of system 200 to generate an output vibration in response to the input signal. The haptic element(s) can be a single or multi-layer piezoelectric element, a voice coil, a linear resonant actuator (LRA), or any other vibrating/impacting systems. The sensing part of the haptic element can be a piezoelectric element, a force sensor of any kind (MEMS, strain gauge, capacitive, resistive like FSR or any other). In some embodiments, the output vibration can be tuned in a manner that may be perceived by a user as a physical depression of a mechanical key, an intentionally induced cognitive tactile illusion, even though the underlying surface only vibrates and does not actually deflect, shift, depress, or substantially move relative to the housing itself—it is only perceived as doing so due to the vibrational characteristics of the haptic output (although in some embodiments an input surface may deflect marginally (e.g., by approximately 50 μm or so due to compliant properties of the materials, but far less than that of a typical deflection of actuating physical switches (e.g., a computer mouse keypress, which is typically on the order of 0.5 mm to 1.0 mm and up to 3 mm in keyboard devices). The values and ranges described above and throughout this disclosure operate as examples for points of reference and in no way limit the various embodiments described herein, which may have values and ranges outside of these examples, as would be appreciated by one of ordinary skill in the art with the benefit of this disclosure. The term "housing" can refer to an enclosure that operates to contain the various electronic components of an input device, and further operates as a user interface and incorporates various input elements including buttons, scroll wheels, touch sensors, etc., as mentioned above. Other input elements (e.g., scroll wheels) can be simulated in a similar manner. These haptic substitutions of conventional input elements can be advantageous as costly mechanical key plates, springs, rollers, supporting infrastructure, and the like, can be replaced by cheaper and more reliable haptic elements that are not typically subject to similar fatigue or wear-and-tear. Further, haptic elements may have very small form factors, allowing for more compact and space efficient designs.

Some of the embodiments described throughout this disclosure utilize haptic elements to generate haptic feedback and further modify aspects of the haptic output to solve various problems with haptic-enabled devices. Some embodiments may implement mechanical solutions to resolve various problems, including different implementations for supporting haptic elements (e.g., piezoelectric elements) for good performance, robust support, and aesthetic considerations. In some embodiments, firmware, software, and mechanical implementations can be used in any suitable combination to resolve one or more problems, as would be appreciated by one of ordinary skill in the art with the benefit of this disclosure.

Figures 3A, 3B:
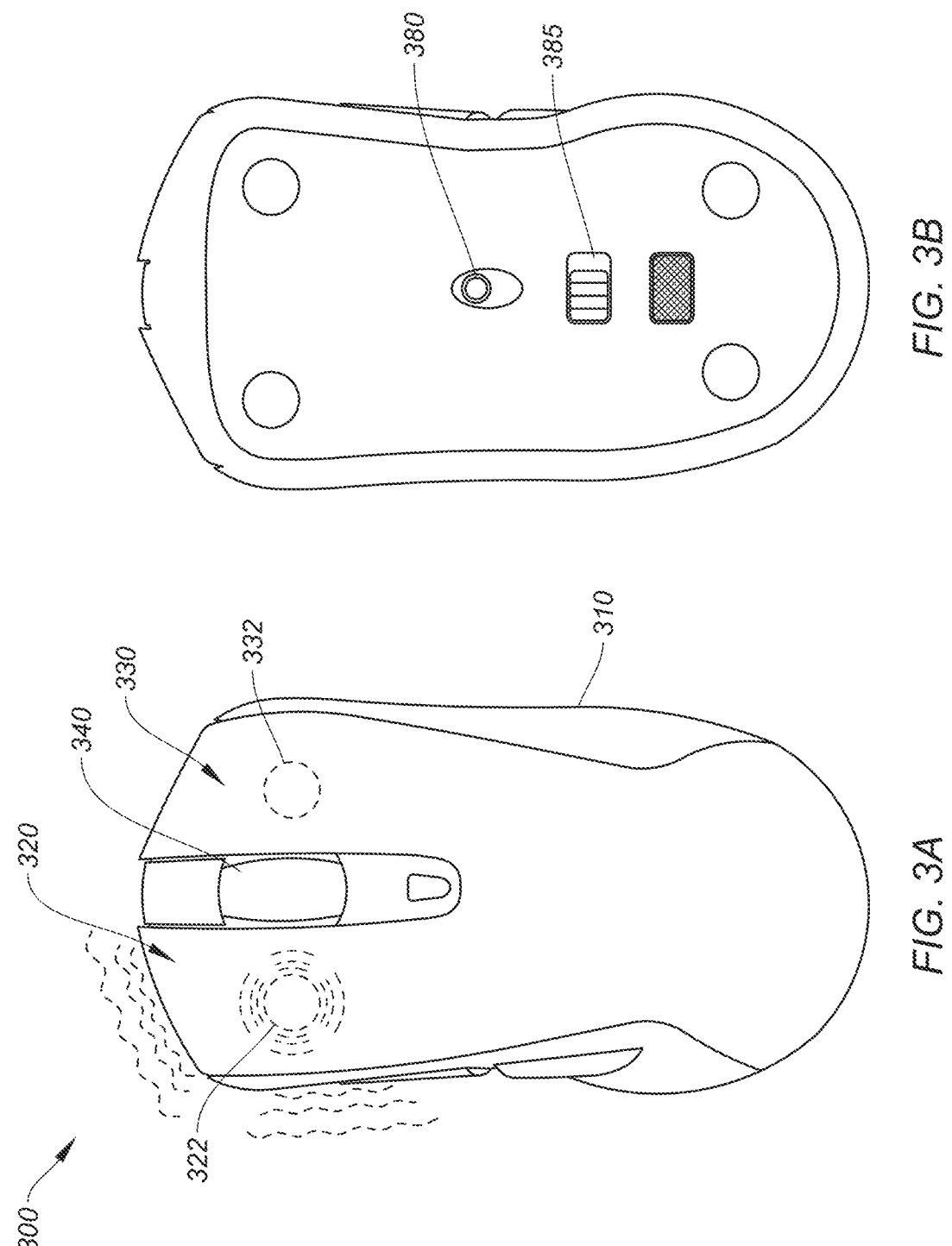
FIGS. 3A and 3B show examples of how haptic elements can be configured on an input device, according to certain embodiments.

FIGS. 3A and 3B show examples of how haptic elements can be configured on an input device, according to certain embodiments. An input device 300 (e.g., computer mouse) is shown with a housing 310 (e.g., the "shell," "chassis," or "body" of the computer mouse), left button 320 and a right button 330, scroll wheel 340, as well as any other suitable input elements (e.g., additional buttons, side scroll wheels, touch sensors, etc.) or output elements (e.g., light emitting diodes (LEDs), displays, haptic feedback elements, speakers, etc.), as typically configured on most computer mice. Each of the left button 320 and right button 330 includes a haptic element 322, 332 configured underneath. Alternative implementations may consider a single haptic element sharing feedback to the main touch surface. Previous or additional haptic elements can also be embedded in the system to provide secondary and tertiary haptic information not directly related with the main clicks. Haptics elements 322, 332 can be controlled, for example, by one or more processors 210 of system 200, and can be configured to vibrate and create a haptic output that may be perceived by a user as a button press, a "bump," or any other haptic sensation based on the type of vibration created by the haptic element(s). Input device 300 may correspond to input device 130 of FIG. 1, or any other input device described herein. In some embodiments haptic elements may also be used as input sensors. In some instances, combinations of haptic elements and force sensors can be used for improved input detection, as further described below.

FIG. 3B shows aspects of a bottom portion of input device 300, according to certain embodiments. The bottom of input device 300 can include one or more feet, an image sensor 380 (e.g., CMOS sensor using an IR LED lamp), and a power switch 385. Additional input elements (e.g., buttons, sliders, etc.) may be included. In some cases, power switch 385 may be located elsewhere on the mouse or may not be included at all (e.g., input device 300 may power up/power down based on usage). One of ordinary skill in the art with the benefit of this disclosure would understand the many variations, modifications, and alternative embodiments thereof.

In some embodiments, image sensor 380 is typically located near the center of the bottom portion of input device 300, as shown. Image sensor 380 can be a single sensor and can operate in one or multiple modes of operation (e.g., surface tracking, changing operating parameters to adapt to particular surface types and corresponding surface classifications, as further described below), lift and/or tilt detection, and the like, according to certain embodiments. An image sensor can be a complementary metal-oxide semiconductor (CMOS) sensor that captures images of the underlying surface and sends each image to a processor (e.g., processor 210, on-board processing on the sensor, etc., to perform image correlation and displacement calculations, etc.) for analysis. Other types of image sensors may be used, including charge-coupled devices (CCD), N-type metal-oxide-semiconductors (NMOS), hybrid devices (e.g., CCD/CMOS), or the like, as would be understood by one of ordinary skill in the art. The processor can detect patterns in the images and see how those patterns have moved since the previous image, and based on changes in the patterns over a sequence of images, the processor can determine how far and what direction the corresponding computer peripheral device has moved, which can be sent to the host computer to control one or more functions (e.g., control a cursor on a display, control an audio volume in a music application, etc.). This process can occur many hundreds if not thousands of times per second to accurately detect movement of all types including a range of movement speeds and accelerations.

In some embodiments of a computer peripheral involving a haptic element, and in accordance with maintaining a good UX, the vibration-based feedback aims at being easily recognizable as its legacy electromechanical type of feedback, e.g., a mouse click provided by a microswitch. In such cases, the haptic element might be excited in such a way that it is forced to change state, instead of vibrating with a pulse or a combination of pulses. This change of state, perceivable by the user as a sudden unidirectional force variation under the finger, eventually with a minute displacement of the surrounding structures, induces a different configuration of the haptic element, into a stable or steady state form corresponding to a press or release interaction. The shift between these states will allow the user to perceive the actuated element as being in a state equivalent to legacy electromechanical actuators, and assumes the familiarity of the legacy user input. However, to these configurable steady states, more generalized haptic pulses can be superimposed, hence enriching the haptic information available and conveyed to the user, and even for the purpose of creating vibro-tactile cues, such as illusions of displacement.

Figure 4:
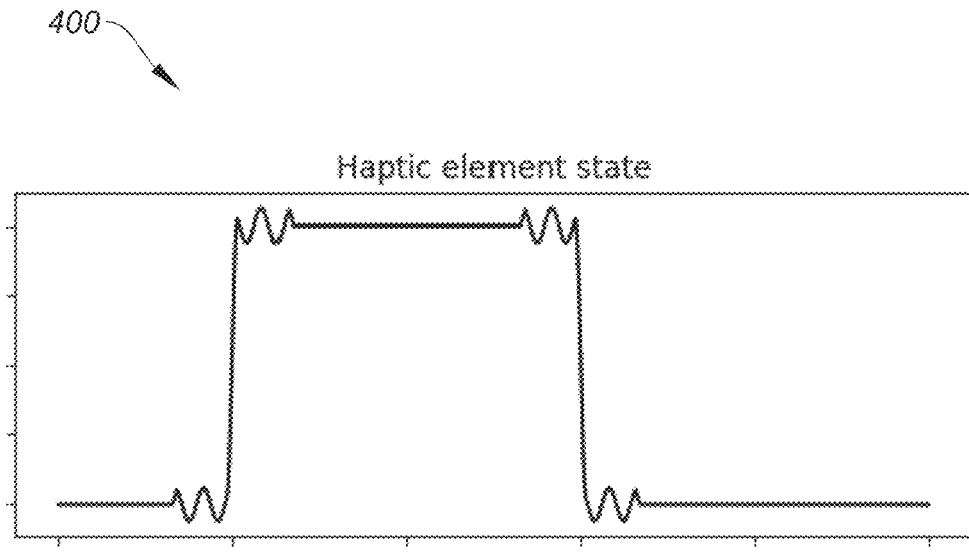
FIGS. 4-5 depict simplified waveforms that show a haptic element state and corresponding current profile used to identify a push and release stage, according to certain embodiments.
Figure 5:
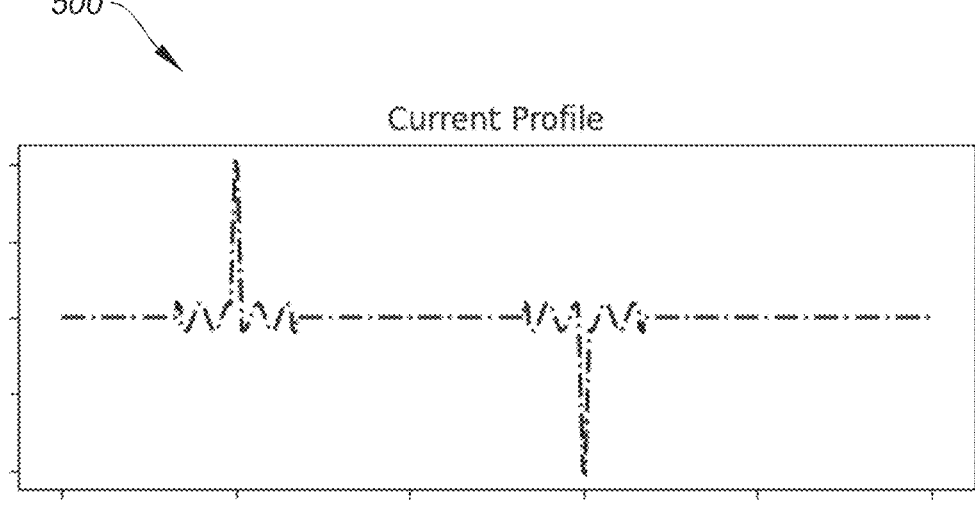

FIGS. 4-5 depict simplified waveforms that show a haptic element state 400 (FIG. 4) and corresponding current profile 500 (FIG. 5) used to identify a push and release stage, according to certain embodiments. Instead of a burst oscillation (e.g., rapid positive and negative excursions of a piezo element to create a vibration) to impart a haptic feedback, as is typically the case in haptic feedback systems, some aspects of the invention can impart a unidirectional force variation, or a relatively static physical deflection of the haptic generator in one direction-typically toward the finger or thumb of a user—at such an amplitude to allow the user to perceive a physical impact. The magnitude of the deflection and perceived impact can be varied and may correspond to the voltage applied to the haptic generator (e.g., piezo). In summary, instead of using a haptic generator to vibrate, some embodiments deflect the haptic element in one direction and holds it there, making an electromechanical switch with linear driving from a first state (e.g., flat piezo) to a second state (e.g., deflected piezo) making a step, which can be performed at any suitable rate (e.g., milliseconds). In some embodiments, multiple states are possible wherein three or more states can be used for mechanical effect, such as deflections at three or more distances (in response to different voltage amplitudes across the haptic element), and in positive or negative directions. In some implementations, a vibration can be superimposed over a statically deflected haptic element to induce a sense of pressing down a key and leading to one of the previously described states.

In some embodiments that utilize haptic elements, those capable of such state configurations (e.g., piezoelectric), might be driven by current, where current direction and absence of such excitation can induce any of the possible stationary states. Other embodiments of haptic elements (e.g., magnetic hammer) can use permanent magnets or magnet arrangements, where an external field is excited by current, leading to a sudden shift in the magnet positions. The arrangements of such magnets might render radial, axial, polar or any other arrangements possible, as would be appreciated by one of ordinary skill in the art with the benefit of this disclosure. Other embodiments might see the use of reversible magnets being temporarily and instantaneously excited by a current pulse, inverting its polarization (e.g., via EPM). This would induce a change of state by the rearrangement of the elements in the presence of permanent magnets or magnetic materials. The latter benefits from being a passive state, where current is solely used while reversing the magnet polarization.

Haptic elements used for generating a main interaction feedback, e.g., mouse clicks, can also be used to generate secondary and tertiary haptic information. This information can be conveyed to the user through the available haptic technology even if the feedback is not directly related to the main interaction. Examples of such cues can include: (1) enhanced clicking feedback such as multi-level press (e.g., hard click); (2) secondary haptic cues: long-press, menu pop-up, menu select, select and drag, positioning/localization for dropping, line and column changes (spreadsheet), section changes when scrolling long documents, etc.; (3) tertiary haptic cues and other feedback not directly prompted by the user, e.g. change of state, device power-up, low battery and app/task based notifications: e.g. calendar event, mail, schedule, time based event, etc.; and (4) stereo haptics where both keyplates of an input device are used in concert to provide directional cues to a user. Multiple haptic elements can be used synchronously or asynchronously with phased waveforms, alternating excitations between elements, or with different waveforms produced independently. Thus, multiple point haptics can enable the introduction of further enriched haptic information on the corresponding input device.

FIG. 83 is a simplified flow chart showing aspects of a method 8300 for operating a computer mouse, according to certain embodiments. Method 8300 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 8300 can be performed by aspects of system 200 (e.g., processors 210, input detection 220, a combination thereof, etc.).

At operation 8310, method 8300 can include controlling, by one or more processors, a haptic element to operate in one of a plurality of modes of operation including a first mode of operation and a second mode of operation, wherein the haptic element is coupled to a keyplate of the computer mouse, according to certain embodiments.

At operation 8320, method 8300 can include generating a haptic output that statically and unidirectionally deflects and holds the haptic element and coupled keyplate at a deflection distance when the haptic element is in the first mode of operation, according to certain embodiments.

At operation 8330, method 8300 can include generating a second haptic output that bidirectionally deflects the haptic element relative to the deflection distance thereby generating a vibrational feedback that is superimposed on the unidirectional deflection at the deflection distance when the haptic element is in the second mode of operation, according to certain embodiments.

In some aspects, the one or more processors control the haptic element by a control signal that defines the deflection distance of the unilateral deflection of the haptic element. In some embodiments, the vibrational feedback is controlled by the control signal that defines a positive and negative deflection distance of the vibrational feedback. In some embodiments, the haptic element is a piezoelectric device and the control signal is a voltage applied to the haptic element. In certain embodiments, the haptic output in the first mode of operation unidirectionally deflects the keyplate to the deflection distance within 10 ms, thereby generating a single pulse feedback effect on the keyplate. The vibrational feedback can be controlled independently relative to the deflection distance. In some cases, the one or more processors control the haptic element by a control signal that defines a positive and negative deflection distance of the vibrational feedback, a force of the vibrational feedback, or a time to full deflection of the vibrational feedback, or any combination thereof.

In some embodiments, in the second mode of operation a press-and-hold haptic feedback can be generated that is characterized in that in response to receiving a pressing force on a top surface of the keyplate, the haptic element is unidirectionally deflected and held at the deflection distance, the haptic element generates the vibrational feedback when the haptic element is deflected at the deflection distance while the pressing force is detected on the top surface of the keyplate, and the haptic element returns to the first mode of operation after the pressing force is removed from the top surface of the keyplate. In some cases, the keyplate is a left or right main button of the computer mouse.

It should be appreciated that the specific steps illustrated in FIG. 83 provide a particular method 8300 for operating a computer mouse, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Specific-shaped actuation and loading features between keyplate and haptic module can facilitate the transmission of the finger press loads more accurately to the piezo elements. The features allow modifying the piezo vibration response by change of the contact area and other mechanical properties such as structure stiffness under load. These features can also double as mechanical locks between rigid structures and soft layers of the device (e.g., computer mouse). In this case, the features are added via mechanical fitting such as clamping, clipping, press fitting, fastening, or a combination thereof, to the keyplate under structure. By the resultant interference and clamping effect, the features lock and maintain the soft layer against the rigid keyplate, preventing it from decoupling from the keyplate (e.g., delamination or peeling under finger press).

Active noise canceling (e.g., sounds filtering system) can be made possible using haptic feedback devices by modulating external and active haptic element driven clicking sounds. Aspects of the invention can include an additional layer of customization directed to audible feedback (e.g., silent click, enhancing the click sound, etc.). Making use of an active speaker, e.g., embedded in the device itself or any other speaker device available to the user, to modulate and attenuate or enhance, the audible clicking and other feedback acoustic emissions, including those emerging from the haptic elements. The system may include a microphone to measure, in real time, the audible sounds or make use of predetermined sound waveforms, known to match those of the system architecture or prerecorded sounds, to use as inputs for a filtering system. The system can make use of traditional, AI, or hybrid approaches, to filter and cancel emitted sounds by modulating and phase shifting output sounds waves.

Audible feedback can be made possible via the integration of a noise canceling device (e.g., speaker) outputting same excitation (e.g., frequency and modulation) that is out of phase with haptic piezo devices. This allows an amount of control for canceling level and modulation of frequency. The active noise canceling system can adopt either of the two architectures. The first architecture uses the haptic elements themselves to cancel specific structural noises that are emerging from the mouse/haptic module. In this scenario, the haptic elements resonate at their main frequency, which carries the anti-noise signal. The goal is typically not to cancel the haptic element's noise, but resonances of the input device (e.g., computer mouse) itself. A haptic module typically has resonance peaks substantially higher than frequencies that are detectable by user ear or human tactile perceivable levels (e.g., <400 Hz). The second architecture uses an on-board speaker to emit out-of-phase noise to cancel and/or modulate mouse clicks and any undesirable noise emissions. Additionally, a microphone can be embedded in the system to measure and monitor noise emissions, leading to adaptive and context-based noise-cancelling, thereby creating a noise cancelation system integrated with a mouse and corresponding haptic module.

Some of the various embodiments of input devices (e.g., computer mice) described herein employ haptic elements that can provide haptic feedback to a user in a variety of different ways to mitigate certain deleterious conditions (e.g., shock filtering, maintaining haptic threshold relationships, etc.) that can be associated with haptic element implementations and improve the user experience. In some cases, conventional switches (e.g., microswitches) can be supplanted with solid state implementations (e.g., haptic elements), which can improve the longevity and reliability of the input device with fewer moving parts and more robust haptic-based designs.

In order for the user to experience the haptic feedback, the vibrations of the haptic element (haptic energy) need to be transferred to the input element that the user is interfacing with for the user to experience them. For many of the embodiments described herein, the input element is a mouse button (e.g., left mouse button), however haptic energy can be transferred to any suitable element, region, or part of the input device using the novel embodiments described herein, as would be appreciated by one of ordinary skill in the art with the benefit of this disclosure. To facilitate the transfer of haptic energy (vibrations) to/from the haptic element to/from a desired input element, the haptic element can be mechanically coupled to the input element directly or indirectly (e.g., though a plurality of materials). Thus, some embodiments described herein provide a pre-loading force that pushes a haptic element directly, or with a coupling material (e.g., adhesive) in between, against a bottom surface of an input element to ensure a good mechanical connection. Typically, increasing the preload force and the surface area of the mechanical connection will yield a better efficiency of energy transfer. It should be noted that the mechanical coupling is also good for facilitating the transfer of energy the other direction as well, such that a movement of the input element (e.g., keyplate) is correctly sensed by the haptic element.

In some aspects, a pre-load can range from a minimum compression state (close but above 0 N) to ensure contact to tenths of a Newton to improve (e.g., maximize) the mechanical coupling, with improved (e.g., optimal) values being dependent on system design and architecture, as would be appreciated by one of ordinary skill in the art with the benefit of this disclosure.

In many input devices, and particularly computer mice, ergonomics and aesthetics can be an important part of the industrial design. In some cases, an input element (e.g., keyplate) may be designed to be in substantially planar alignment with a housing to make for a continuous contour when the keyplate is at rest (e.g., non-pressed, default position). When the input element is pressed down, the keyplate may be deflected downwards, but may return to the default position to keep the continuity between the housing and keyplate. As described above, while a pre-load force may ensure a good mechanical connection between the haptic element and input element for an efficient transfer of haptic energy between the two, a pre-load force may cause the input element to lift past its default position and create a step, thereby breaking the continuity between the housing and input element at its rest state and compromising ergonomics and aesthetics in the overall industrial design, as well as introducing creep in the system, leading to long-term deformation of the keyplate and corresponding system elements. Some embodiments may further employ a soft, pliable covering, such as a silicone layer, to improve aspects of the user experience. For example, some haptic element-coupled keyplates may have very small gaps or split lines between the keyplate and housing to allow small key plate movements (e.g., 50 μm) and a soft layer (e.g., silicone rubber or any other suitable material) can help to hide the small gaps making the entire input device appear to be a single, monolithic unit and enable a seamless design. However, the soft layer may actually worsen the aesthetics of the input device by accentuating any discontinuities in the contours of the input device like the discontinuous step between the keyplate and housing, further exacerbating the problem. In such cases, intended design features might be embedded in the shape of the device, such as recesses or bumps, hence masking the minute deformations resulting from the internal preload, aging of materials (e.g., material creep) and normal user interactions. Such features also benefit of affording the user visual tactile cues for input localization while retaining the seamless monolith design language.

Aspects of the invention are directed to systems that can provide a pre-loading force to facilitates a robust mechanical contact between a haptic element and a corresponding keyplate (or other input element) for providing good transfer of haptic energy therebetween, while providing a system architecture that prevents the input element from moving past a default position (or any desired position as would be appreciated by one of ordinary skill in the art with the benefit of this disclosure) to improve both ergonomics and aesthetics of an input device.

In certain embodiments, portions of the computer mouse include the entire top case, bottom case, etc., can be manufactured as a monolithic entity of a single material or a combination of materials (e.g., soft rubber, silicone, TPE, ABS, ceramics, plastics, metals), which can be overlayed or meshed together (e.g., smart structures) to benefit from the combination of their mechanical or material properties. In some aspects, materials can be configured for local functionality (e.g., user input areas) or across the entire computer mouse to improve (e.g., optimize) the material and mechanical properties according to function and desired user experience.

In some embodiments, relative movement at a microscopic level (e.g., <100 μm), with the perception of being soft to the touch, may be achieved by the use of a touchable surface where material, surface texture, thickness, and hardness can be considered as design factors. In some cases, soft materials such as elastomers, foams, and smart structures, can have lower hardness and increased thickness; rigid materials can have relative movement at a microscopic level by localized design stiffness of rigid components having a spring-like behavior, and smart structures may have a perceivable flexible behavior; and a hybrid compliant surface can include a combination of the soft and rigid materials above, and may also include a combination with an inner architecture of the computer mouse. When such systems are used, user finger compression can be in the range of 1-3 mm (e.g., in the softest part of the finger) for loads within the range of a click input. Thus, even when pressing a hard or slightly compliant surface, there may be a relatively "large" movement at the finger resulting from finger compression. The combination of the materials as described above can allow the haptification of feedback to create a sensory illusion of movement via tactile stimuli (e.g., haptic vibrations) and specific cues provided to a user's somatosensory system. For example, active haptics can contribute to the perception of stiffness and keyplate movement where progressive input (e.g., a heavier user's downwards pressure with their finger) can lead to increased stimulation by the vibrations and create a sensor illusion of keyplate movement.

In some embodiments, TPE can develop stress marks over time. Silicone can be used as a top layer because it does not develop stress marks over time and can further improve the UX (e.g. soft comfortable material). Furthermore, silicone can be molded with thinner thicknesses than TPE which help in the transfer of energy from the haptic motor to the user. In some cases, the top case can be comprised of a rigid material (e.g., ABS) to provide structure and rubber bonded for UX. In some embodiments, a carrier platform may provide mechanical support for the key plate. A top layer, such as silicone, can bond the entire outer portion of the input device or a portion thereof (e.g., over the top case) for good tactile and visual properties, but not necessarily for providing support for various elements (e.g., floating key plates), as described below.

In certain embodiments, the use of haptic elements and solid-state architectures allow for the possibility of a seamless and/or gapless design, without any necessary clearances between any outside features of the computer mouse, including clearances between buttons and the housing, and any other features that typically requires a gap to ensure independent and proper operation of said outside features in conventional computer mice. Seamless designs can be useful for achieving fully enclosed mouse shells (e.g., top/bottom case), for water-resistant and/or waterproof implementations that can prevent contamination of the computer mouse interior (e.g., IP68), as well as keep outer/touchable surfaces clean and hygienic. In some cases, seamless designs allow a reduction of the number of parts required for a functional mouse shell, potentially simplifying tooling and manufacturing processes, while reducing waste and improving repairability and robustness.

For clickable areas (e.g., areas coupled to haptic element and configured to propagate haptic vibrations coupled therefrom), various tactile cues can be integrated therewith, including bumps, recesses, ridges, indents, raised/lowered areas for user guidance and improve tactility, while still retaining both the solid-state and seamless design features described above. Furthermore, the inclusion of these features can improve the shape and ergonomy of computer mice, enhance aesthetics, improve product finish, and heighten the quality of the user experience.

In certain embodiments, a clickable area (e.g., left/right click areas) on a solid-state, seamless computer mouse can have any of the following design features, including: a continuous and monolithic surface area (e.g., no gap between clickable area and surrounding housing), raised or visual/tactile perceivable features that help the user locate the clickable/interactive area(s), continuous (single or indistinct left/right keys) or distinct left/right keyplates, different textures to identify clickable areas, and the like. In some cases, keyplates can have seamless hinges in specific locations (e.g., areas of the topcase that are thinner to promote movement on the order of microns). Floating islands are possible and can allow keyplates to move up and down and allow feedback via haptic elements to couple to the user through the keyplate.

Figure 6:
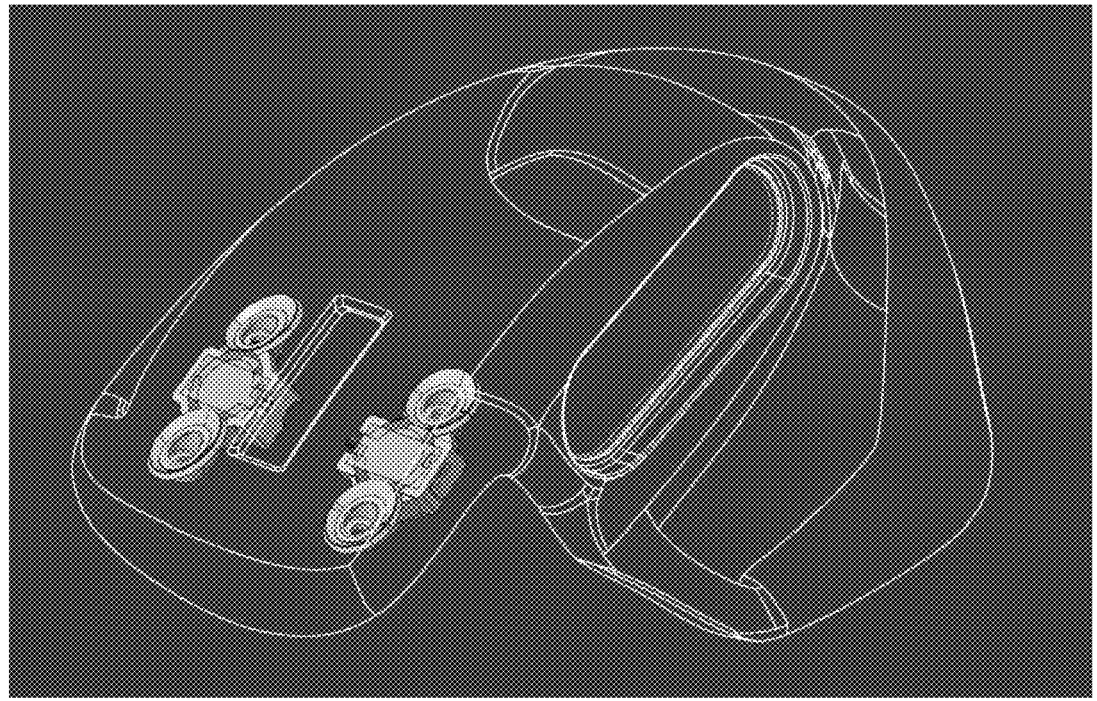
FIGS. 6-8 show a solid-state computer mouse with multiple haptic elements configured on a single input element, according to certain embodiments.
Figure 7:
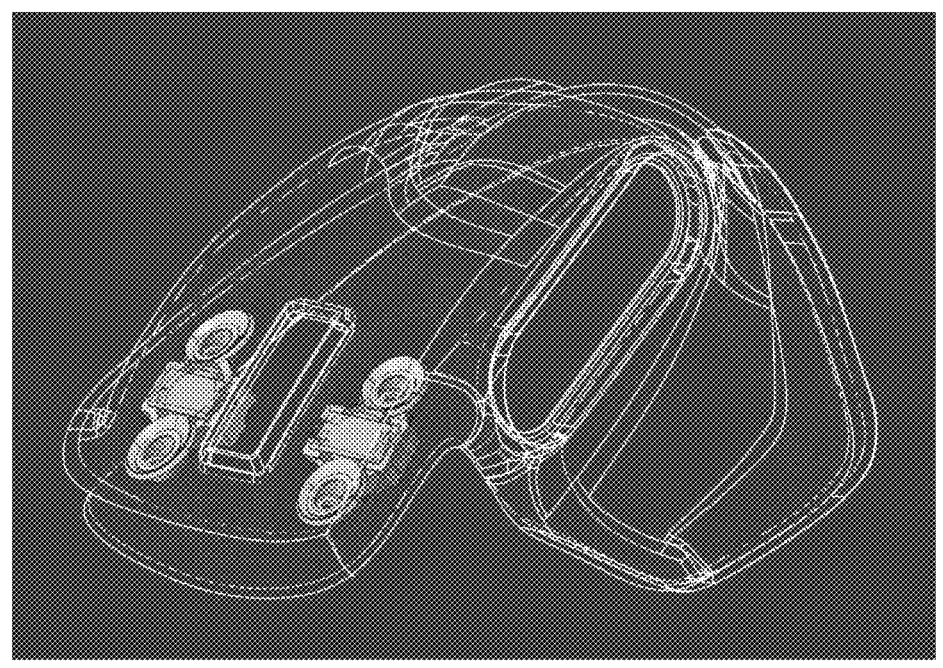
Figure 8:
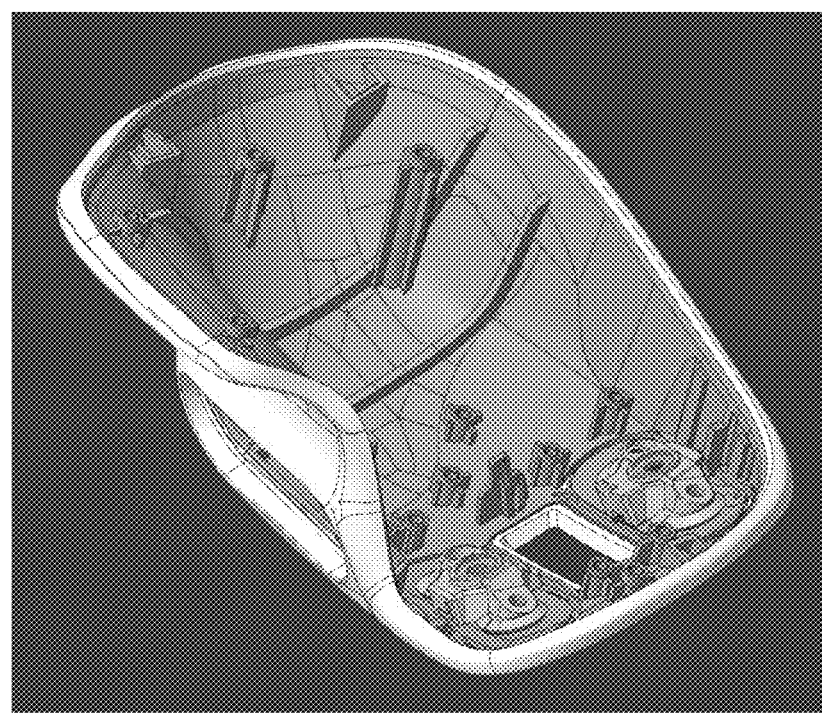

In some embodiments, a keyplate can be designed specifically for input devices that incorporate haptic elements and may have a seamless and/or solid-state design, as described above. FIGS. 6-8 show various implementations of computer mice or portions thereof that incorporate haptic elements in solid-state implementations.

FIGS. 6-8 shows a solid-state computer mouse with multiple haptic elements configured on a single input element, according to certain embodiments. More specifically, two haptic elements are configured in a linear fashion on each left/right keyplate area on a computer mouse. Larger or smaller haptic elements may be used, more or fewer haptic elements may be used, and haptic element can be arranged in any suitable configuration (e.g., haptic element placement can follow and/or conform to any contour on the housing), as would be appreciated by one of ordinary skill in the art with the benefit of this disclosure. The haptic elements shown in FIGS. 6-8 and those shown and described throughout the present document can be controlled by aspects of system 200 (e.g., processor(s) 210), the host system in communication with the computer mouse, or a combination thereof. FIGS. 6-8 may operate as a solid-state computer mouse such that left/right keyplates may be seamless and mechanically integrated with the housing such that the haptic elements may be activated via a user pressing force and output a haptic vibration in response to the user pressing force, which can be propagated up from the haptic element to the user's finger through the housing, without the keyplate or any portion of the housing being mechanically depressed other than material flexion (e.g., <100 μm), as described above.

In the absence of a discrete keyplate, the area of a housing with an integrated keyplate that, when pressed, can activate a force sensitive input element can be referred to as a "clickable area." The clickable area can be fully integrated with the housing, or in some cases may be seamed or hinged to facilitate some movement of the keyplate to enhance the UX. For example, some embodiments of integrated keyplates may include a solid keyplate, a hinged keyplate, a peripheral hinged keyplate, a bonded floating keyplate, a pivot and a fully floating keyplate, although other types of clickable areas utilizing haptic elements are possible, as would be appreciated by one of ordinary skill in the art with the benefit of this disclosure. The keyplates, or areas associated with force sensitive input elements, may be located on any suitable surface of the device, such as the top, sides, front, and rear.

Figure 9:
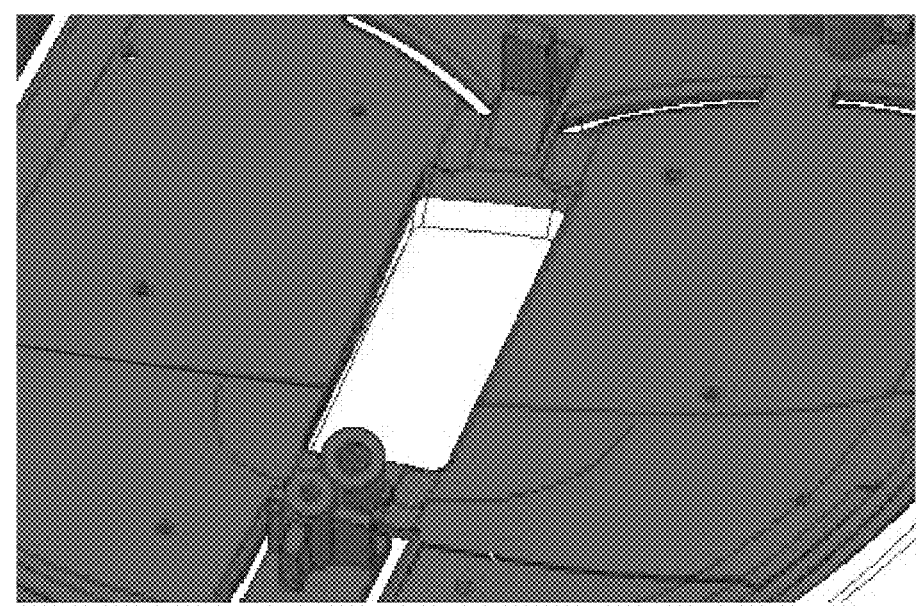
FIGS. 9-10 show physical connection hinges between the keyplate and structural elements of the computer mouse (e.g., the top case), according to certain embodiments.
Figure 10:
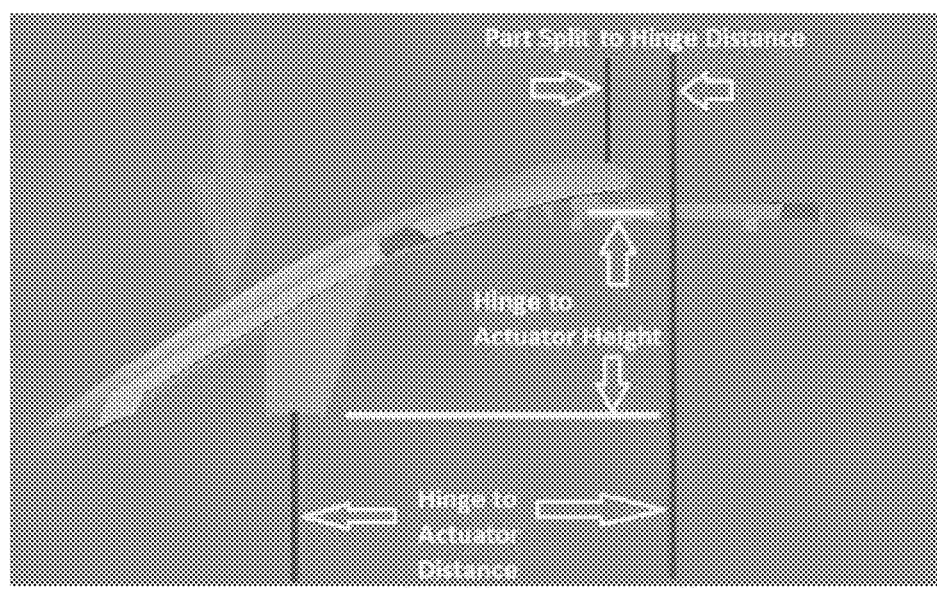
Figure 11:
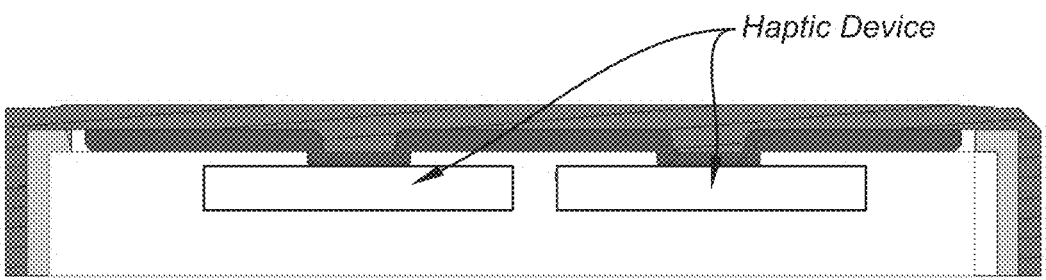
FIG. 11 shows an example of a non-hinged key supported by a soft overlay.
Figure 12:
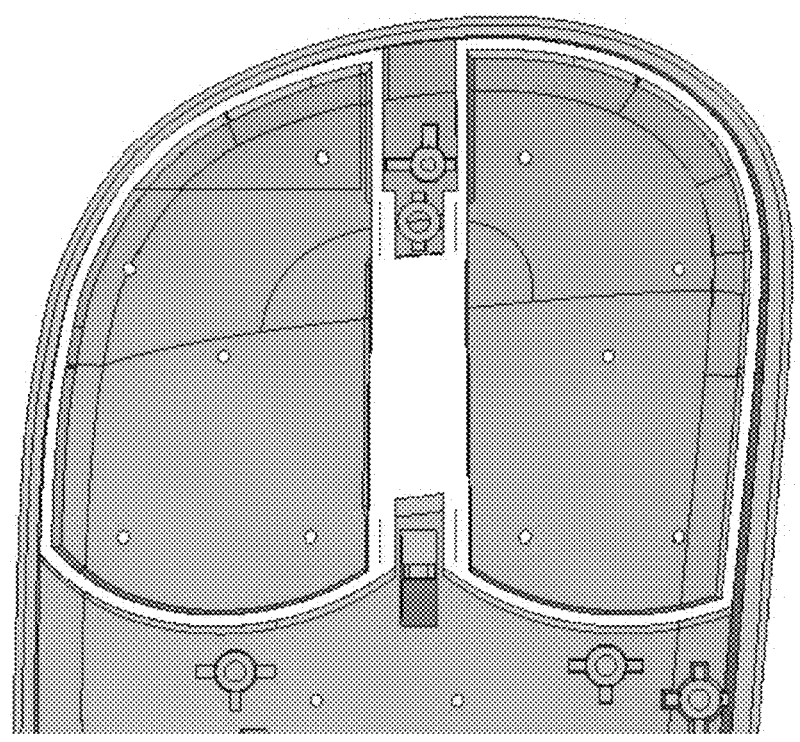
FIG. 12 shows an example of a fully floating keyplate (no hinges), according to certain embodiments.

In a hinged keyplate design, a keyplate system can be configured with local hinges that allow for minimal movement of the keyplate. The hinges may be articulating members, rotating members, and other physical connections between the keyplate and the surrounding structure. For example, FIGS. 9-10 show physical connection hinges between the keyplate and structural elements of the computer mouse (e.g., the top case), according to certain embodiments. FIG. 9 shows side hinged keys and FIG. 10 shows rear hinged keys. Hinged keyplates might be total, meaning the entire surface of the clicking area is hinged, or partial where just a partial area is hinged and the remaining clicking remains stationary in relation to the former. Similarly to hinged keyplates, other design options are available, such as pivot keys, as would be appreciated by one of ordinary skill in the art with the benefit of this disclosure. In contrast, FIG. 11 shows an example of a non-hinged key supported by a soft overlay, and FIG. 12 shows an example of a fully floating keyplate (no hinges), according to certain embodiments and as further described below.

Figure 78:
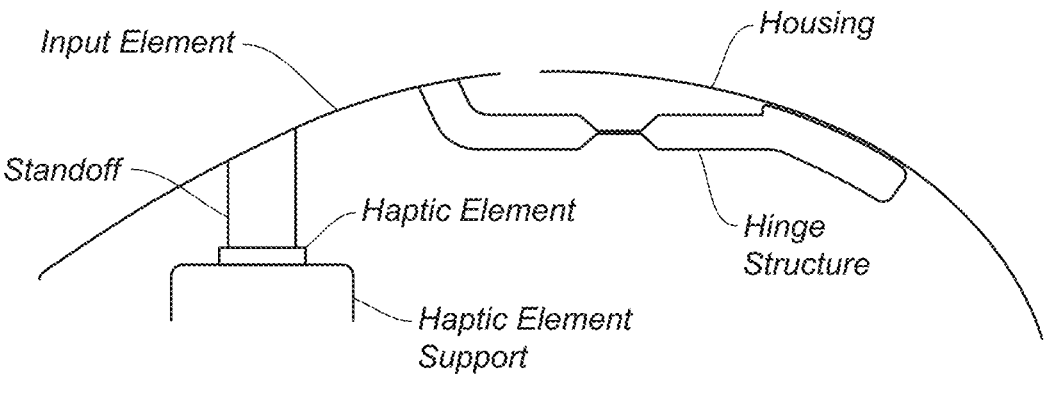
FIGS. 78-82 illustrate certain embodiments where the hinge couples the input element of the device to a structural support.
Figure 79:
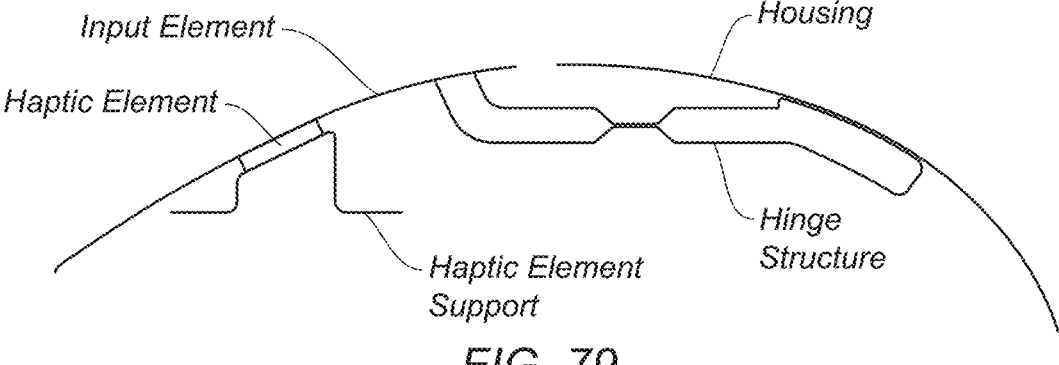
Figure 80:
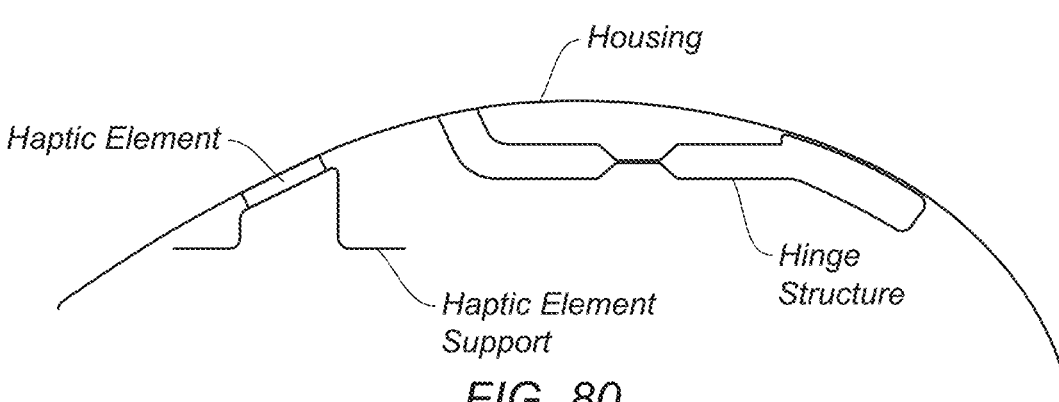
Figure 81:
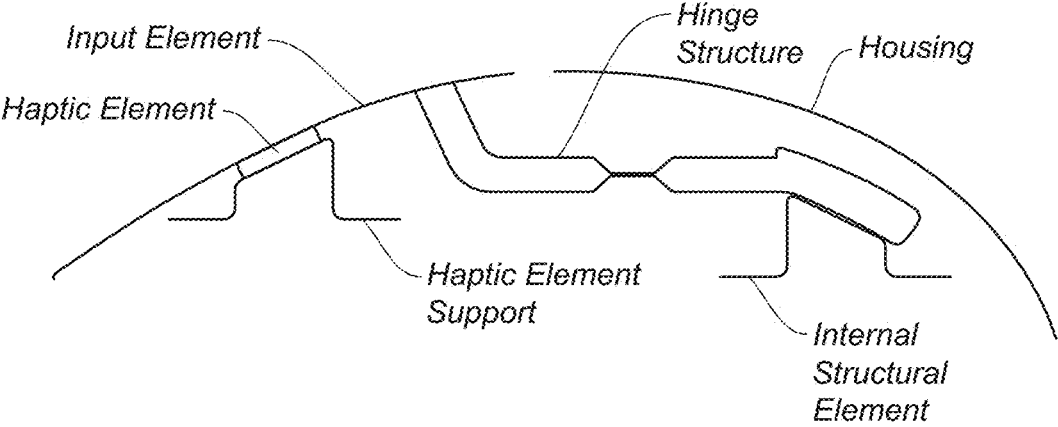
Figure 82:
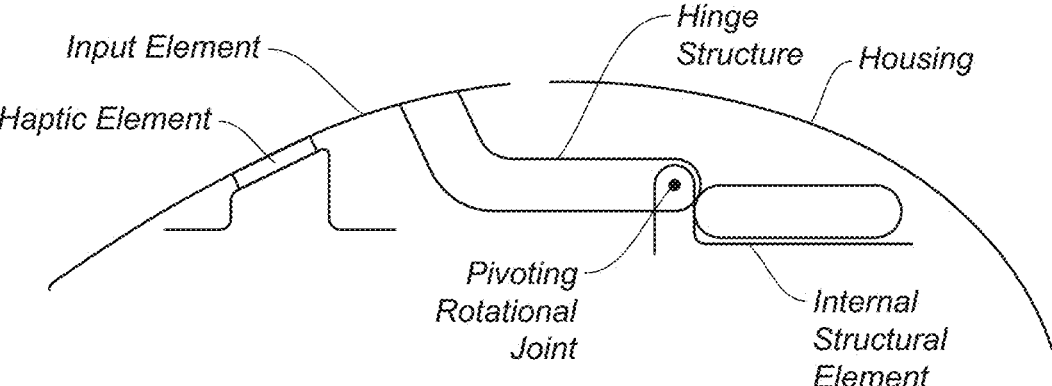

FIGS. 78-82 illustrate certain embodiments where the hinge couples the input element of the device to a structural support. The hinged input element may be physically separated from the top case, as shown in FIGS. 78, 79, 81, 82, or the hinged input element may be integrated with the top case, as shown in FIG. 80. In FIG. 78, an embodiment includes a hinge with a necked (or thinned) region, where the hinge can bend, a front portion of the hinge coupled to the input element, and a rear portion of the hinge coupled to the top case. A standoff is coupled (or integrated) with the input element and a haptic generating element is coupled to the standoff for transmitting (and in some instances receiving) movement and/or force and/or vibration to (or from) the input element. The haptic generating element can be coupled directly or indirectly to structural elements of the device. In FIG. 79, an embodiment removes the standoff shown in FIG. 78, and the haptic generating element is coupled directly to the input element. In FIG. 80 the input element and the top case are integrated (monolithic). In FIG. 81 the rear of the hinge is coupled to an internal structural element of the device. In FIG. 82 the hinge uses a pivoting rotational joint to enable movement, rather than a necked region. The hinges result in a lever action and act as a local stiffener. In certain embodiments, the hinges contribute to a quasi-linear increase in feedback upon deformation or deflection of the input element.

Figure 13A:
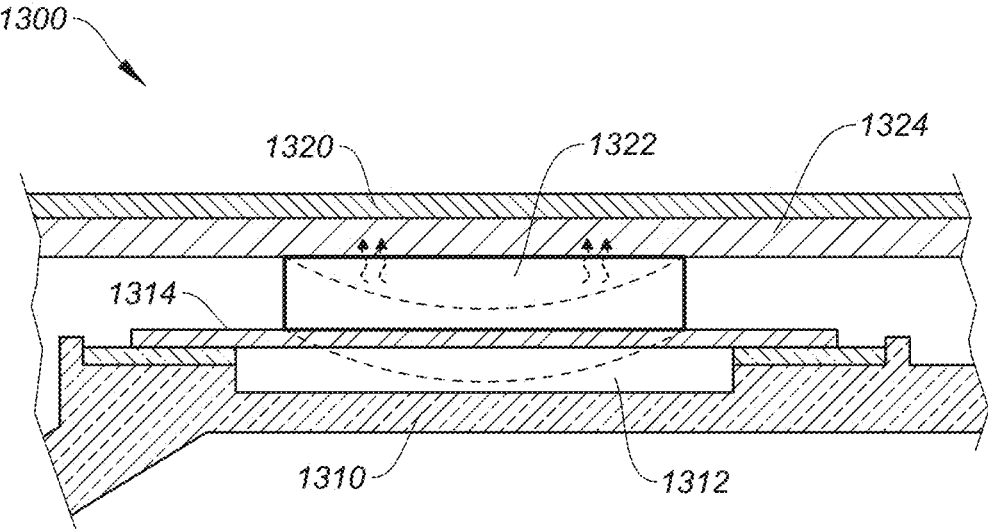
FIG. 13A shows a generic prior art system for coupling a haptic element to an input device.

FIG. 13A shows a generic prior art system 1300 for coupling a haptic element to an input device. As described above, a pre-loading force can be used to provide a robust mechanical contact and ensure adequate coupling between a haptic element and a corresponding input element to improve a transfer of haptic energy between them. System 1300 includes a haptic element 1322 (e.g., multi-layer piezoelectric element) supported by a carrier platform 1310 via one or more support structure(s) 1314. The support structure(s) 1314 can be a printed circuit board, a subchassis or other suitable substrate configured to support a haptic element. Support structure 1310 can include a cavity 1312 and support structure(s) 1314 includes an opening to allow haptic element 1322 to bend downward (e.g., when vibrating) into cavity 1312 to accommodate a full range of motion, or alternatively support structure 1314 can fully support the haptic element by providing a rigid-elastic foundation in such a manner that the energy is reflected upwards and towards the user. It is typical to apply compression to the combination of carrier platform 1310, support structure(s) 1314, and haptic element 1322, to create a preloading force so that haptic element 1322 is pressed against a bottom side of the input element 1324, and a robust mechanical connection is made and vibrational energy from haptic element 1322 may be efficiently transferred to input element 1324. One or more additional layers (e.g., silicone layer) may be provided above the input element, such as layer 1320.

Figure 13B:
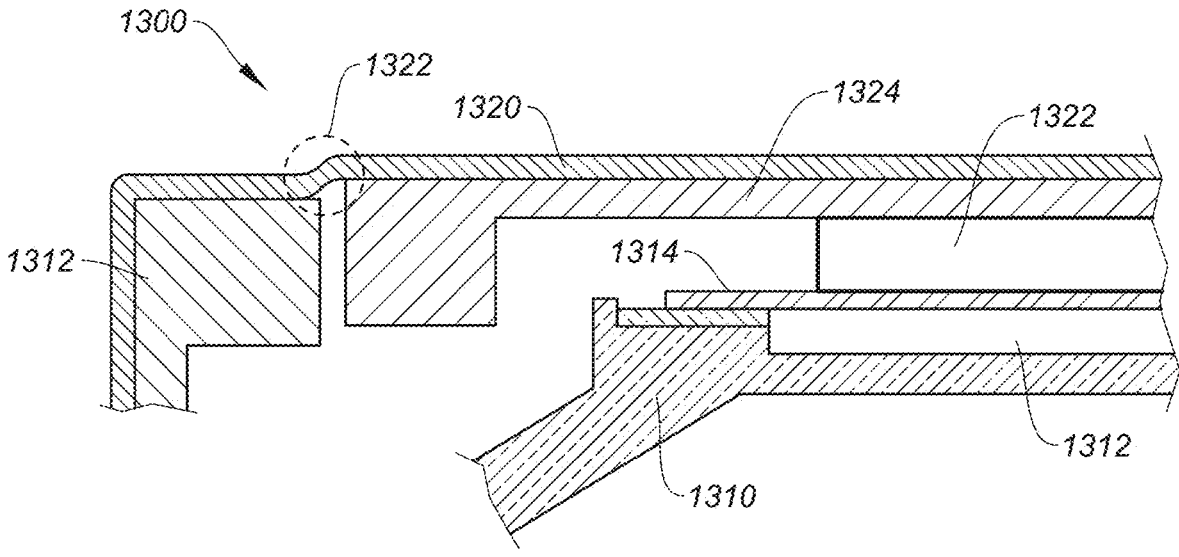
FIG. 13B shows a problem with certain prior art systems that use a preloading force.

FIG. 13B shows a problem with certain prior art systems that use a preloading force. A robust preloading force can ensure a good transfer of mechanical loads and vibrational energy from the haptic element to the input element (e.g., key cap, key plate), however a preloading force may cause the input element to move past a preferred at-rest (e.g., default) position, which can result in deleterious aesthetic and/or ergonomic effects. For instance, when the preloading force causes the top surface of the input element 1324 to move past the contour of a top surface of the housing 1312, creating a discontinuous and visible "step" 1322. Such as step may be propagated and further visually enhanced in any upper layer(s) 1320.

Various embodiments described herein (see, e.g., FIG. 14A-14C) overcome the shortcomings identified above and operate to both provide a good preloading force to ensure a good transfer of vibrational energy from a haptic element to an input element (e.g. keyplate), and to further prevent the input element from traversing past a desired position in its at-rest position. In some aspects, the at-rest position may be where the top surface of the input element is in surface alignment with the top surface of the housing (e.g., top case), as shown in FIGS. 14A-14C, or any suitable position (e.g., higher or lower than in alignment with the surface of the housing) as would be appreciated by one of ordinary skill in the art with the benefit of this disclosure.

Figure 14A:
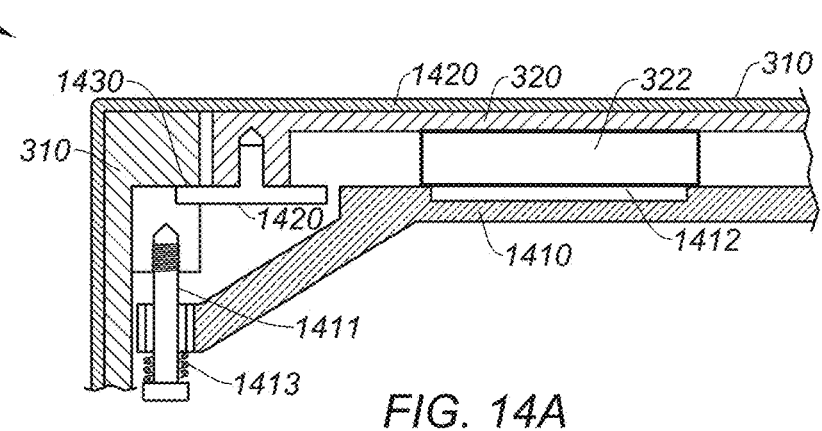
FIGS. 14A-14C show a keypress sequence on a system that provides and maintains a preloading force that pushes a haptic element against a keyplate and further operates to prevent the keyplate from extending past a predetermined position, according to certain embodiments.
Figure 14B:
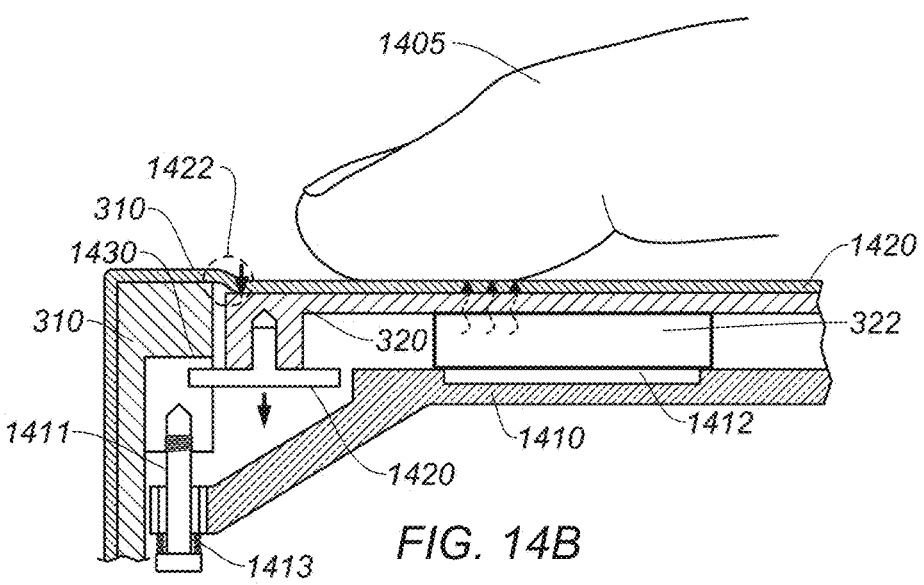
Figure 14C:
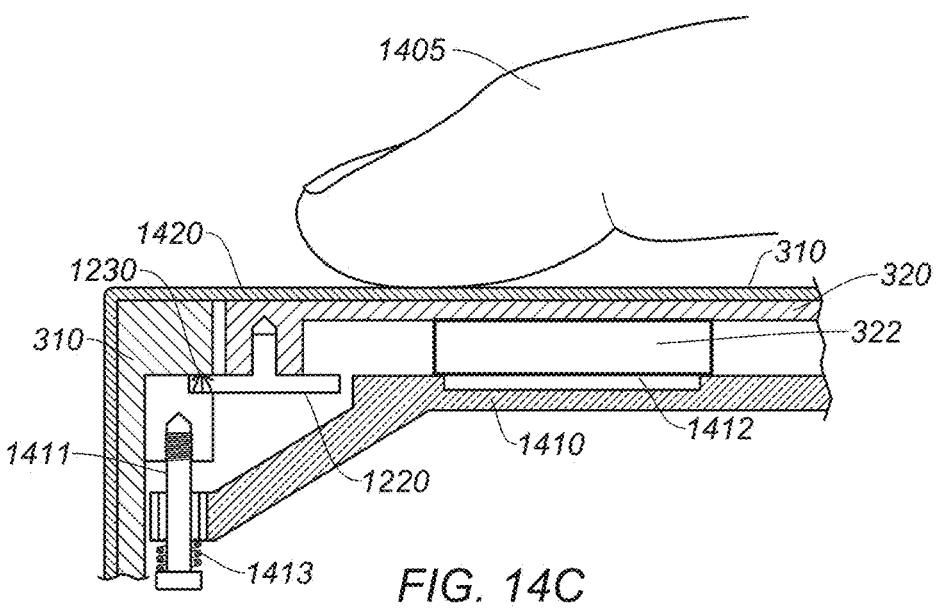

FIGS. 14A-14C show a keypress sequence on a system 1400 that provides and maintains a preloading force that pushes a haptic element 322 against a keyplate 320 and further operates to prevent the keyplate from extending past a predetermined position (e.g., default position), according to certain embodiments. In some cases, the predetermined position may be a desired position of the keyplate when at rest (e.g., no downward acting forces acting on the top surface of keyplate 320). In FIGS. 14A-14C, the predetermined position is a position where the top surface of the keyplate 320 is preferably aligned with a top surface of housing 310.

In FIG. 14A, system 1400 includes a housing 310 that may correspond to a top case for a computer mouse. Housing 310 includes a keyplate 320 disposed therein. A haptic element 322 (e.g., piezoelectric element) is supported by carrier platform 1410 via one or more support structure(s), which can be a printed circuit board, a subchassis or other suitable substrate(s) configured to support haptic element 322 and, in some cases, provide circuitry to enable communication between haptic element 322 and a control system, such as processor(s) 210 of system 200, a host computing device, or a combination thereof. The support structure(s) can include a cavity 1412 to allow haptic element 322 to move during excitations and deformation while supporting it by its edge and/or borders. A combination of carrier platform 1410 and haptic element 322 can be pushed up via a preloading force so that haptic element 322 is pressed against a bottom side of keyplate 320, and a robust mechanical connection is made and vibrational energy from haptic element 322 may be more efficiently transferred to keyplate 320. System 1400 further includes a limiter element 1420 operable to physically limit a movable range of the keyplate in one direction that, in the example of FIGS. 14A-14C, prevents the top surface of the keyplate from deflecting past a top surface of the housing due to the pre-loading force. A biasing system can be configured to couple the carrier platform 1410 to the housing 310 and provide a preloading force that pushes the haptic element 322 coupled to the carrier platform 1410 against the bottom surface of depressible keyplate 320. In some embodiments, the biasing system can include one or more mechanical fasteners 1411 that mechanically couple carrier platform 2410 to housing 310 and allows movement of carrier platform 1410 relative to housing 310 over a movable range. A biasing element 1413 can be coupled to 1410 and may be configured to be compressed or expanded (store mechanical energy) as the mechanical fastener is fastened to the housing. In some embodiments, biasing element 1413 is configured between a head of the mechanical fastener and the carrier platform. In further embodiments, the carrier platform itself can be a mechanical energy storing device (e.g., by introducing a flexible bracket or making the carrier itself a leaf spring), which when flexed provides a return biasing force that pushes carrier platform 1410 back up towards the bottom surface of the depressible keyplate 320. One of ordinary skill in the art with the benefit of this disclosure would appreciate the many modifications, variations, and alternative embodiments thereof.

A combination of the compressed biasing element and mechanical fastener may provide the preloading force that pushes the haptic element against the bottom surface of the depressible keyplate. A combination of the keyplate 320, haptic element 322, and carrier 1410 are operable to be depressed together in response to a pressing force on the top surface of the keyplate. The biasing element 1413 may provide a restoring force (the stored mechanical energy) that, once a user pressing force is removed from the keyplate, causes the combination of the keyplate, haptic element, and carrier to move from any depressed position of the movable range back toward a neutral position where the keyplate is at rest (e.g., no pressing force from a user). To ensure that the top surface of the keyplate is in alignment with the top surface of the housing at a neutral position and does not extend beyond the position due to the preloading force and/or the restoring force, limiter element 1420 extends laterally and comes into contact with a lip of housing 320 at 1430 that prevents the keyplate from moving upward any further. In some embodiments, a tuning element may be used to set where the limiter element 1420 contacts the lip of housing 320. For example, limiter element 1420 may be coupled to keyplate 320 via a threaded complementary relationship so that limiter element 1420 can be adjusted upwards or downwards into the keyplate to set a desired height of keyplate where upwards mobility is stopped. Limiter element 1420 can be a stopper and can be coupled to keyplate 320 via threaded fit, compression fit, adhesive, or any other suitable method of connection, and preferable with an adjustable implementation to fine tune the relationship between the top of the keyplate and housing when the keyplate is at rest. Although the goal of some of the embodiments described herein is to configure the system 1400 to ensure alignment of the top surfaces of the keyplate and housing, any suitable configuration of the top-most position of the keyplate can be set as would be appreciated by one of ordinary skill in the art with the benefit of this disclosure.

Referring back to the sequence, system 1400 is shown at rest in FIG. 14A, where the tops of keyplate 320 and housing 310 are aligned so the transition between the two appears as a continuous contour. Layer 1420 also exhibits a continuous contour with no discontinuities or steps, as shown in FIG. 14B. In FIG. 14B, a user 1405 provides a downwards force on the top of keyplate 320 causing it to be depressed, along with the combination of carrier platform 1410, any support structures, and haptic element 322. Mechanical fastener 1411 allows movement downward and biasing element 1413 begins compressing and storing energy. The depressed relationship of the keyplate 320 with respect to the housing 310 is made evident by the step 1422 between the two elements. Once user 1405 reduces or removes the downward force, the restoring force of biasing element 1413 pushes carrier platform 1410 back up to the neutral position. In FIG. 14C, the carrier platform 1410 continues to move back towards the neutral position until a portion of the limiter element 1420 contacts the lip 1430 of housing 310 and prevents further upwards movement, thus preventing the keyplate from moving beyond a desired neutral position such that a continuous contour between the top of the keyplate 320 and housing 310 is maintained.

Figure 40:
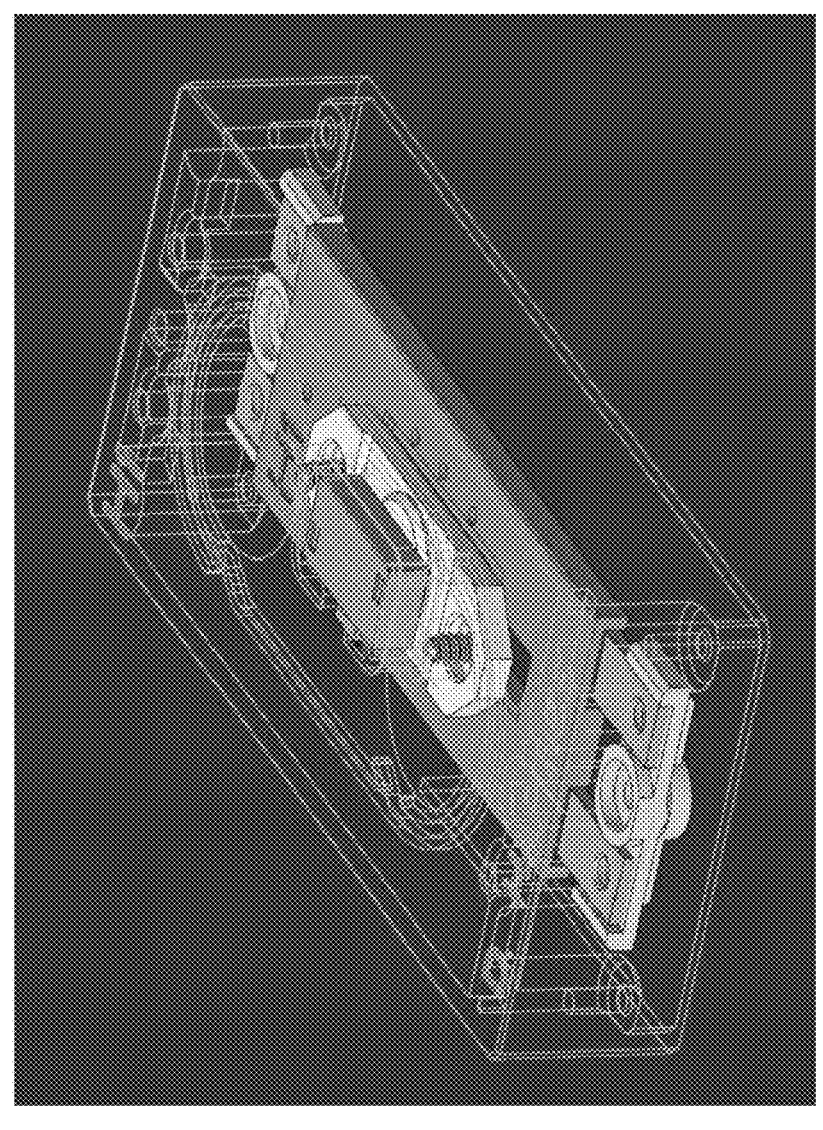
FIGS. 40-42 show an example of a haptic device with a touch surface that is locally tuned to respond at a given resonance frequency by integrating a spring in the surrounding and static region, according to certain embodiments.

In some embodiments, the limiter element can be any form of a "stopper" device between the keyplate 320 and the housing (e.g., top case), which allows the key plate to move down without resistance from the limiter element, but prevents the keyplate from moving up past a certain position dictated by where the limiter element contacts the housing (e.g., where the tops of housing 310 and keyplate 320 are in planar alignment). In some embodiments, the contact may be made between the housing and the carrier support instead of the keyplate or other feature, provided that the same function occurs. The limiter element can be rigid, flexible (e.g., spring loaded, soft bumpers), a piston type (e.g., pogo pin, reversed pogo pin), or other suitable mechanical structure. In some cases, the limiter element can be coupled to the key plate, housing (e.g., top case), a clicking module, a sub-chassis, the bottom case, or other suitable location, as would be appreciated by one of ordinary skill in the art with the benefit of this disclosure. In some cases, the limiter element can be a separate entity that is coupled to one or more of the various elements, as described above. In some cases, the limiter element may be integrated with the keyplate (e.g., homogeneous part of the keyplate) or other features, e.g., as shown in FIG. 40. Any configuration can be used that provides a mechanical stop point to prevent the keyplate from moving up beyond a desired stopping point (e.g., typically a desired neutral position of the keyplate).

In certain embodiments, an efficient operation of haptic elements incorporates a permanent mechanical coupling between a keyplate and its corresponding haptic elements. The mechanical coupling may be configured over a preferred operating range that ensures good function of the haptic click device including internal loads and/or precompression. This can improve sensing and feedback transmissibility (e.g., no clearances or gaps for vibration transmission between the computer mouse and the user.

A haptic module (e.g., haptic element and supporting infrastructure) is kept with a permanent preload of compression between the computer mouse outer shell (e.g., the top case, keyplate, combination thereof), which may be comprised of one or more layered materials, and a sub-chassis or supporting element or structure (e.g., carrier platform).

A preload system can be achieved by a number of different systems, including interference designs, screw torque, bending and/or compression of flexible materials, a combination of mechanical elements, or the like. An interference design may have assembled parts intentionally designed to remain in a pre-compressed state through the product's life. A screw torque can be an interference design, cam design, or the like. Bending and/or compression of flexible materials can include a leaf spring, rubber washer, or the like. An example of a combination of mechanical elements can include a screw with a spring that engages a bracket or subchassis (e.g., similar in concept with a CPU cooler design).

Figure 15:
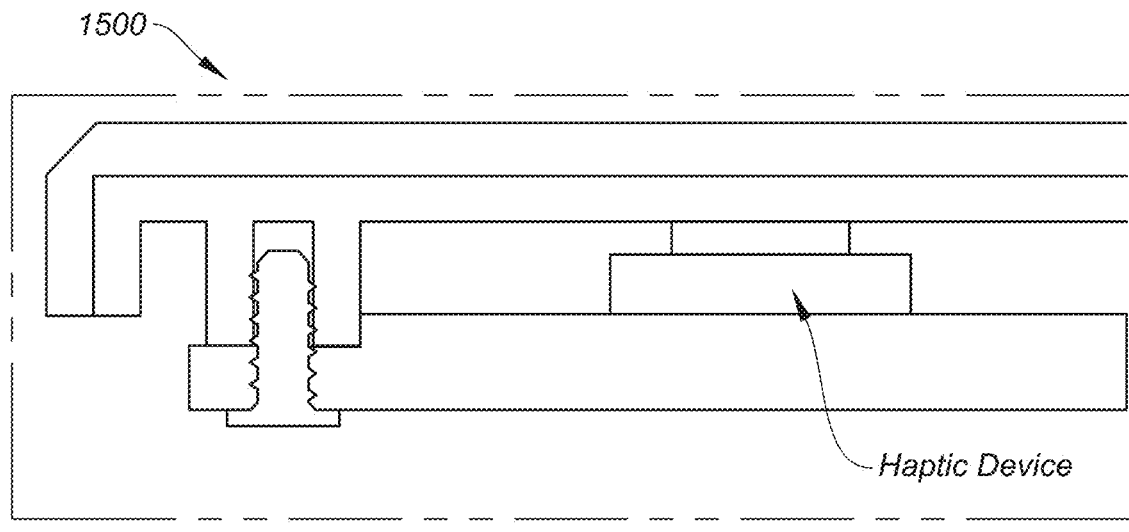
FIG. 15 shows a system that provides preloading at a mechanical interface between a support structure for a haptic element and a keyplate region, according to certain embodiments.
Figure 16:
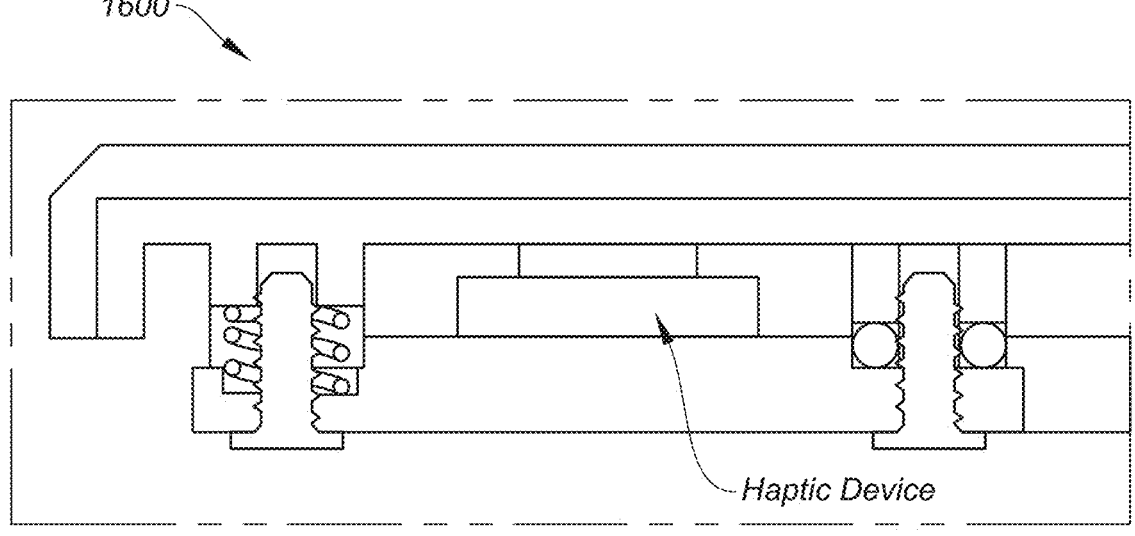
FIG. 16 shows a system that includes a compressible element to act as a biasing mechanism, according to certain embodiments.

FIG. 15 shows a system that provides preloading at a mechanical interface between a support structure for a haptic element and a keyplate region, according to certain embodiments. A preloading force is provided via one or more fasteners, similar to the various embodiments of FIGS. 14A-14C, although with a flexible carrier platform. The screw may be tightened as required to create the necessary force. A compressible element, such as a gasket, spring, o-ring, locking washer, deformable mounting points, and intentionally design flexible assembly elements, may be positioned between the support structure and the adjacent portion of the housing to which it is being moved towards by the tightening of the screw to act as a biasing mechanism, such as that shown in FIG. 16. In some embodiments, different compressible elements may be used at different connection points between the keyplate and support structure, as would be appreciated by one of ordinary skill in the art with the benefit of this disclosure. In some embodiments, the carrier platform can be flexible (e.g., elastic subchassis) that can couple and transmit the loads from the keyplate to the sensing element, while introducing preload in the system, thereby ensuring continuous contact and preload to the haptic element in any condition. The elastic subchassis can be tuned by design to perform with specific static (e.g., intended stiffness) and dynamic behavior (e.g., tuned resonant frequencies). This carrier can include keyplate lift preventing features as described above. Both the preload and lifting prevention features can be shared in the same elements or be a separate module attached to the keyplate.

Figure 17:
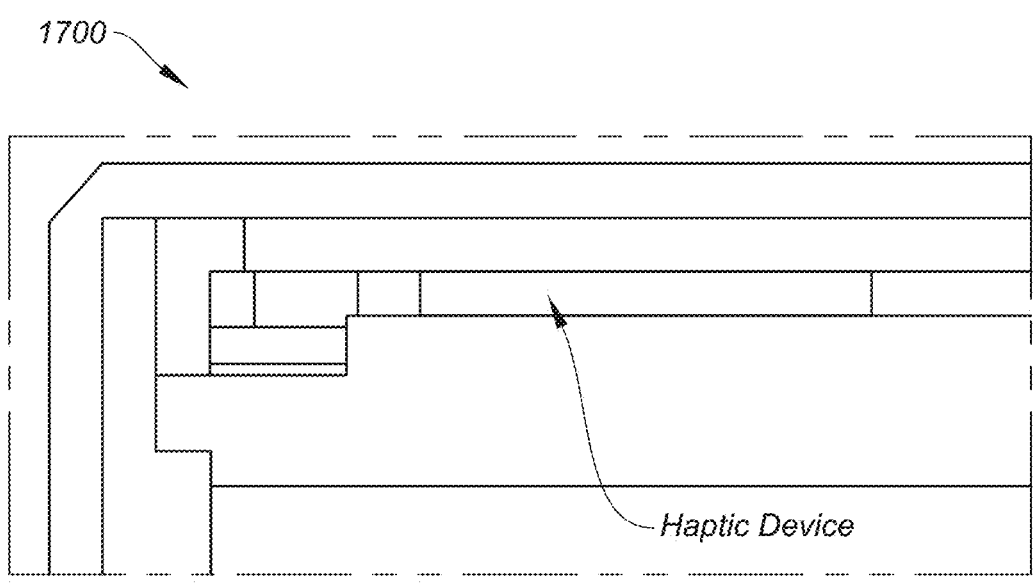
FIG. 17 shows a system that provides preloading via a slotted recess in the housing, which the haptic element support structure slots into, according to certain embodiments.

FIG. 17 shows a system that provides preloading via a slotted recess in the housing, which the haptic element support structure slots into, according to certain embodiments. The slot restricts movement of the support structure below a certain point (and in at least one sideways direction, as shown in the figure), and in the restricted position, applies a preload force between the haptic element or the sensing element, and the keyplate. The support structure may move freely up, within the slot, or in embodiments a compressible material may be used in the slot above the support structure to provide a dampening or restrictive force against the support structure moving up further into the slot. In certain embodiments, the system of a preloaded support structure, haptic element, keyplate and housing element can be a stand-alone module. For example, the housing that contains the slot may be a component separate from the overall mouse housing. An assembled, preloaded haptic system could then be coupled to a computer mouse housing.

Figure 18:
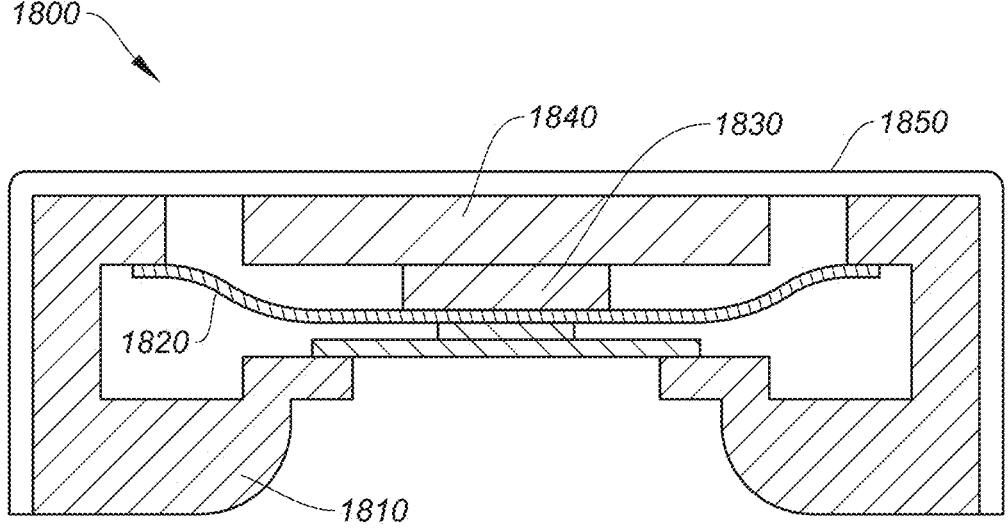
FIG. 18 shows a keyplate system with a leaf spring-type biasing system, according to certain embodiments.

FIG. 18 shows a keyplate system 1800 with a leaf spring-type biasing system, according to certain embodiments. Keyplate system 1800 includes a carrier platform/chassis 1810, a sensing element 1820 (e.g., haptic element) supported by carrier platform/chassis 1810, a biasing element 1830 braced against portions of the chassis and providing a preloading force on the haptic element 1820, a keyplate and extrusion 1840 for localization of the preloading force and/or the user input force to the center of the haptic element, and a soft and flexible top layer 1850. In this embodiment, the system flexibility and its means of storing mechanical energy is embedded in the carrier platform itself, taking the form of a leaf spring design. This spring design can prevent the system from pressing the keyplate upwards (e.g., not a stopper but a relief system) while allowing it to be pressed against the haptic element. Also, it transmits the user press, wherever it presses on the keyplate surface, to a single (or multiple) point load directly over the haptic element(s). The haptic elements are thus supported underneath the functional carrier and by other structural elements of the device (e.g., top case). In other words, the leaf spring takes the function of preloading the haptic element for better mechanical energy transfer. The upward load on the keyplate is then lower (or nulled in some cases) which can prevent the non-aesthetic stepping issue described above. A user input force on the keyplate is directed toward the haptic element for sensing. In some alternative embodiments, helicoidal compression springs or a flexible subchassis can be used instead of a leaf spring, as would be appreciated by one of ordinary skill in the art with the benefit of this disclosure.

Figure 19:
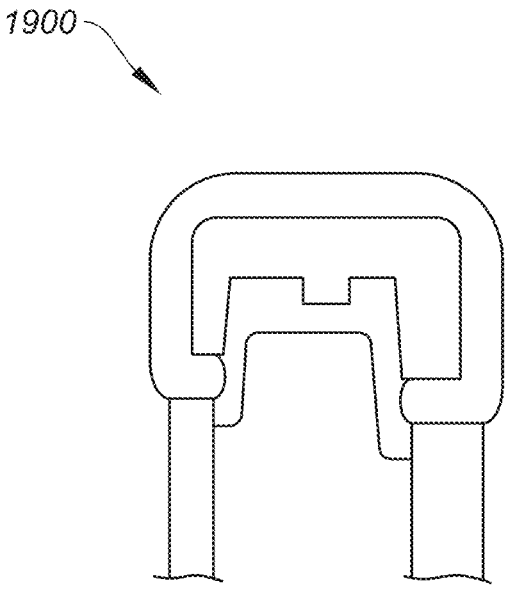
FIGS. 19 and 20 show a system that provides preloading via a flexibility of a soft top layer of a computer mouse, according to certain embodiments.
Figure 20:
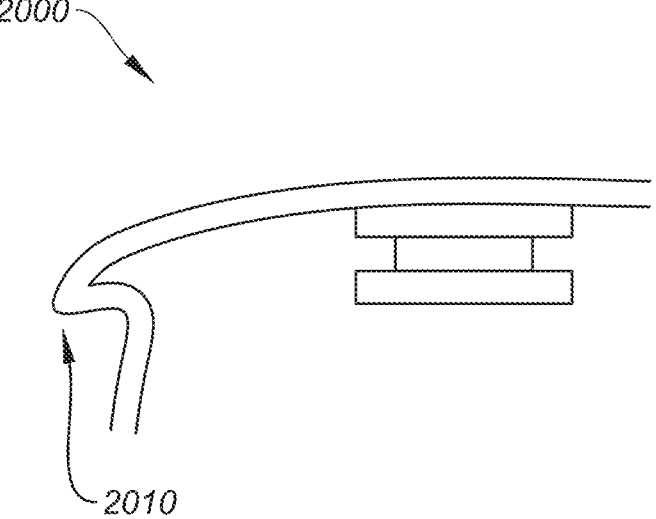

FIGS. 19 and 20 show a system that provides preloading via a flexibility of a soft top layer of a computer mouse, according to certain embodiments. The soft top layer is deformed upon assembly such that closing the mouse stretches the shell thereby inducing loads on its internal elements, including the haptic element, which creates a satisfactory preloading force. In FIG. 19, the soft material (which may also be stretchable) is layered in such a way that it is clamped under tension between the keyplates and surrounding structures, hence providing and maintaining a constant preload in the haptic system from its deformation. Upon assembly, the outside soft material stretches and preload of the keyplate onto the haptic element and/or sensor element is enabled. FIG. 20 represents a deformable layer encapsulating and enclosing the keyplate, either fully or locally. The layer includes a functional hinge, baffle type of deformation, that is stretched upon assembly in the computer mouse, thus at least partially contributing to the required preload, while allowing deformation and minimal movement of the keyplate upon user interaction. In operation, when the button is pressed, the compliant material (deformable layer) buckles down and folds over itself, which operates as a stopper on the way down.

The clicking module or haptic system can include the totality of electro-mechanical systems required to afford a functional interface, in a button type arrangement, that is fitted into the computer mouse structure. It is comprised of the haptic elements, being single or an array of multiple elements, related circuitry, and support backing structure, namely a subchassis or support bracket, as well as the keyplates. Other elements include the functional assembly or coupling elements, including those that provide and contribute to the required preload system, mechanical features such as interlocks or fasteners, and means of bonding, such as adhesives between layers or mounting features.

In some embodiments, a limiter element can be a stopper configured between the keyplate and haptic module carrier (e.g., carrier platform) or between the keyplate and the housing (e.g., top case), which allows the keyplate to move one direction (e.g., down) but prevents movement in another direction (e.g., up) beyond a threshold position (e.g., reference, resting, pre-compressed, etc.), as described above. Purposes of adopting such stoppers to restrict movable structures in such a way that the integrity of its components, e.g., sensing or haptic elements, is ensured under normal user conditions, for the sake of good UX, for retaining an ensuring preload at resting and unloaded position, to retain the aesthetic of a seamless device design, or avoid deformation of soft layers, e.g., silicone, beyond its recoverable strains. Furthermore, stoppers might be rigid or compliant, and can include compressible elements in such a way that the end-of-travel point is well demarcated or more progressively achieved. These stoppers can also integrate or act as impact and acoustic dampers.

In some aspects, the limiter element can be stoppers configured as a keyplate lifting prevention system that blocks movement of the keyplate. For instance, the limiter element can be a screw, plastic feature, heat stake, feature or secondary part coupled to the keyplate, etc., that engages with the housing (e.g., top case) in a manner that prevents the keyplate from moving upwards beyond a threshold position. In certain embodiments, the threshold position is where a top of the keyplate is in alignment with a top of the housing (e.g., top case) such that the transition between the two is coplanar or continuous such that there are no discontinuous steps or contours between them, as described above. Limiter elements can be coupled to the housing (e.g., top case or bottom case), clicking module, a subchassis (e.g., underneath, independent of the clicking module), or any combination thereof.

Figure 21:
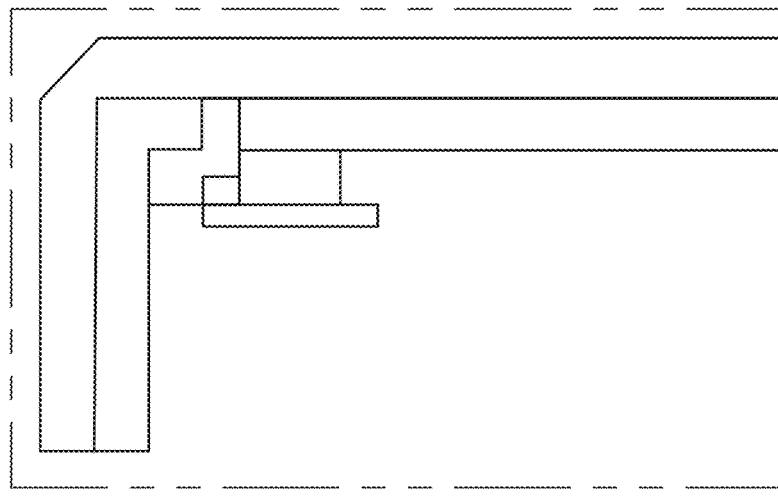
FIGS. 21-22 show the use of a washer or screw-type limiter element configured to prevent movement of a keyplate in one direction beyond a threshold position, according to certain embodiments.
Figure 22:
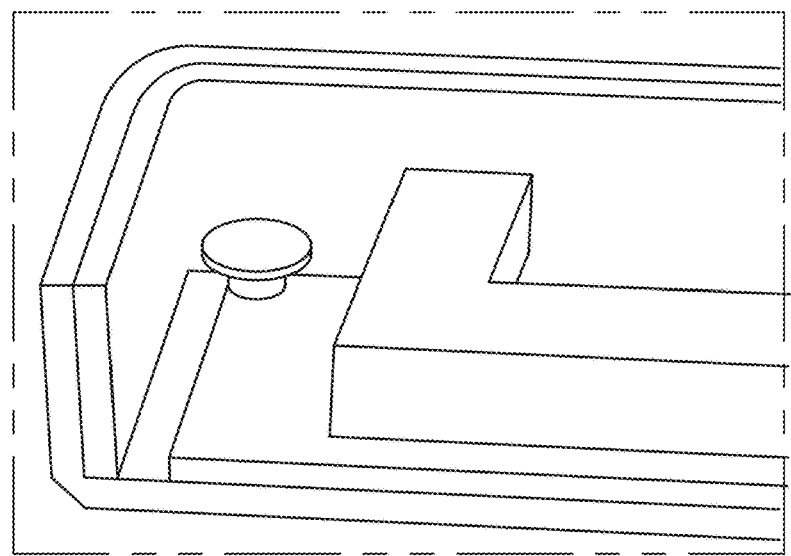
Figure 23:
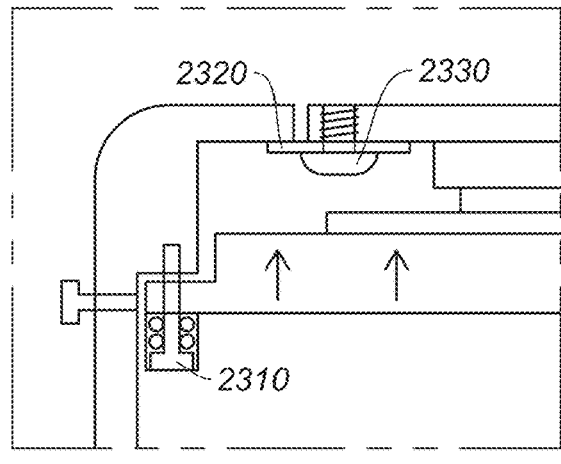
FIG. 23 shows another variation of a washer or screw-type limiter element, also integrating a compressible element, according to certain embodiments.

FIGS. 21-22 show the use of a washer or screw-type limiter element configured to prevent movement of a keyplate in one direction beyond a threshold position, according to certain embodiments. FIG. 23 shows another variation of a washer or screw-type limiter element, also integrating a compressible element, according to certain embodiments. In this latter case, adoption of compression elements can act as an impact and acoustic damper, while effectively benefitting the UX of using a device with such design.

Figure 24:
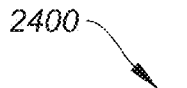
FIG. 24 shows a keyplate system with a limiter element that is coupled to the keyplate via a clipping mechanism, according to certain embodiments.
Figure 24:
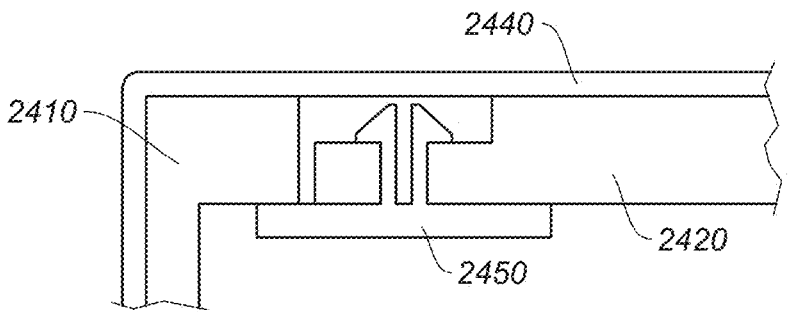

FIG. 24 shows a keyplate system 2400 with a limiter element 2450 that is coupled to the keyplate 2420 via a clipping mechanism. The limiter element 2450 includes a laterally protruding portion that prevents movement of the keyplate 2420 above a position where the limiter element 2450 contacts the top case/chassis 2410, thereby preserving an ergonomic continuous contour between the keyplate 2420 and housing 2410 when keyplate 2420 is in a default position. The limiter element 2450 passes through a portion of keyplate 2420 and anchors to it with a clip. Any suitable hardware can be used to secure the limiter element 2450 to keyplate 2420.

Figure 25:
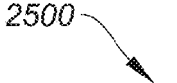
FIG. 25 shows a keyplate system that includes a keyplate with an integrated limiter element, according to certain embodiments.
Figure 25:
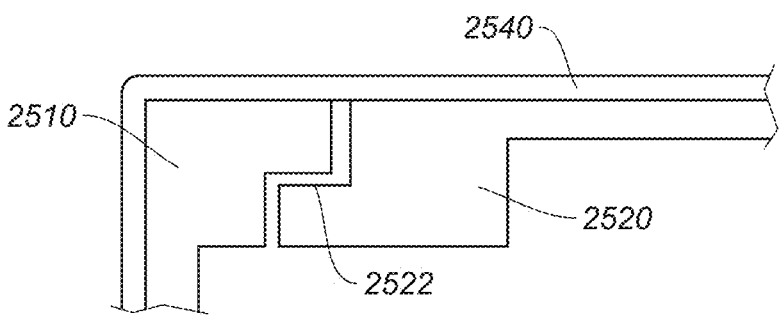

FIG. 25 shows a keyplate system 2500 that includes a keyplate 2520 with an integrated limiter element 2522, according to certain embodiments. Limiter element 2522 is part of keyplate 2520 and protrudes laterally, forming a monolithic structure. The limiter element 2522 prevents movement of the keyplate 2520 above a position where the limiter element 2522 contacts the top case/chassis 2510, thereby preserving an ergonomic continuous contour between the keyplate 2520 and housing 2510 when keyplate 2520 is in a default position.

Figure 26:
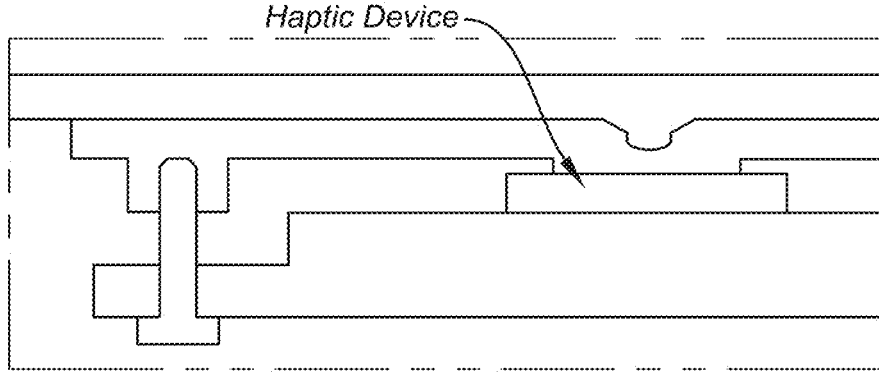
FIGS. 26-28 show aspects of a stepped limiter element and a carrier platform, according to certain embodiments.
Figure 27:
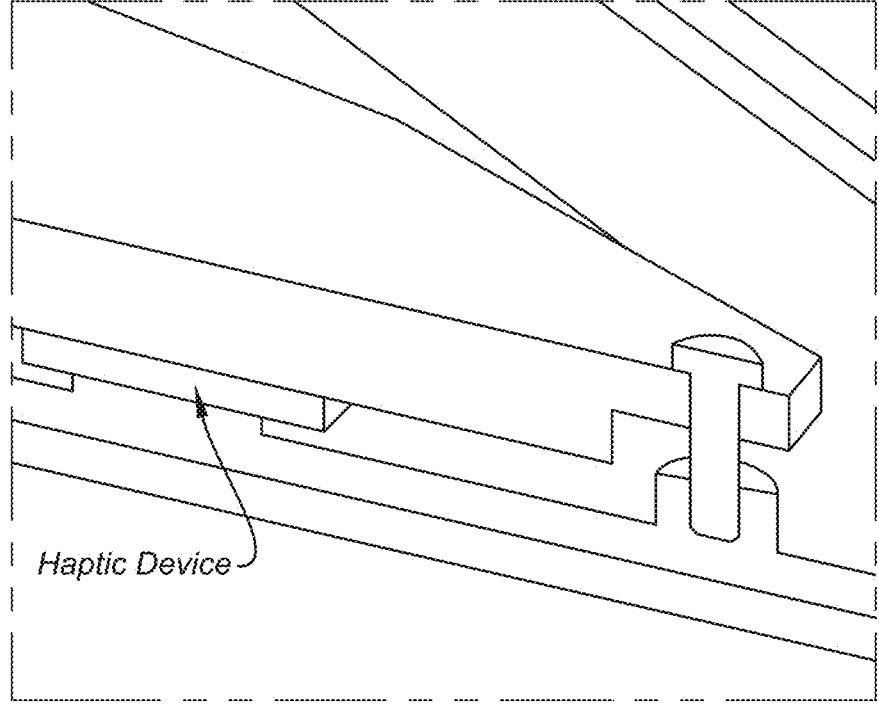
Figure 28:
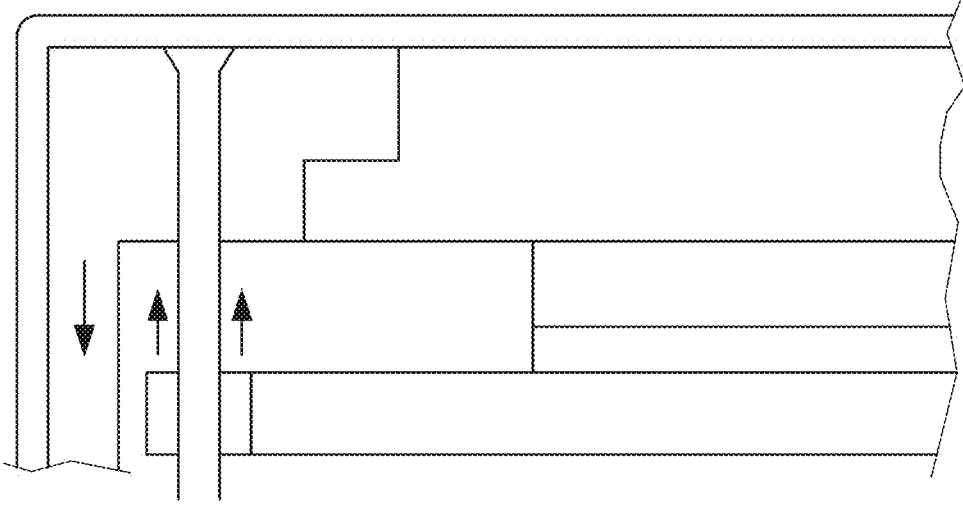

In certain embodiments, a keyplate lifting prevention system can utilize a piston or sliding pin that engages with the carrier platform or chassis (e.g., sub-chassis, internal portion of input device) and couples to the keyplate (e.g., bonded, fastened, etc.). FIGS. 26-28 show aspects of a stepped limiter element, as shown in FIG. 25, and a carrier platform, which controls the movement of the system in all axes except vertical that is configured to prevent shear and damaging loads to the haptic or sensing elements, as well as side movement at the keyplate surface.

In certain embodiments, a keyplate lifting prevention system can utilize a clip that engages with the carrier platform or chassis (e.g., sub-chassis, internal portion of input device, etc.) rather than the top case, as would be appreciated by one of ordinary skill in the art with the benefit of this disclosure.

Figure 29:
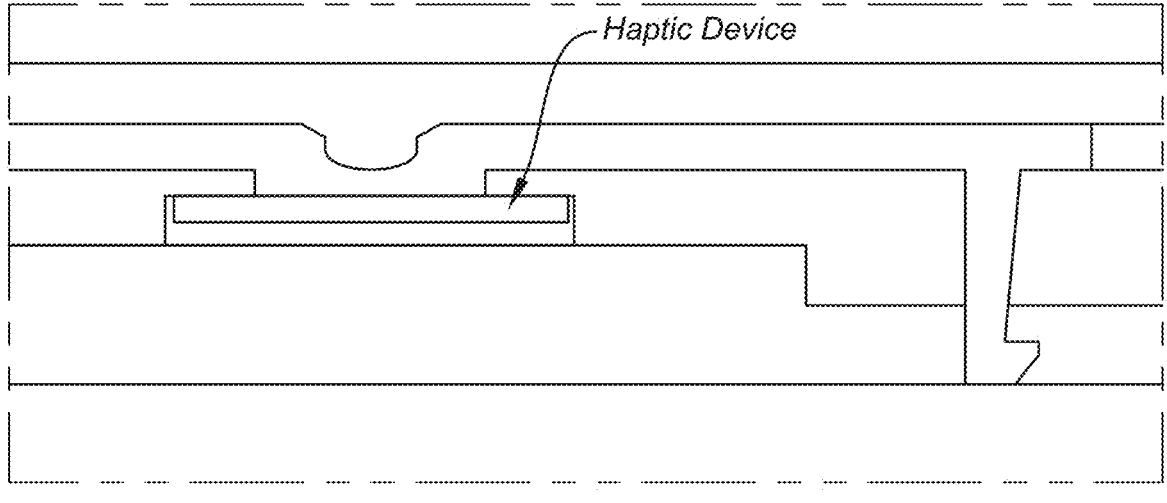
FIGS. 29-30 show examples of how a clip can be used in a keyplate lifting prevention system, according to certain embodiments.
Figure 30:
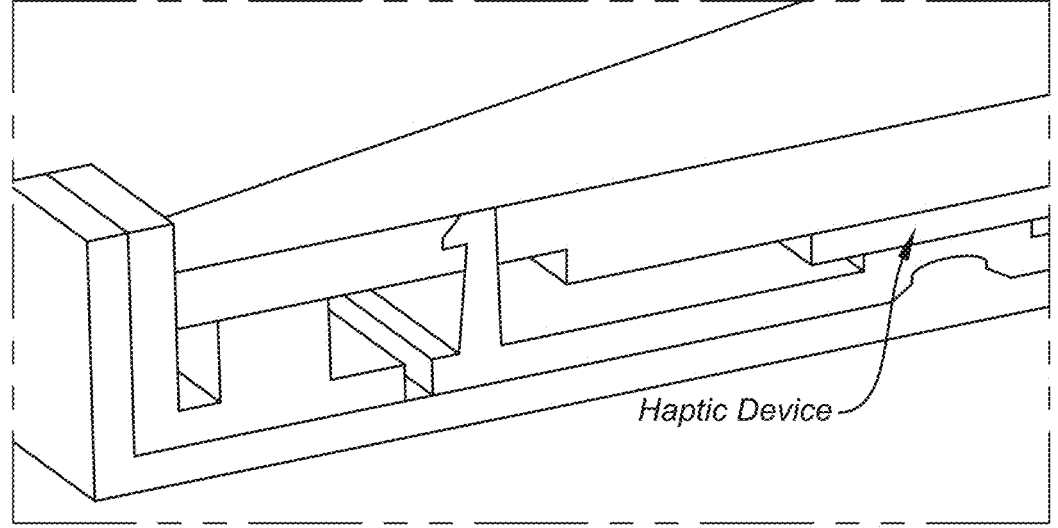

FIGS. 29-30 show examples of how a clip can be used in a keyplate lifting prevention system, according to certain embodiments. This system integrates the stopper in the form of a keyplate feature that clips directly to the carrier. This reduces the number of elements required and facilitates assembly of the system architecture. The feature prevents the keyplate from moving vertically away from the carrier, effectively working as a stopper, while still allowing and guiding the keyplate compressing the haptic elements upon user press. FIG. 30 also includes a soft element (e.g., o-ring or soft gasket) that allows compliance in the system to take in the tolerances and required compression loads between the rigid elements (e.g., keyplate coupled to the carrier).

In peripheral hinged keyplate design, a keyplate can be hinged around a portion, or all, or in most of, if not all of, its periphery via a soft and/or elastic compliant member. The soft and/or compliant member may be coupled to an external surface of the keyplate at a variety of locations, such as the side portions, top portion, bottom portion, or a combination thereof. Similarly, the soft and/or compliant member may be coupled to another supporting member and/or surface of the device at a variety of locations (internally and/or externally) and/or portions of the top case. For example, the keyplate may be coupled to the top case and/or the sides of the computer peripheral device via a flexible and/or compliant silicon material. FIGS. 31A-31D show some variations of peripherally hinged keyplates, according to certain embodiments. These embodiments represent different ways of coupling the soft and/or compliant member to and/or between the relatively rigid elements of the device, facilitating at least some movement of the input of input element. The soft and/or compliant material can act as a gasket, fully or partially sealing the boundaries of the input element, and coupling it to the device. In certain embodiments, the soft and/or compliant material can absorb shocks and/or vibrations, providing a form of mechanical isolation between elements. The properties of the soft and/or compliant material may be tuned and/or modified in different locations to provide different levels of mechanical isolation, and/or absorb specific frequencies. The soft and/or compliant material may be homogeneous, heterogeneous, and/or contiguous with other materials. The soft and/or compliant material may be bonded directly to two elements that are to be coupled, and an intermediary material may be used (the intermediary material may be soft and/or compliant or rigid). Further, the soft and/or compliant material may be coupled to another soft and/or compliant material, directly and/or via an intermediary material.

Figure 31A:
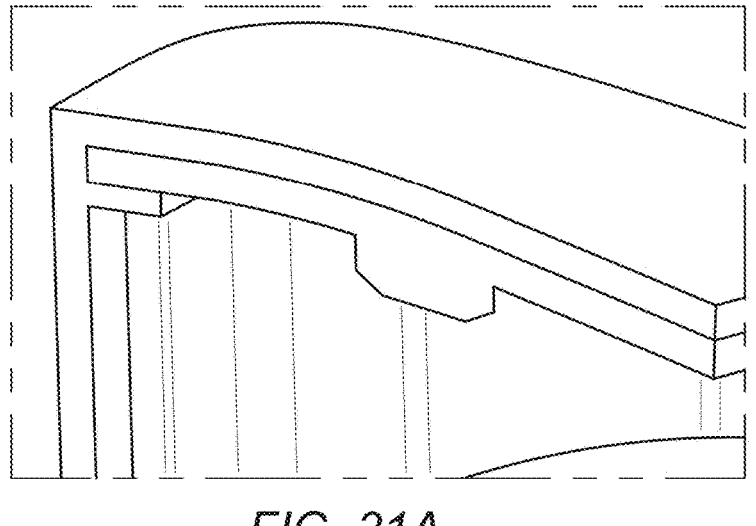
FIG. 31A shows how a soft and/or compliant material couples a keyplate and an adjacent generally rigid and perpendicular sidewall of a computer mouse, according to certain embodiments.

FIG. 31A shows how a soft and/or compliant material couples a keyplate and an adjacent generally rigid and perpendicular sidewall of a computer mouse, according to certain embodiments. The soft and/or compliant material is bonded to the keyplate and to the adjacent sidewall. A portion of the soft and/or compliant material is positioned between what would otherwise be abutting surfaces of the keyplate and sidewall. The soft and/or compliant material between the otherwise abutting surfaces may be the same as the soft and/or compliant material bonded or compliant bonded to the keyplate and sidewall, or it may be different. For example, a double shot manufacturing process may be used. Further, the properties of the soft and/or compliant may be different at different locations. For example, it may have a very high level of compliance on the top (where a user rests their 'clicking' finger, have a moderate level of compliance between the otherwise abutting surfaces, and a low level of compliance where bonded to the sidewall (where a user rests their thumb). The thickness of the soft and/or compliant may be consistent at its various locations.

Figures 31B, 31C, 31D:
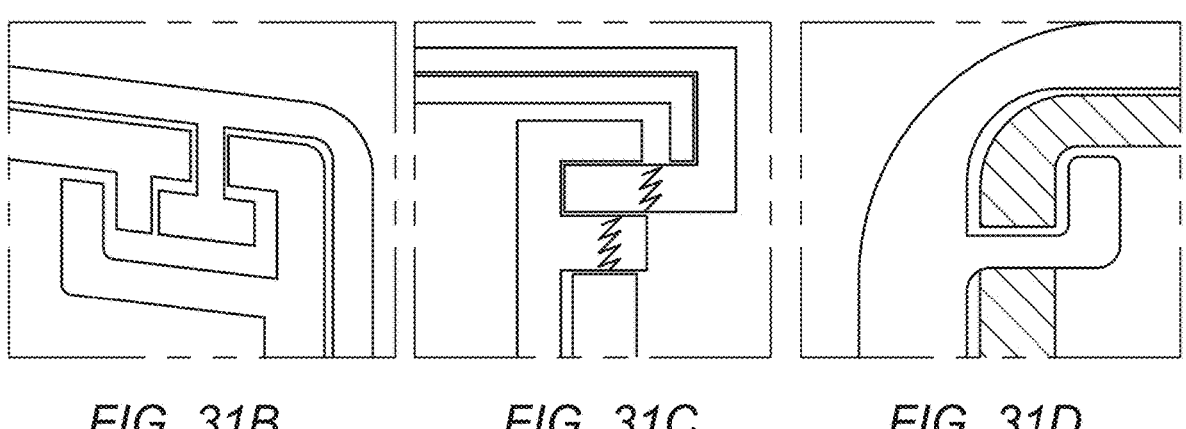
FIG. 31B shows how the top surface of the keyplate is generally planar with the abutting portion of the computer mouse housing, according to certain embodiments.
FIG. 31C includes a keyplate that extends around the end of the device housing, hooking under a protruding edge of the housing, according to certain embodiments.
FIG. 31D shows a keyplate that wraps around from to top plane to a side plane, according to certain embodiments.

FIG. 31B, similar to FIG. 31A, shows how the top surface of the keyplate is generally planar with the abutting portion of the computer mouse housing, according to certain embodiments. A lip is included under each of the abutting surfaces, which the soft and/or compliant material extends into. There can be a cavity (enclosed or open) under the area where the soft and/or compliant material extends into. The soft and/or compliant material may not be bonded to the top case or keyplate in this region. When the keyplate moves down, the extended soft and/or compliant material can move into this cavity or be compressed within it. There may also be a portion of the keyplate that protrudes down, at least partially adjacent to the extended portion of the soft and/or compliant material. In some cases, the soft and/or compliant may not be bonded to this keyplate protrusion. A retention guide can be coupled to the housing of the device, and can engage with the keyplate protrusion to restrict movement of the keyplate in at least one direction.

In FIG. 31C, the keyplate extends around the end of the device housing, hooking under a protruding edge of the housing, according to certain embodiments. Soft and/or compliant material is sandwiched between the keyplate and housing on top and side surfaces of housing. The keyplate and housing are in contact where the keyplate wraps around under housing, preventing the keyplate from moving up, but allowing the keyplate to move down. There may also be a gap between the end of the hooked keyplate portion and the housing, so that at least some lateral (side-to-side) movement of the keyplate can be possible. That gap area may also be filled with soft and/or compliant materials, still enabling movement, but dampening it.

In FIG. 31D, the keyplate wraps around from to top plane to a side plane, according to certain embodiments. The keyplate abuts the sidewall of the housing on the side plane. The soft and/or compliant material is bonded to the external surface of the keyplate and housing sidewall, and extends into the region where the keyplate and housing sidewall abut. A further portion of the soft and/or compliant material extends along and is bonded to an inner surface of the keyplate.

In a floating keyplate design, the keyplate can be fully detached from a rigid connection to the external housing (e.g., top case) and fully supported by an underlying module below, according to certain embodiments. For example, FIG. 14A-14C show a keyplate fully supported by a carrier platform with no rigid mechanical coupling between the keyplate and the surrounding top case, as further described above.

A floating keyplate design is also shown in FIGS. 11 and 12 as previously described, according to certain embodiments. FIG. 11 shows soft and/or compliant material extending across a keyplate and a housing of a computer mouse and bonded to both, according to certain embodiments. The thickness of soft and/or compliant can vary, depending on its location and desired properties. In some cases, a depression in a keyplate where haptics can be mounted may be filled with soft and/or compliant material.

Figure 32A:
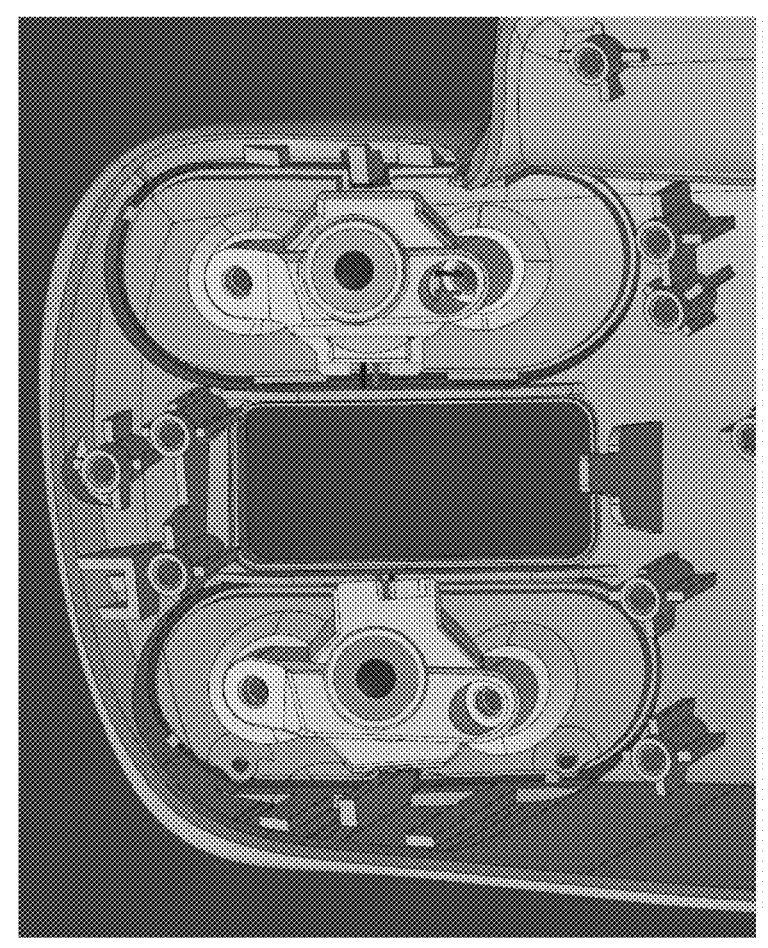
FIG. 32A shows an implementation of a haptic element in a keyplate with side hinged keys from the area around the wheel opening, according to certain embodiments.

FIG. 32A shows an implementation of a haptic element in a keyplate with side hinged keys from the area around the wheel opening, according to certain embodiments.

Figure 32B:
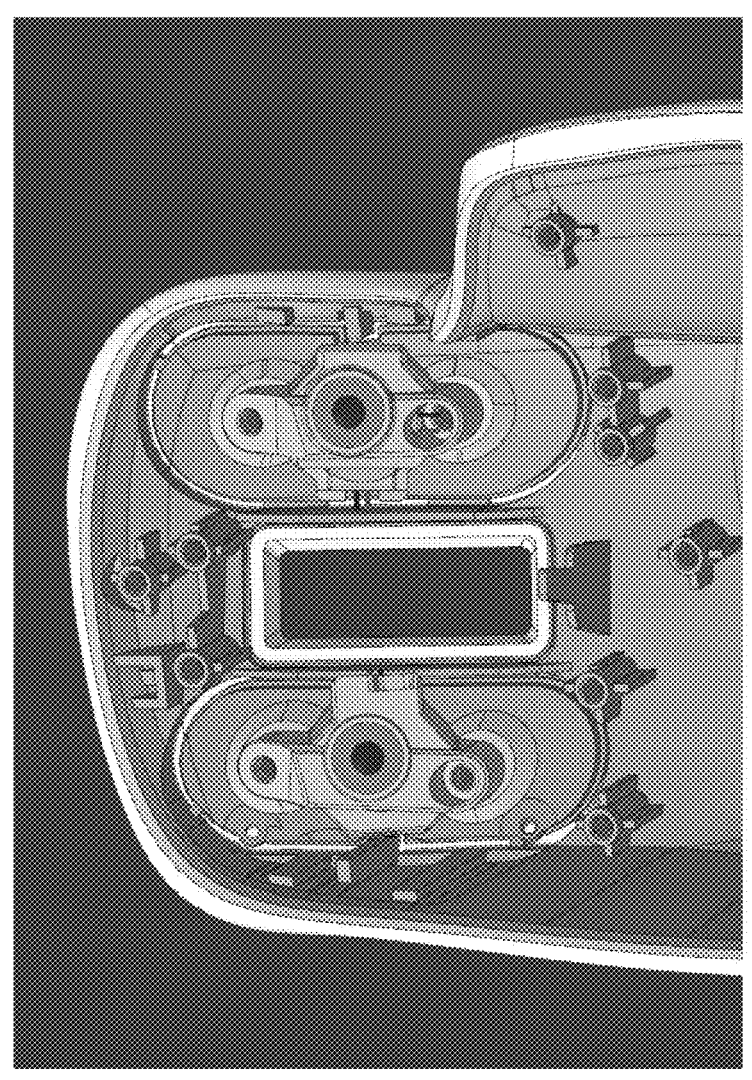
FIG. 32B shows an implementation of a haptic element in a keyplate design overlayed by a soft compliant material, according to certain embodiments.

FIG. 32B shows an implementation of a haptic element in a keyplate design similar to FIG. 47A but overlayed by a soft compliant material, according to certain embodiments.

Figure 33:
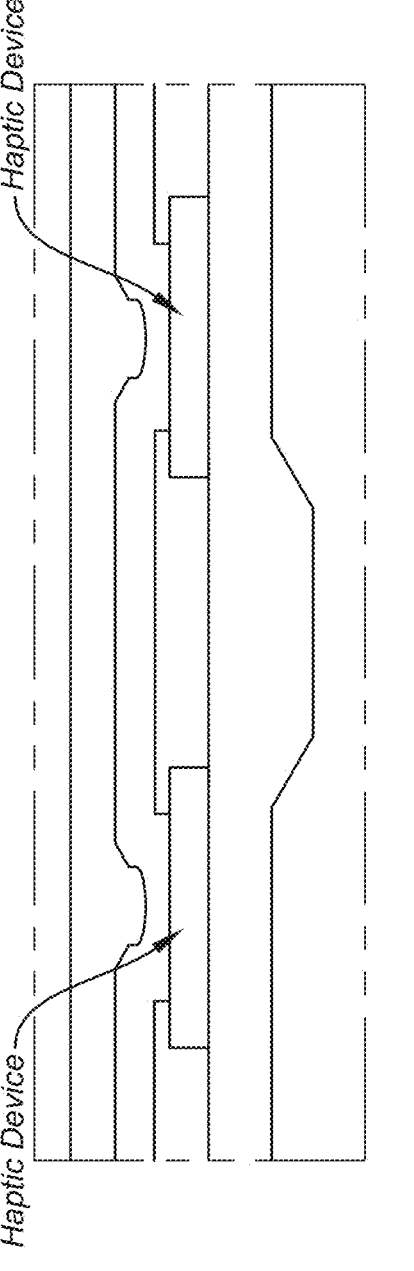
FIG. 33 shows an example of multiple haptic elements mounted on a common carrier support structure, according to certain embodiments.

FIG. 33 shows an example of multiple haptic elements mounted on a common carrier support structure, according to certain embodiments. The two haptic elements are in contact with the keyplate at two different locations. The common carrier support structure may provide a preload force (e.g., compression force) to make good mechanical contact between the haptic elements and the keyplate. Further, carrier support structures in general (regarding of how many haptic elements they support) may be one piece, or a combination of multiple pieces coupled together.

In some alternative embodiments, reversed designs can be implemented that utilize less tolerance stacking, fewer parts, and a simpler design, according to certain embodiments. Such embodiments can be actuated from below as a reaction force of pressing down on a pressable area. The haptic elements may be directly assembled on to the bottom of the keyplate. Actuators can be configured underneath structures of the mouse, such as a sub-chassis or bottom case.

Figure 34:
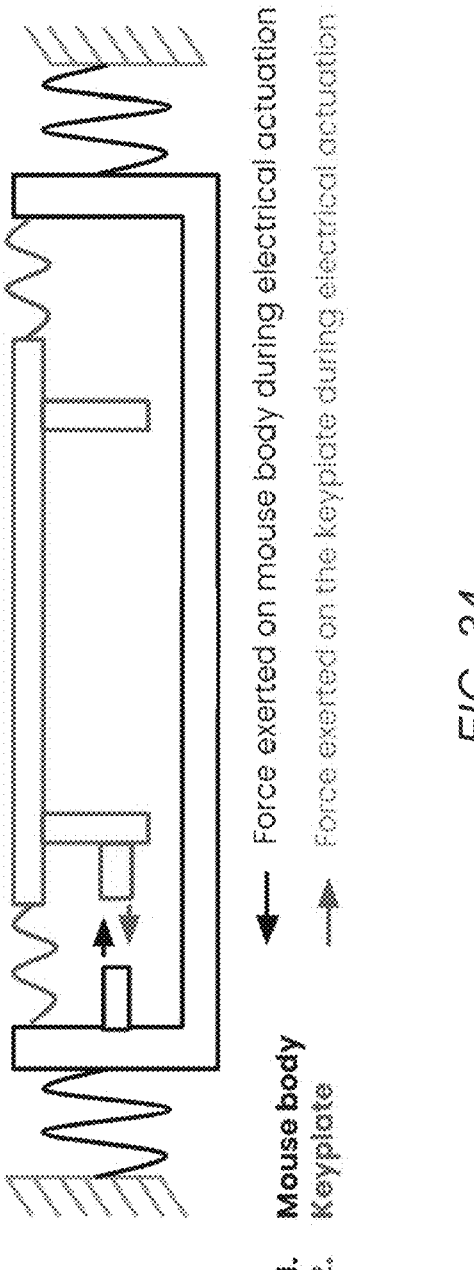
FIG. 34 shows a modelization of an input element with a lateral direct haptic implementation, according to certain embodiments.

To summarize certain haptic implementations presented thus far, certain embodiments can be described between two categories. The first category may correspond to when a haptic element exerts a direct force on the surface touched by the user, which can be referred to as "direct haptic." FIG. 34 shows a modelization of an input element with a lateral direct haptic implementation, according to certain embodiments. FIG. 34 shows the relationship between a keyplate and computer mouse body during electrical actuation of a haptic element. Some technologies that may be incorporated in such designs can include solenoids, electromagnets, and piezoelectric actuators.

Figure 35:
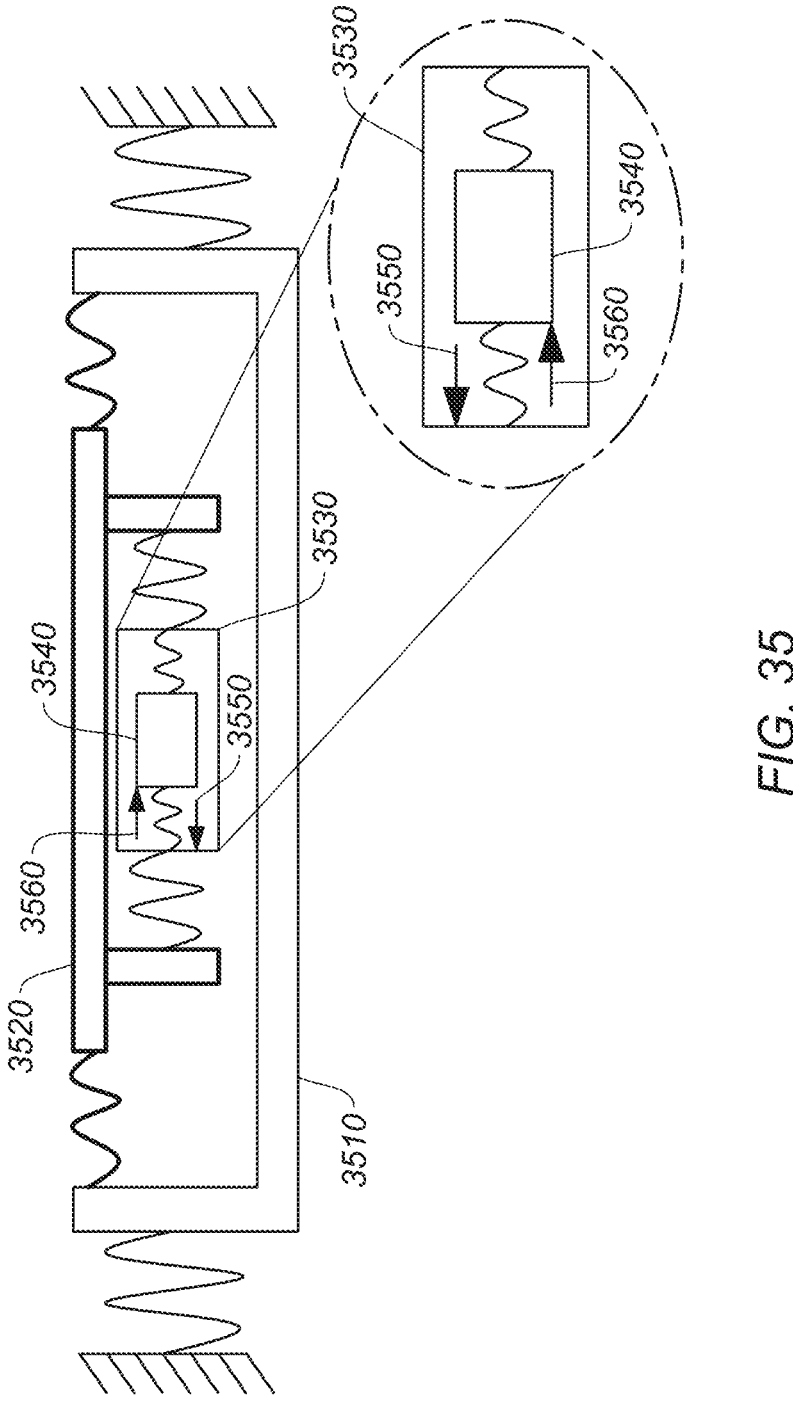
FIG. 35 shows the relationship between a keyplate and computer mouse body during electrical actuation of a haptic element.

The second category relates to when a haptic element is a vibrating element attached to the surface touched by the user, which can be referred to as "indirect haptic." FIG. 35 shows a modelization of an input element with a lateral indirect haptic implementation, according to certain embodiments. FIG. 35 shows the relationship between a keyplate and computer mouse body during electrical actuation of a haptic element. In this case, an indirect translation of haptic energy from the haptic element to the key plate is made through the haptic element's outer case 5040, as shown. Some technologies that may be incorporated in such designs can include Linear Resonant Actuators (LRA), Eccentric Rotating Mass (ERM) or piezoelectric based element(s), to name a few.

In some cases, each of the two implementations typically follow different sets of design guidelines. For direct haptic implementations, the mechanical link between the mouse body and the keyplate, in the actuation direction only, should typically be (1) stiff enough to ensure a faithful transmission of the command waveform to the keyplate displacement waveform (e.g., avoid filtering "high" frequency content); (2) be flexible enough to allow a certain degree of freedom, to have perceivable movement; (3) a typical range of approximately 350-700 Hz resonance frequency of the keyplate element, depending of the haptic element technology; (4) be configured to dampen the keyplate movement to avoid ringing after excitation, which can turn into bad user experience (UX); (5) not dampen too much to avoid efficiency losses in the system (e.g., power consumption); and (6) may be within a typical range is 10-50% damping ratio of the keyplate element, depending of the haptic element technology, as would be appreciated by one of ordinary skill in the art with the benefit of this disclosure. In some aspects, high frequency content can be the highest part of human perceivable vibration frequency: ~500-800 Hz. It should be noted that degree of freedom is typically stated in stiffness: N/m, and is largely dependent on the keyplate mass. Range is typically interlinked with the frequency range 350-700 Hz and flexible enough means that the main resonant frequency should typically be lower than 700 Hz. In some aspects, a link between mass/stiffness/frequency is the one of a 1 degree-of-freedom (DOF) mechanical resonator (w=sqrt (k/m)).

For indirect haptic implementations, some of the following design considerations should be employed: (1) Stiffness—to avoid transmitting the limited amount of energy available to the mouse body, the keyplate should have some flexibility as compared to the mouse body (transmissibility theory) in actuation direction. The keyplate's haptic working vibration mode should be below 100-150 Hz, with lower frequencies preferred; (2) Damping-some damping is preferred and can help mitigate the haptic element resonant effect. Keyplate's damping versus top case is typically designed to be between 20 and 100%, although other ranges are possible; (3) Haptic element mounting on the keyplate— to help maximize the amount of energy transferred from the haptic element to the keyplate, the haptic element should be mounted stiffly to the keyplate, typically higher stiffness will yield better performance, as loosely mounted keyplates may have less efficient energy coupling between the haptic element and keyplate.

In certain embodiments, the haptic stimulation of the surface (e.g., keyplate, key cap, etc.) interacting with the user is typically normal to the surface or in the surface plane/medium plane, or tangential (e.g., lateral) haptics. Tangential haptics can have certain substantial advantages. For instance, sensing of the user force is, by definition, normal (e.g., measuring normal finger force on the keyplate). Tangential haptics avoid conflict between sensing and haptics, allowing design freedom and in-use perturbations because the axes are different, as opposed to normal haptic implementations. Various studies have shown that the fingertip is more sensitive to lateral excitation than normal excitation. Lateral haptics can thus be more efficient as substantially less power is needed for a same haptic sensation of a user.

Figure 36:
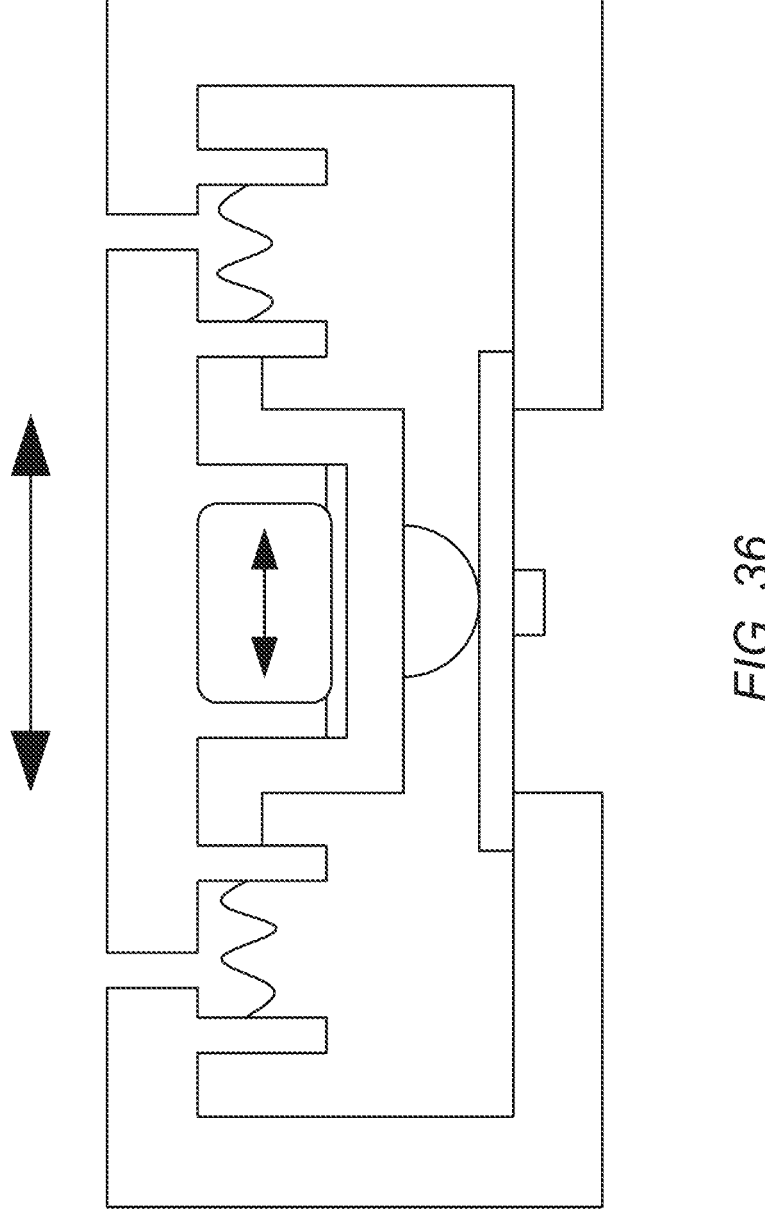
FIG. 36 is a first solution for a model showing coupling actuation and sensing in a lateral haptic solution, according to certain embodiments.

FIG. 36 is a first solution for a model showing coupling actuation and sensing in a lateral haptic solution, according to certain embodiments. Model includes a mouse body, a sensing printed circuit board (PCB), an actuator with bump, a haptic element, and a keyplate.

Figure 37:
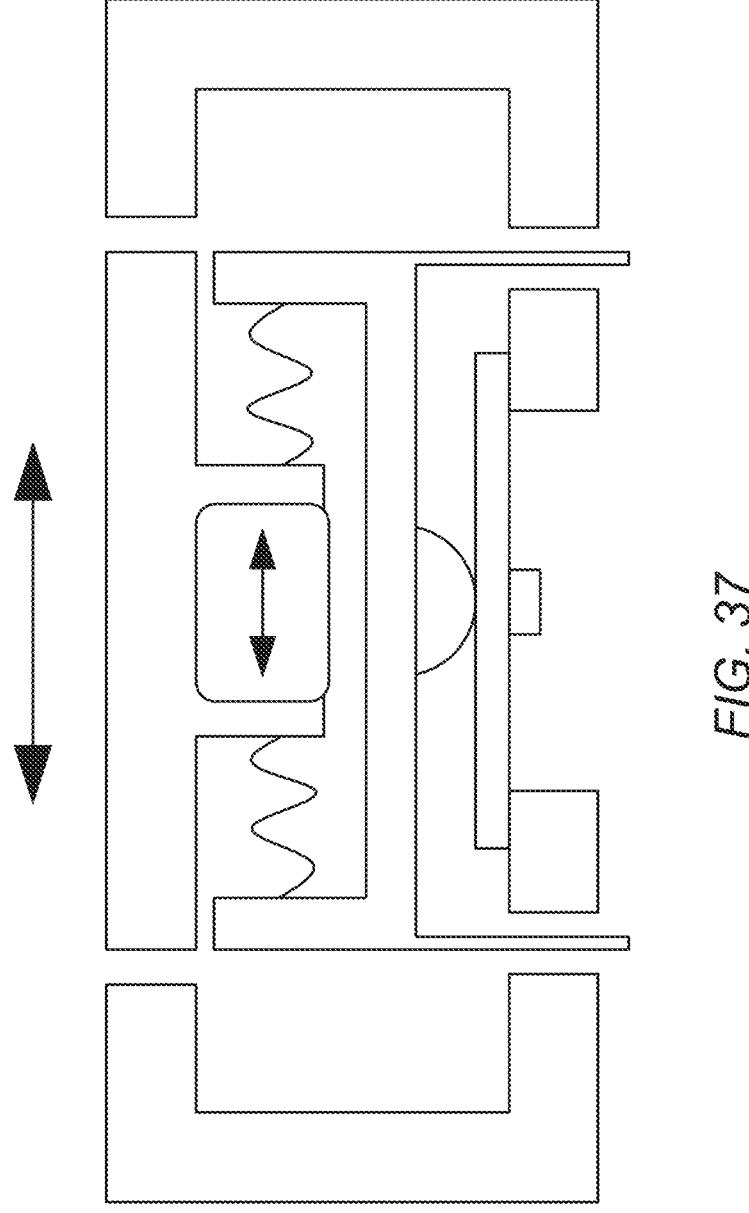
FIG. 37 depicts a model for showing decoupling actuation and sensing in a lateral haptic solution, according to certain embodiments.
Figure 38:
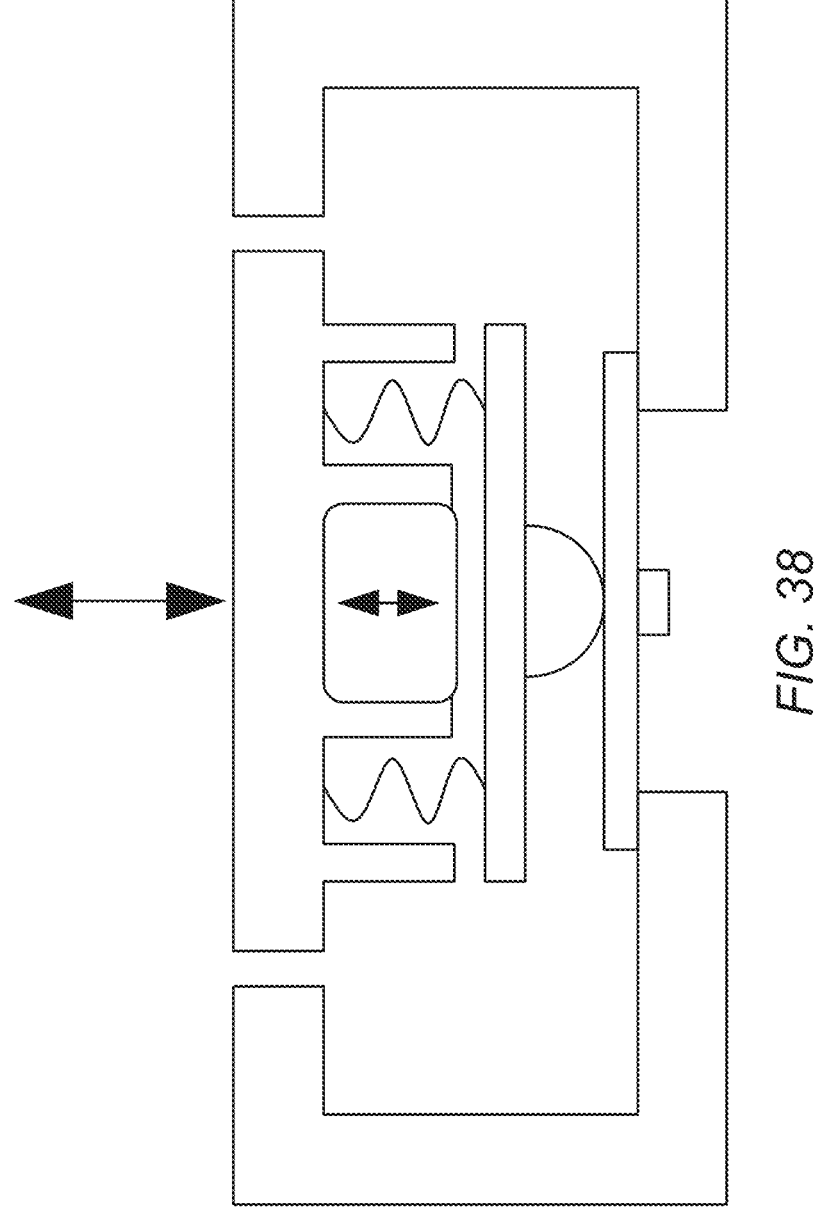
FIG. 38 shows a model for decoupling actuation and sensing in a normal-configured haptic solution, according to certain embodiments.

The keyplate suspension couples the keyplate to the mouse body in any of various implementations: in plastic flexures, metallic blades, helical springs with guides, elastic washers, flexible adhesive/material, soft overlay for a seamless mouse design, e.g., in floating keyplate designs, as further described throughout this disclosure. The keyplate suspension can be carefully designed, e.g., tuned, to achieve any suitable performance characteristics including stiffness, flexibility, etc. In certain embodiments, haptic element is configured to induce lateral haptic feedback to the user via keyplate. Although some of these embodiments show tangential haptic implementations, said embodiments may be applies in normal configurations as well, as would be appreciated by one of ordinary skill in the art with the benefit of this disclosure. Note that in FIGS. 36 and 39, the actuation and sensing is coupled, and the actuator bump is attached to the haptic element, hence the haptic element may be seen as is on the sensing signal. In FIGS. 37 and 38, the suspension has the additional role of decoupling sensing and actuation.

FIG. 37 is a second solution for a model showing decoupling actuation and sensing in a lateral haptic solution, according to certain embodiments. The model includes a mouse body, sensing printed circuit board (PCB), an actuator with bump, a haptic element, and a keyplate. The keyplate suspension couples the keyplate to the actuator in any of various implementations: in plastic flexures, metallic blades, helical springs with guides, elastic washers, flexible adhesive/material, soft overlay for a seamless mouse design, e.g., in floating keyplate designs, as further described throughout this disclosure. Keyplate suspension can be carefully designed, e.g., tuned, to achieve any suitable performance characteristics including stiffness, flexibility, etc. In certain embodiments, the haptic element is configured to induce lateral haptic feedback to the user via the keyplate.

FIG. 38 shows a model for decoupling actuation and sensing in a normal-configured haptic solution, according to certain embodiments. The model includes a mouse body, a sensing printed circuit board (PCB), an actuator with bump, a haptic element, and a keyplate. A keyplate suspension can couple the keyplate to the actuator in any of various implementations: in plastic flexures, metallic blades, helical springs with guides, elastic washers, flexible adhesive/material, soft overlay for a seamless mouse design, e.g., in floating keyplate designs, as further described throughout this disclosure. The keyplate suspension can be carefully designed, e.g., tuned, to achieve any suitable performance characteristics including stiffness, flexibility, etc. In certain embodiments, the haptic element can be configured to induce normal haptic feedback to the user via keyplate.

Figure 39:
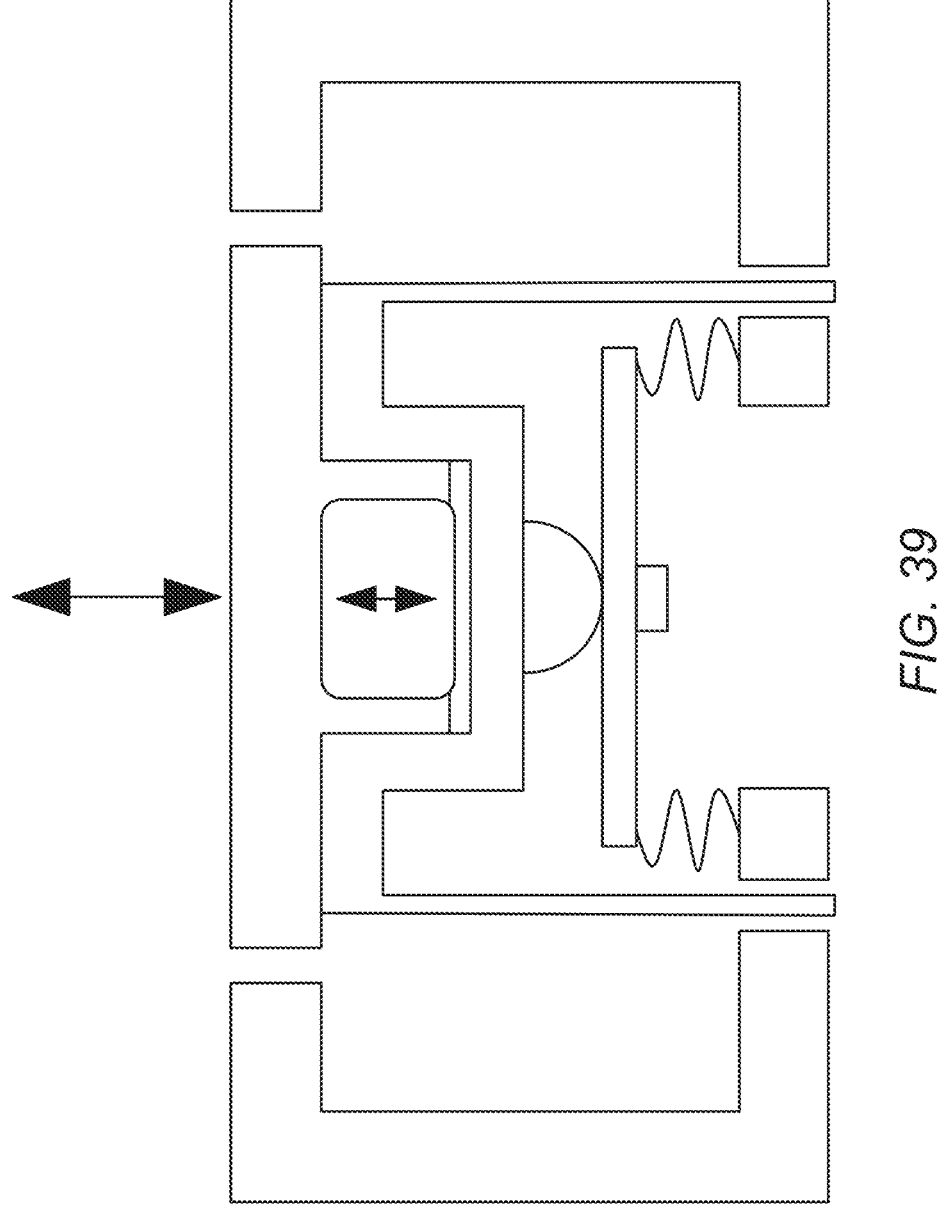
FIG. 39 shows a model for coupling actuation and sensing in a normal-configured haptic solution, according to certain embodiments.

FIG. 39 shows a model for coupling actuation and sensing in a normal-configured haptic solution, according to certain embodiments. The model includes a mouse body, a sensing printed circuit board (PCB), an actuator with bump, a haptic element, and a keyplate. A suspension couples sensing PCB to the mouse body in any of various implementions: in plastic flexures, metallic blades, helical springs with guides, elastic washers, flexible adhesive/material, soft overlay for a seamless mouse design, e.g., in floating keyplate designs, as further described throughout this disclosure. The suspension can be carefully designed, e.g., tuned, to achieve any suitable performance characteristics including stiffness, flexibility, etc. In certain embodiments, the haptic element can induce normal haptic feedback to the user via the keyplate.

In certain embodiments, the force sensitive input elements (e.g., haptic element(s)) described in the present disclosure can enable conventional mechanical keyplates and non-movable and non-perceivably moving designs, e.g., solid state computer mice. A solid-state input element on a computer mouse can be defined by a non-movable (or not perceivably moving) clickable area, unlike a conventional mechanical keyplate designs. For example, a non-movable area can be an area that does not afford a noticeable displacement/travel, as that common to a hinged mechanical key, while it can still deflect or deform under normal user load. Conventional mechanical keyplate designs typically traverse 50-100 mm, which can be an order of magnitude or more greater than solid-state input elements in comparison. In some aspects, solid-state input elements can allow better integration of haptic click technology with design flexibility for more innovative designs (e.g., not required to use conventional mechanical systems, which can limit design options), better compatibility with haptic and vibration-based feedback technologies, and improved transmissibility of user input and haptic output feedback. Some implementations may incorporate a fully enclosed key plate system with no perceivable mechanical movement (but for possible material flex) and comprised of one or more layers having different materials and properties, such as an inner shell comprised of a rigid material (e.g., ABS plastic), and an outer shell with soft tactile properties (e.g., silicone, rubber, TPE, etc.). From a user experience perspective, despite no perceivable mechanical displacement of an input element with a haptic element, the user may receive a haptic cue (e.g., pulse from the haptic element) that can feel like a displacement to the user or at least provide a sensory cue that a key press event is instantiated. In some cases, solid-state input devices can employ keyplates that may be flat or have complex geometries, any of which can accommodate multiple haptic elements (e.g., piezo elements) and more creative flexibility as key plate contours do not have to be designed to adapt to bulky and cumbersome mechanical key switches and corresponding architecture.

Haptic elements, such as piezo elements, can be modulated and tuned based on the manner that it is mechanically supported. Tuning features may aim at augmenting or better mechanically coupling structures for specific frequencies (or frequency ranges) in order to afford the user with enhanced tactile cues and better UX; while other features may intend to dampen or suppress undesirable frequencies, such as noise and rattling, which can be detrimental for UX and device functionality. In any case, features acting as mechanical supports and couplers will change the behavior of the vibrating structures and its response to both user inputs and other external loads as well as the feedback generated in the haptic element as it would be appreciated by one of ordinary skill in the art with the benefit of this disclosure. The dynamic behavior of the haptic element is, thus, modified by affecting its so-called boundary conditions. Varying the shape of the boundary conditions (e.g., position, stiffness and rigidity of clamping), the vibration mode shapes, frequency and response can be tuned, to some extent, to a desired range and mode of operation.

Aspects of this disclosure are related to coupling solutions for haptic elements without the use of a subtract or adhesives, or by means of bonded or soldered to flexible printed circuits (FPCs), while still ensuring preload and continuity of contact between the haptic element, sensing element, and the corresponding keyplate for improved sensing and feedback transmissibility (e.g., efficient coupling of mechanical vibrations), adjusting and tuning a local foundation of a haptic element to effectively change and modulate its dynamic behavior, including shaping its modes of vibration and shifting resonant frequencies. These coupling solutions can also allow a reduction of costs for the haptic module, while improving reliability and durability (e.g., mitigating or eliminating circuit degradation, trace silver migration), enabling repairability, and affording more sustainable design options (by removing the contribution of electronic subtracts).

In certain embodiments, the tuning of the haptic feedback can be done at the structures coupled to the haptic element, e.g., at the keyplate. For instance, specific regions or the entirety of the keyplate touch area can be designed such that its vibration response is tuned to amplify or dampen specific frequencies introduced by the haptic element. The tuning is achieved by design choices, such as dimensional features (e.g., thickness of material), material properties, and specific features, such as hinge design, partial movable regions, or by any other means as would be appreciated by one of ordinary skill in the art with the benefit of this disclosure.

Figure 41:
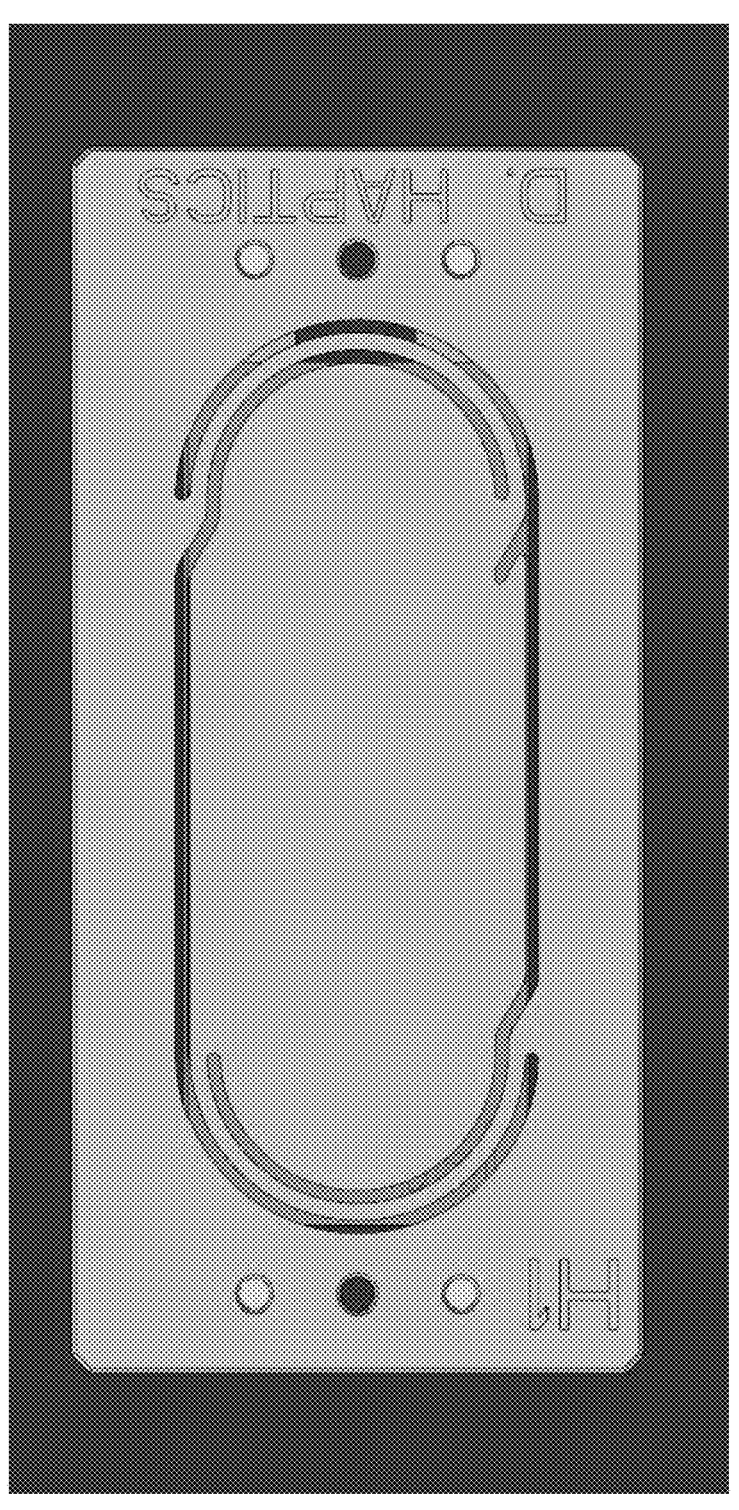
Figure 42:
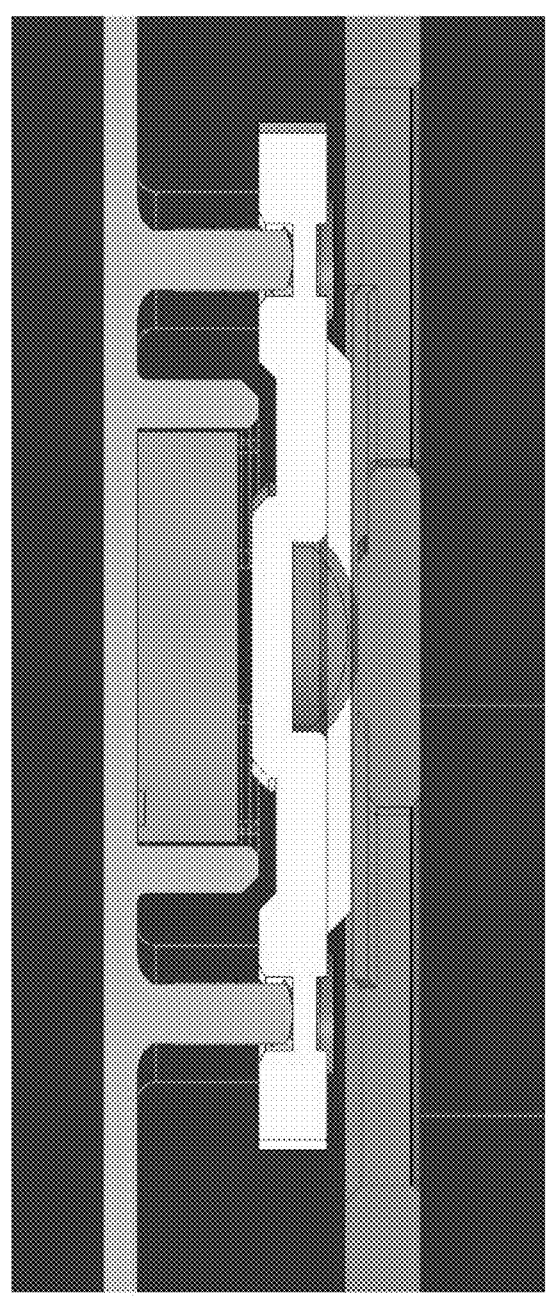

FIGS. 40-42 show an example of a haptic device with a touch surface that is locally tuned to respond at a given resonance frequency by integrating a spring in the surrounding and static region, according to certain embodiments. In this example, the flat spring allows lateral movement in a unique main frequency, while avoiding or minimizing the response outside of the optimal bandwidth. This is an example of a lateral haptics device.

Figure 43:
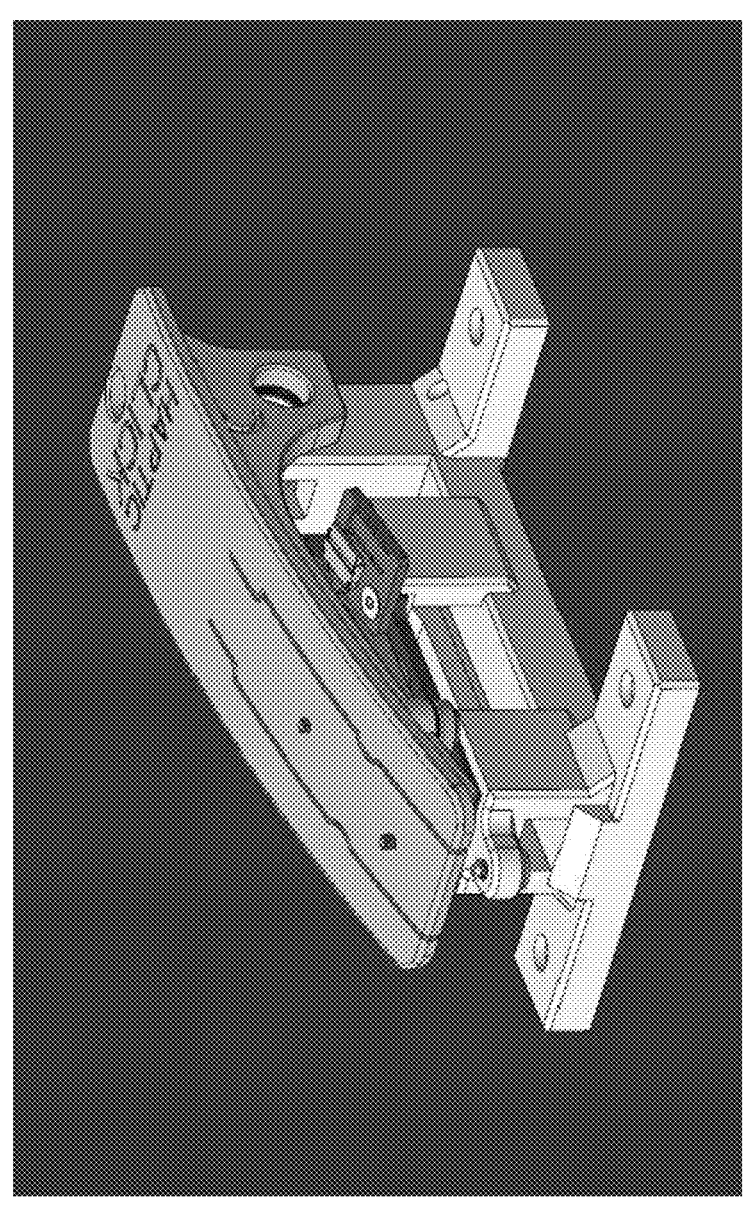
FIGS. 43-46C show examples of keyplates designed to intentionally vibrate at a specific frequency, matching the excitation and response of the haptic element, according to certain embodiments.
Figure 44A:
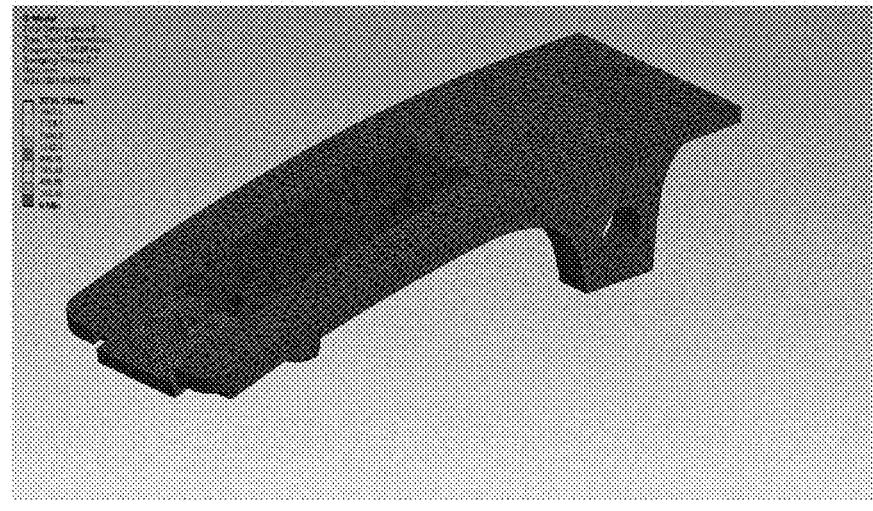
Figure 44B:
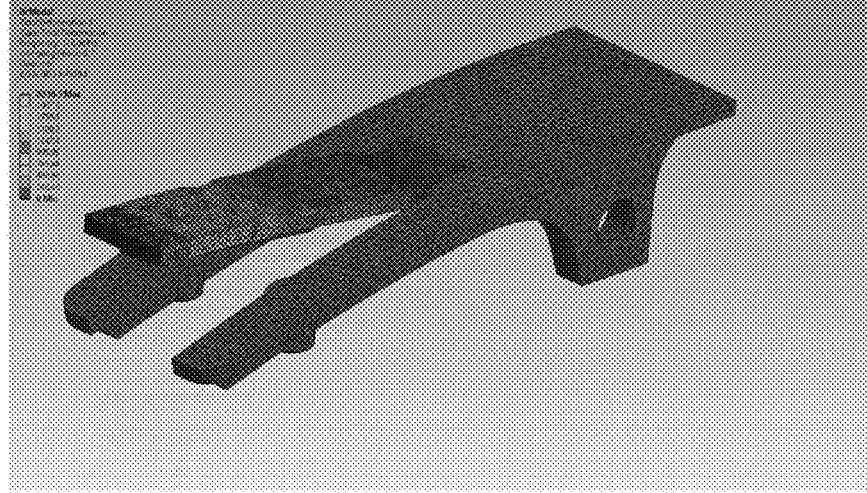
Figure 44C:
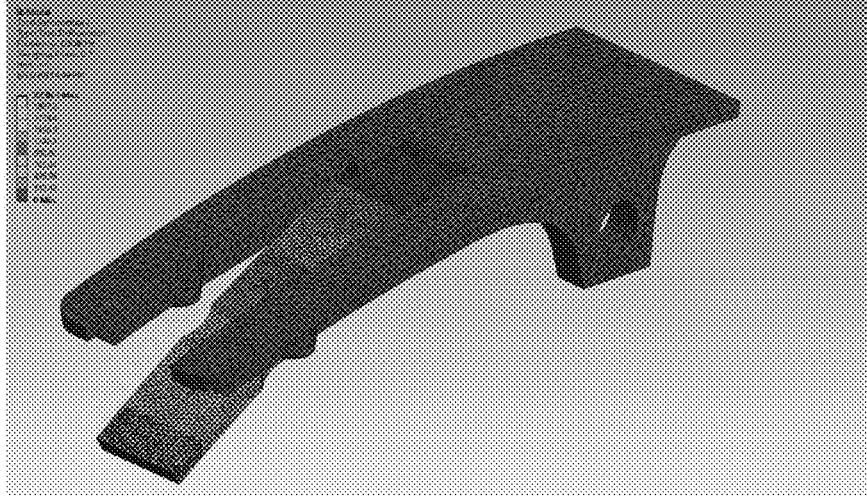
Figure 45:
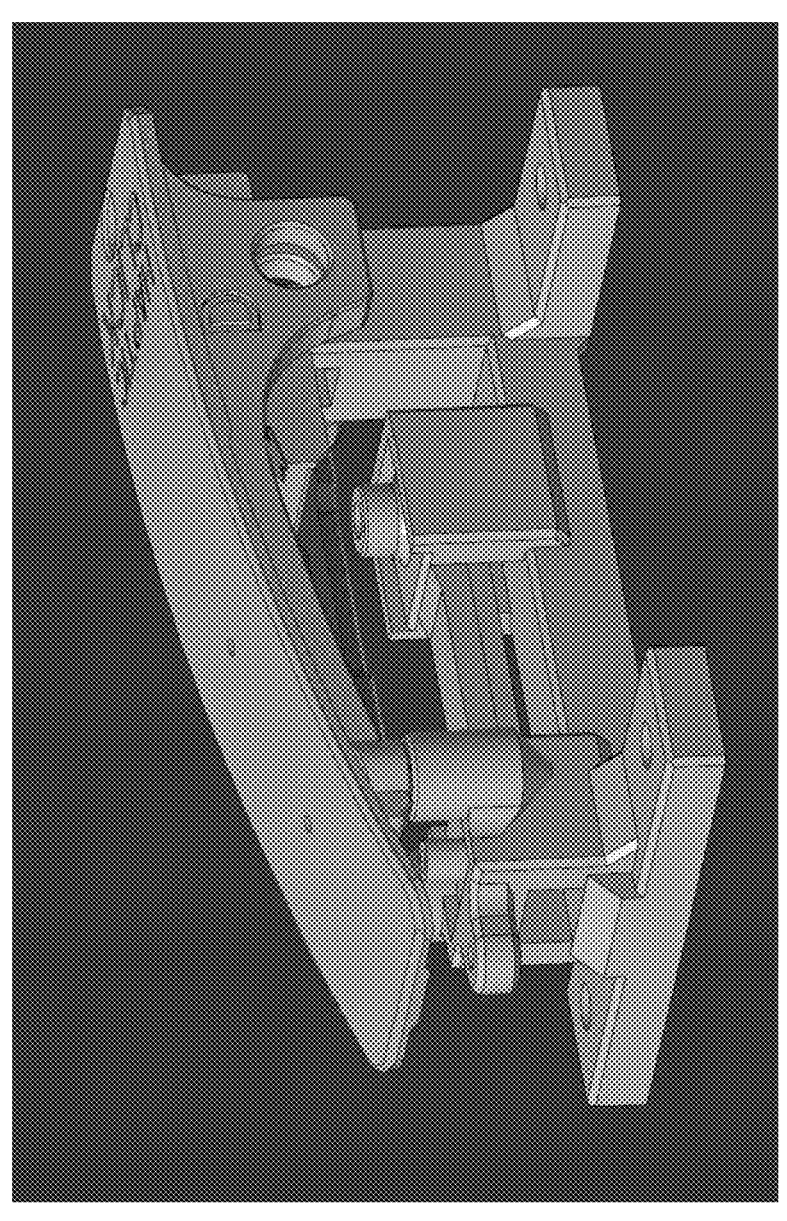
Figure 46A:
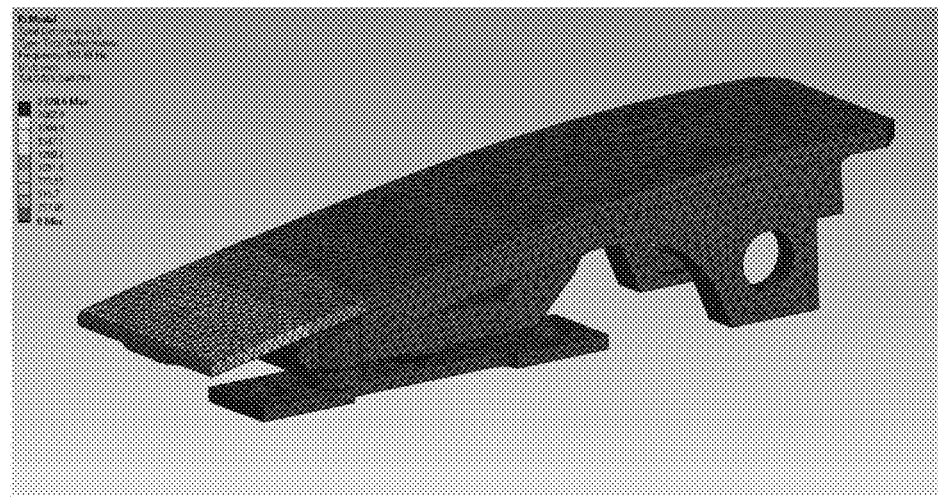
Figure 46B:
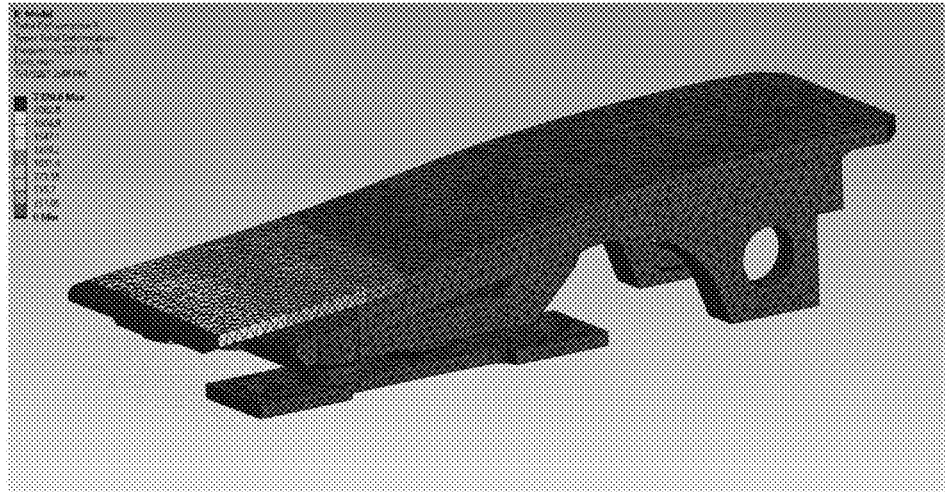
Figure 46C:
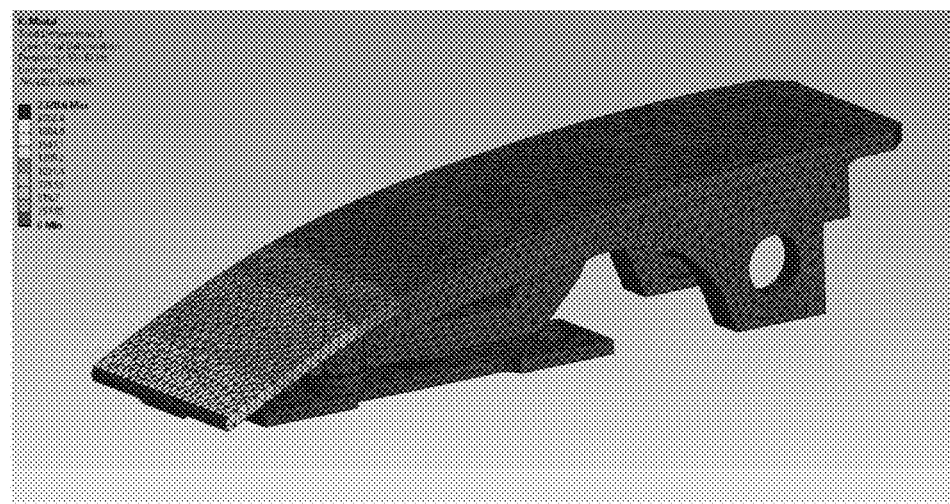

FIGS. 43-46C show examples of keyplates designed to intentionally vibrate at a specific frequency, matching the excitation and response of the haptic element, according to certain embodiments. Both cases afford an example for normally perceived haptic feedback. FIGS. 43-44C show an example of a locally tuned region of a keyplate, according to certain embodiments. FIGS. 45-46C show an example of an entire touch surface tuned to match the haptic feedback, according to certain embodiments. Other mechanical elements can be introduced between the haptic elements and the touch surfaces to further modulate and affect the haptic response. Such is the case of dampers (e.g., tuned rubber bushings), stiffeners, fasteners, springs, or other elastic elements with tuned resonances, etc. Furthermore, mechanical features can be introduced to limit or restrict movement in one or more unwanted directions, e.g., restricting up-down, lateral and twisting movement, while allowing movement in a direction aligned with the haptic element excitation. This application can make use of guides, pins, spring or elastic elements, design features, or any other means as would be appreciated by one of ordinary skill in the art with the benefit of this disclosure.

Figure 47:
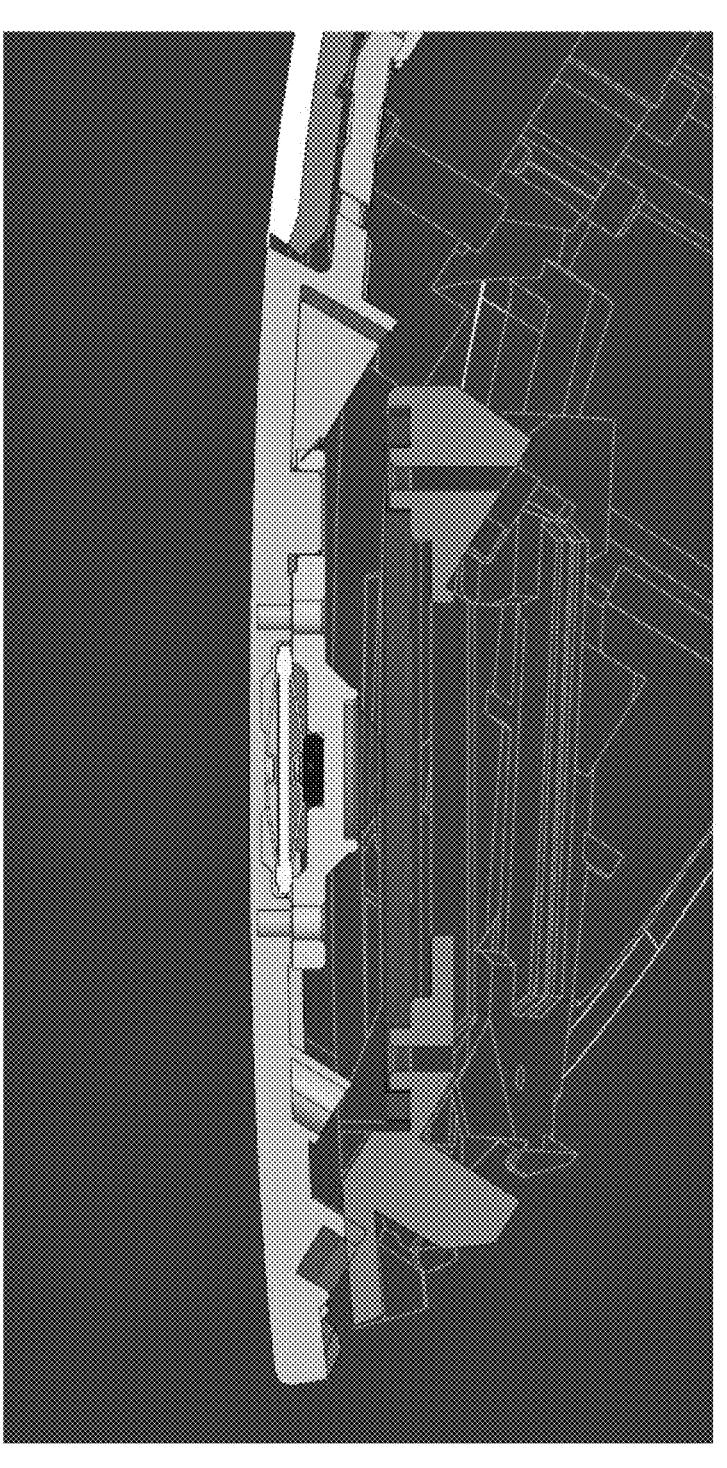
FIG. 47 shows an embedded keyplate with a haptic element integrated in a mouse topcase.

FIG. 47 shows an embedded keyplate (light blue) with a haptic element (white) integrated in a mouse topcase (dark blue line). The haptic element is mechanically coupled to the keyplate via a subchassis (yellow), which contains the compliant actuator (red) transferring the load to the sensing element (green). In between the chassis and the haptic element, a compressible element (black) introduces and ensures preload in the system. This keyplate is hinged at the rear (right side) by a flexible feature. Additional preload for the keyplate is induced by a magnet placed at the front edge (left side of the picture) oriented in such a way that is attracted downwards towards a magnetic part (e.g. a screw) in the topcase. While this solution offers a simple and efficient way of integrating all necessary systems and sensing user interactions in a clicking device, it was found to be inadequate to convey the haptics to the user. Haptic feedback was found to be better coupled, hence lost, towards the compliant element and, hence, the rest of the mouse, instead of towards the user making for a poor transfer of haptic energy. In other words, in such embodiments, haptic energy flows more readily into internal structures of the computer mouse rather than into the keyplate, making for an inefficient transfer of haptic energy to the user.

FIG. 48A shows an embedded multi-tiered keyplate (light blue) with a haptic element (white) integrated in a mouse topcase (dark blue line), according to certain embodiments. The haptic element is mechanically coupled to the keyplate via a subchassis (yellow). A separate bridge (orange) contains the compliant actuator (red) transferring the load to the sensing element (green) and is directly coupled to the haptic element. In between the subchassis and the bridge, features are included to transfer loads after initial pre-compression and to better protect the haptic element from overloads. This keyplate is hinged at the rear (right side) by a flexible feature, which allows the overall downward movement of the keyplate, even if in a quasi-solid state design. However, a second hinge is added in the keyplate, dividing the top surface, i.e., the user accessible area, and the structure underneath that supports the bridge element. This second hinge operates as a partial decoupling feature of the top structure from the overall movement of the keyplate induced by the user, thus allowing the vibration to occur locally. This hinge allows the excitation from the haptic element to be well conveyed to the user, e.g., upwards and normal to the touch surface, with substantially reduced haptic energy loss to the overall system (e.g., haptic energy coupled to areas not including the keyplate). The hinge is also tunable to the haptic vibration by design (e.g. to be in resonance with the haptic element), which can be used as a mechanical amplifier or dampener of structural vibrations. Additional preload for the keyplate is induced by a magnet placed at the front edge (left side of the figure) oriented in such a way that is attracted downwards towards a magnetic part (e.g. a screw) in the topcase.

In some exemplary embodiments using a multi-tiered keyplate implementation, an input device (e.g., computer mouse) can include a housing, a multi-tiered, depressible keyplate including a first tier and a second tier, a haptic element (e.g., piezoelectric device), a subchassis configured to support and directly couple the haptic element to a bottom surface of the first tier of the keyplate, and a sensor. When the multi-tiered keyplate is depressed by a threshold distance, the second tier of the multi-tiered depressible keyplate can make contact with the sensor, causing the sensor to detect that the multi-tiered depressible keyplate is depressed. In some cases, the multi-tiered depressible keyplate is a monolithic structure such that the first and second tiers move as a single unit relative to the housing when the multi-tiered depressible keyplate is depressed. In some haptic energy generated by the haptic element is coupled to the first tier of the multi-tiered depressible keyplate, and a pressing force pushing the multi-tiered depressible keyplate down is coupled to the sensor via the second tier of the multi-tiered depressible keyplate. The first and second tiers may be vertically aligned relative to each other such that the second tier is positioned below the first tier. In some embodiments, the first tier of the multi-tiered depressible keyplate can be tuned to resonant at a frequency of operation of the haptic driving element. In some aspects, the haptic element is not directly coupled to the second tier of the keyplate, and haptic energy generated by the haptic element is substantially localized in the first tier of the multi-tiered depressible keyplate, such that more than 50% of haptic energy is transferred to the first tier, and in some tuned embodiments greater than 75%, 90%, or more of the haptic energy can be transferred. In some embodiments, the first tier is flexible and the second tier is stiff relative to the first tier. In some cases, subchassis may not be directly coupled to the multi-tiered depressible keyplate and not directly coupled to the housing of the computer mouse. In certain embodiments, the first tier includes a first end and the second tier includes a second end, and the first tier is coupled to the second tier via the first end and the second end. In simpler terms, the first and second tier can resemble two diving boards stacked vertically relative to each other that are connected to one another at the same end of each, as shown in FIG. 48A.

Figure 48B:
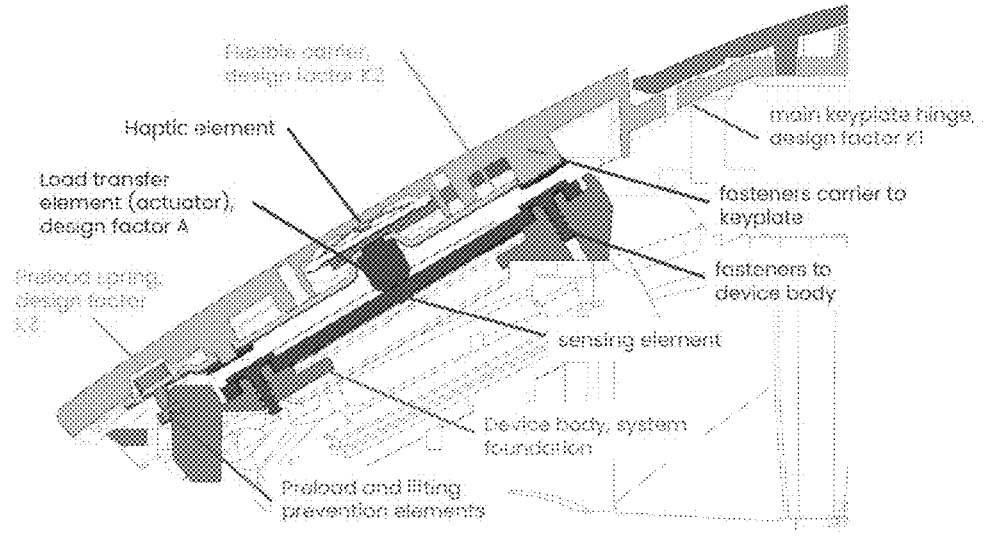
FIGS. 48B-48C shows a keyplate system with an integrated haptic element, according to certain embodiments.
Figure 48C:
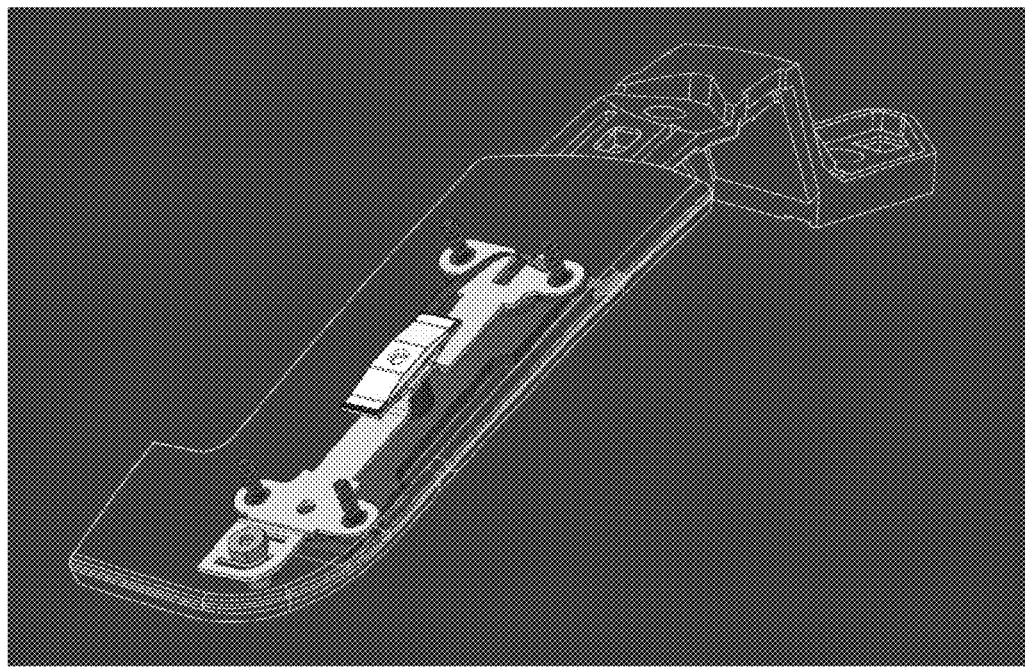

FIGS. 48B-48C shows a keyplate system 4850 with an integrated haptic element, according to certain embodiments. Keyplate system 4850 includes a user-accessible keyplate (blue) that integrates the haptic element (white), wherein the keyplate is coupled to an elastic subchassis (yellow), which can transfer the loads (e.g., force from a user keypress) to a sensing element (dark green) via an actuator of specific shape and form (dark red). The elastic subchassis can be tuned by design to perform with specific static (e.g., intended stiffness) and dynamic behavior (e.g., tuned resonant frequencies). In some aspects, keyplate system 4850 may incorporate a preload system and a lift-stopper (e.g., limiter element) (see, e.g., FIG. 14A-14C), to ensure the mechanical coupling of the elements in any condition, while preventing keyplate lift. Such preload system components can be shared in the same elements (dark orange) and be a separate module attached to the keyplate or make use of features available from the subchassis (as shown in FIGS. 48B-48C). In the latter case, the subchassis can include a flat spring that acts as a preload inducer, coupling the system to the device body. In this arrangement, the haptic element is affording the feedback to the user by vibrating the coupled chassis and keyplate laterally and exciting the touch area tangentially to its surface.

In some embodiments, the main keyplate hinge stiffness (K1) is designed to allow movement and loading of the system under user load, and also locates the keyplate to the device body (is responsible for configuring the location and orientation of the user accessible portion of the keyplate relative to the device body (housing). The flexible carrier (K2) is designed for stiffness and other mechanical properties. For example, the flexible carrier can be tuned to ensure preload in the overall system (compliance) and the load sensor underneath. The design of the carrier also allows the tuning of dynamic behavior (e.g., resonances and transient response) for improved haptic energy transfer and mitigating vibration and rattling issues (e.g., in other portions of the input device). In some aspects, the preload spring (K3) can be a flat spring type extension (integrated feature) of the flexible carrier. The load transfer element (actuator) can include geometry and material design factors and operates to allow the determination of the preload and interferences (for preload), and transfers loads between the keyplate and sensor. The stiffness or compliance of the material also allows for progressively loading the sensing element. In some aspects, load transfer elements using soft materials can also damper and accommodate geometrical tolerance deviations. The sensing element can have a stiffness and can behave as a bending beam with tuned stiffness and geometry. In some aspects, the keyplate can also include other mechanical features like mounting points, location regions and overload prevention features. The variations of the various dimensions, stiffness, compliance, location, etc., of the elements of keyplate system 4850 can be selected based on design goals. One of ordinary skill in the art with the benefit of this disclosure would appreciate the many modifications, variations, and alternative embodiments thereof.

In some exemplary embodiments, a computer mouse comprises a housing, a multi-tiered and depressible keyplate including a first tier and a second tier, a haptic element, a subchassis configured to support and directly couple the haptic element to a bottom surface of the first tier of the keyplate, and a sensor (e.g., force sensor, keypress detection sensor, and the like). In some cases, when depressed by a threshold distance, the second tier of the multi-tiered depressible keyplate makes contact with the sensor, causing the sensor to detect that the multi-tiered depressible keyplate is depressed. In some aspects, the multi-tiered depressible keyplate is a monolithic structure such that the first and second tiers move as a single unit relative to the housing when the multi-tiered depressible keyplate is depressed. In some embodiments, haptic energy generated by the haptic element is coupled to the first tier of the multi-tiered depressible keyplate, and a pressing force pushing the multi-tiered depressible keyplate down is coupled to the sensor via the second tier of the multi-tiered depressible keyplate. The first and second tiers can be vertically aligned such that the second tier is positioned below the first tier. The first tier of the multi-tiered depressible keyplate can be tuned to resonant at a frequency of operation of the haptic driving element. In some embodiments, the haptic element is not directly coupled to the second tier of the keyplate, and haptic energy generated by the haptic element is substantially localized in the first tier of the multi-tiered depressible keyplate. In certain embodiments, the first tier is flexible and the second tier is stiff relative to the first tier. The subchassis, in some embodiments, is not directly coupled to the multi-tiered depressible keyplate and not directly coupled to the housing of the computer mouse. The first tier can include a first end and the second tier includes a second end, and wherein the first tier is coupled to the second tier via the first end and the second end.

In further embodiments, a computer mouse comprises a depressible keyplate having a bottom side, a haptic element coupled to the bottom side of the depressible keyplate, a flexible subchassis configured to support and provide a preloading force to push the haptic element against the bottom surface of the depressible keyplate, a sensing element, and a load transfer element configured between and coupled to a bottom of the flexible subchassis and a top of the sensing element, the load transfer element operable to transfer a force load from the keyplate and flexible chassis to the sensing element. The computer mouse can further include an outer housing having an opening (e.g., aperture), the outer housing defining an outer shell of the computer mouse, wherein the depressible keyplate is configured within the opening of the outer housing and an inner chassis disposed within the outer housing and configured to couple to and provide structural support to the combination of the keyplate, haptic element, flexible subchassis, load transfer element, and sensor, wherein the depressible keyplate is floating and decoupled from the outer housing. In some embodiments, a soft, compliant layer seamlessly covers the keyplate and outer housing. The haptic element can be structurally integrated with the depressible keyplate. The flexible subchassis can be tuned to include static portions and dynamic portions, where the static portions have an increased stiffness and the dynamic portions are tuned to a resonant frequency of the haptic element. Some embodiments can further include a limiter element operable to physically limit a movable range of the keyplate in opposition to the preloading force that pushes the haptic element coupled to the flexible subchassis against the bottom surface of the depressible keyplate. In some cases, the depressible keyplate is a left or right mouse button on the computer mouse. The flexible subchassis can be configured as a leaf spring. In some cases, the load transfer element is comprised of a soft, compliant material that dampers vibration. In certain embodiments, the soft, compliant material is comprised of a foam, polyurethane, rubber, polymer, or TPE. In some cases, the haptic element can be a piezoelectric element.

Figure 49:
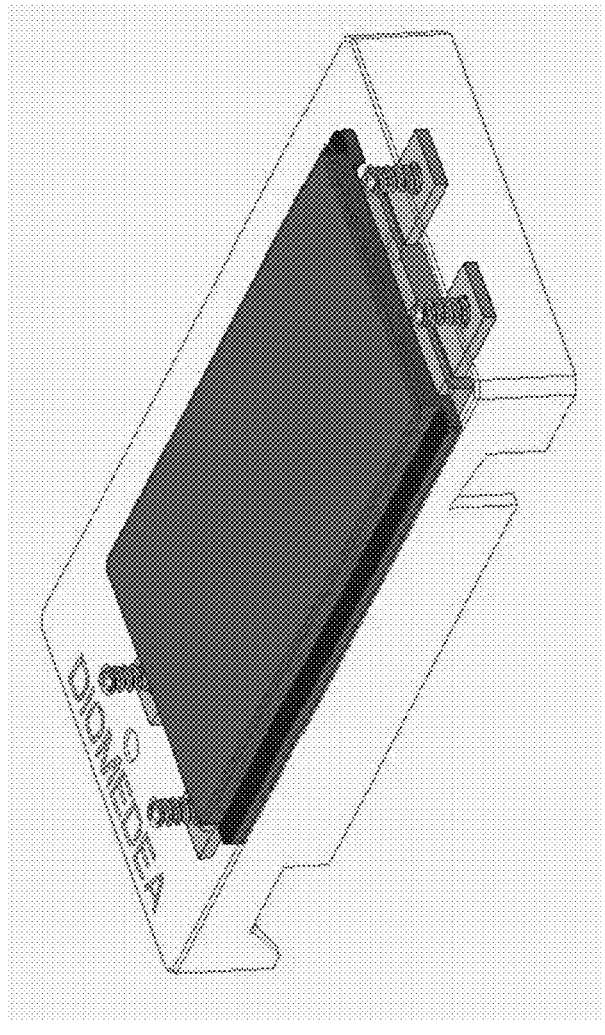
FIGS. 49-51 show an example of a haptic device, where the touch area is directly coupled to a haptic element contained by a floating subchassis, according to certain embodiments.
Figure 50:
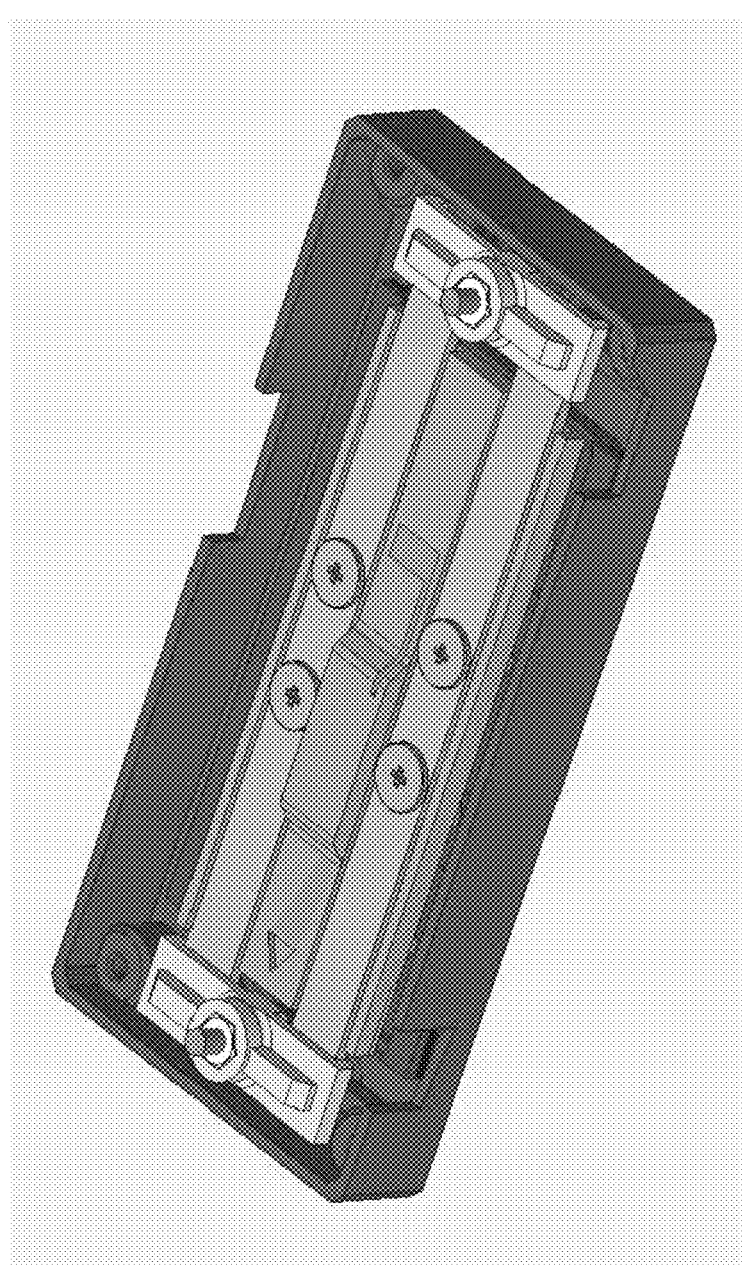
Figure 51:
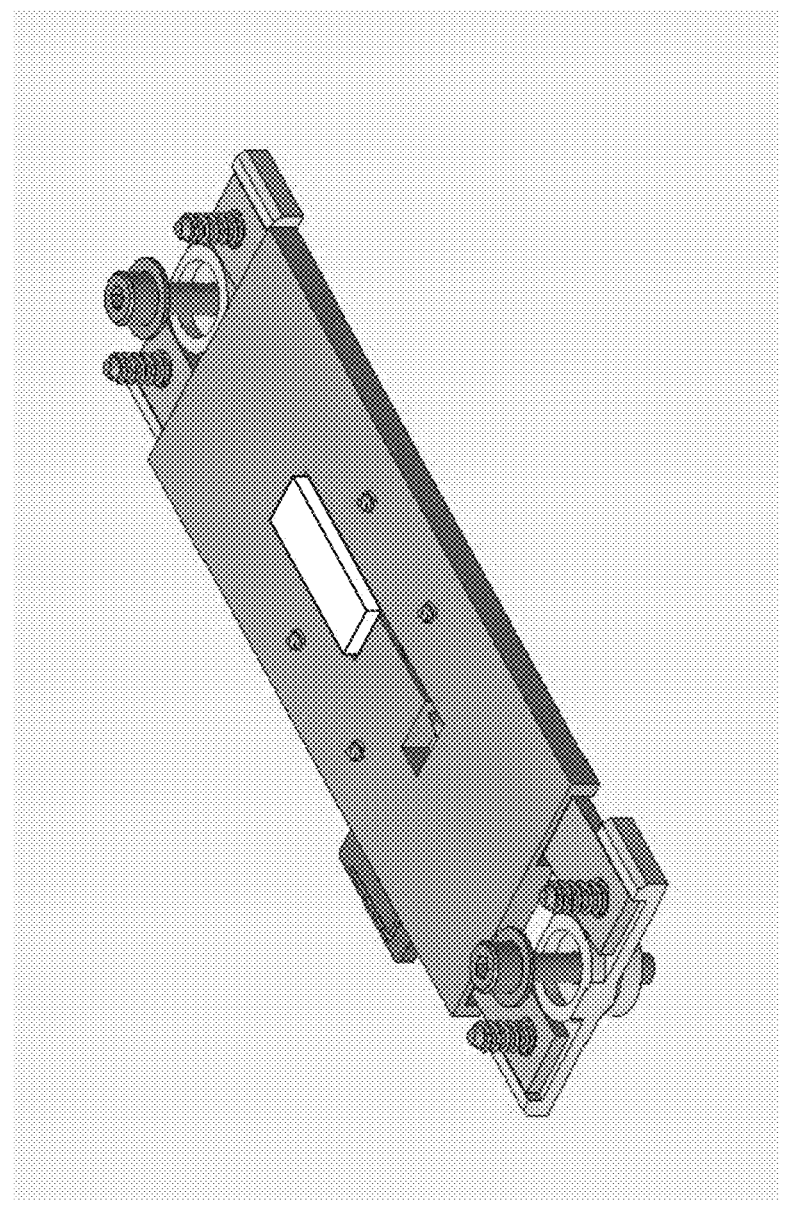

FIGS. 49-51 show an example of a haptic device, where the touch area (blue) is directly coupled to a haptic element (white) contained by a floating subchassis (green), according to certain embodiments. The subchassis contains two flat springs (gray) tuned to resonate in a specific frequency matching the response of the haptic element. The springs are also embedded in a mechanism (yellow) that ensures preload in the system via their mechanical coupling to the device static chassis (red). This system provides haptic feedback that is normal to the touch surface.

Figure 52:
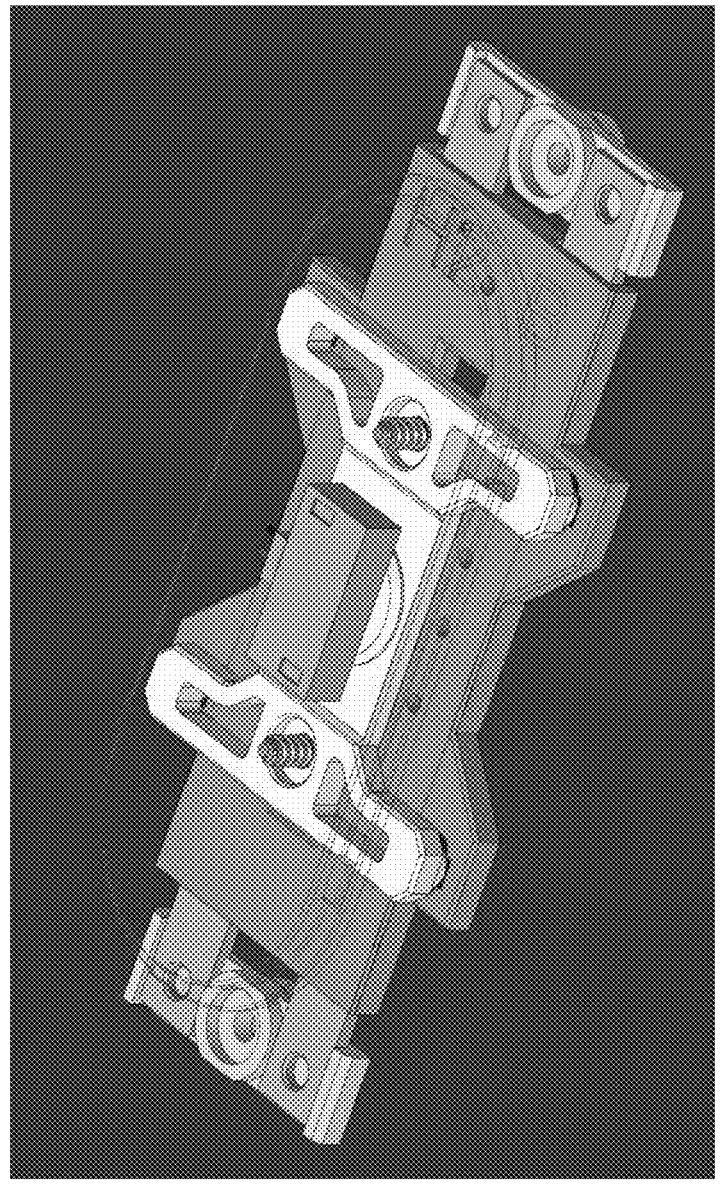
FIGS. 52-54 show examples of a haptic device, where movement is constrained in all directions except for lateral movement tangential to the touch surface and aligned with the haptic element, according to certain embodiments.
Figure 53:
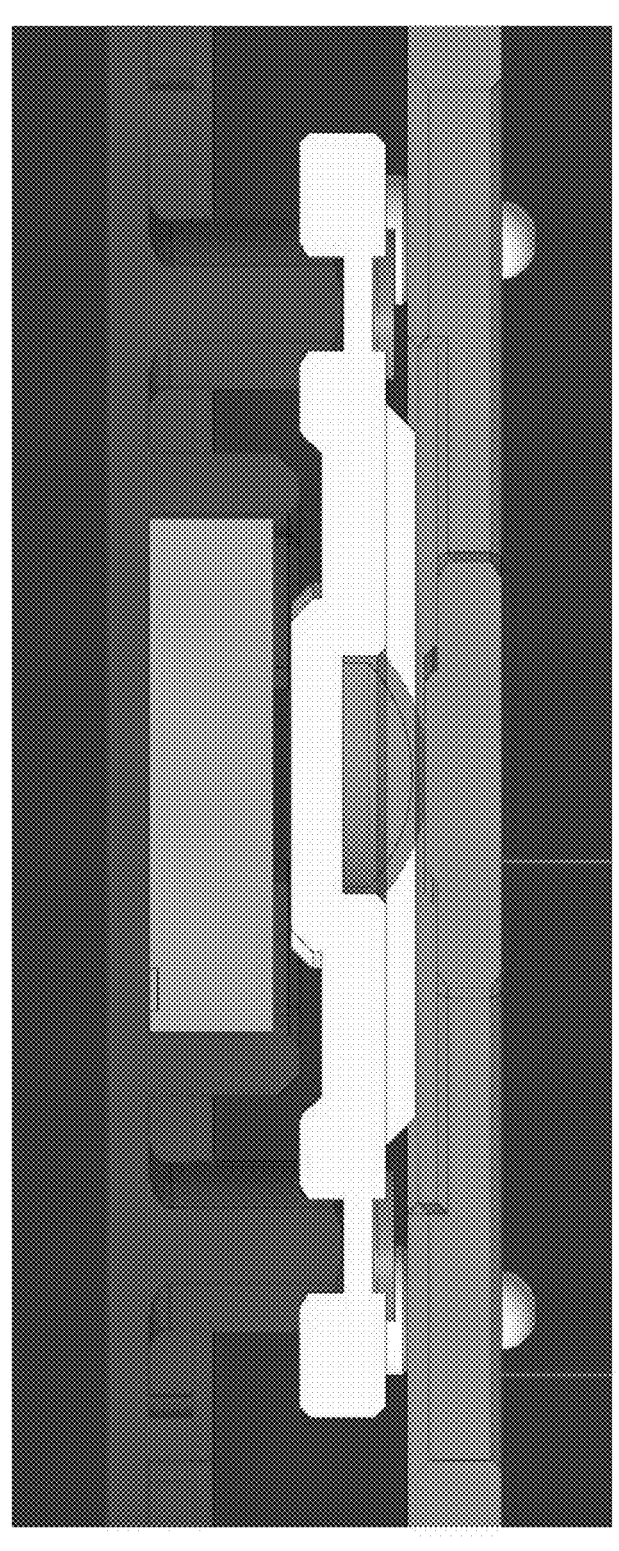
Figure 54:
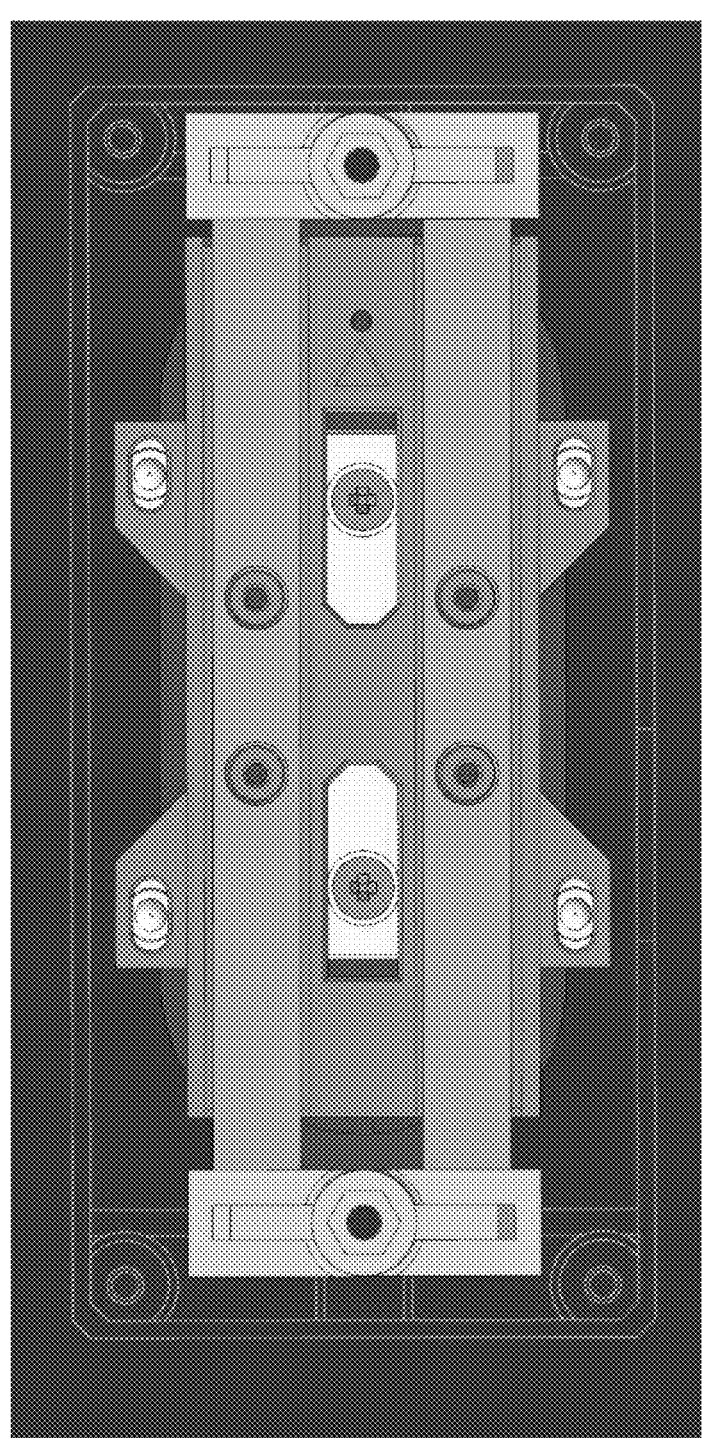

FIGS. 52-54 show an example of a haptic device, where movement is constrained in all directions except for lateral movement tangential to the touch surface and aligned with the haptic element, according to certain embodiments. This is made possible by local guiding features in a subchassis (white) coupled to the keyplate (blue) on which the haptic element (gray) is integrated. The keyplate system is then coupled to a chassis (green) supported by two flat springs (gray) introducing compliance in the system and preload in the system. Elastic elements (black and red) are included in the system to retain preload while providing multi-directional damping and transferring loads to the sensing element. Thus, unidirectional lateral haptics are possible, which are tangential to the touch surface and aligned with the haptic element excitation.

These various embodiments can be independent to the haptic element coupling or paired and combined, matching the tuning of the whole architecture by design at each relevant component level. Similarly, if the haptic element is tunable, its excitation can be modulated in both amplitude, frequency, pulse duration, variation and number of pulses, changes of excitations (e.g., ramps or steps), or any other controllable parameter, to better match the surrounding structures vibration response, which can result in an improved UX. Some haptic elements may have a restricted bandwidth to limit control of said parameters and may include implementations using multi-layer piezos, certain LRAs and LRMs, or the like.

In some embodiments, a suspension membrane is used to provide a relatively smooth suspension of a keyplate on a computer mouse that allows movement and mitigates mechanical vibrations (e.g., from a haptic element) from coupling to other unintended portions of the computer mouse. In certain embodiments the suspension membrane may be coplanar with the keyplate and surrounding support elements (or more generally, co-contoured for complex surfaces that are not planar). The suspension membrane may also have some slack. The suspension membrane may be continuous across the top surfaces of the keyplate and/or support elements. It may also be bonded to side or bottom portions of either the keyplate and/or the support elements. The material of the suspension membrane may also fully encompass one or more of the elements it is connected to.

Figures 55, 56:
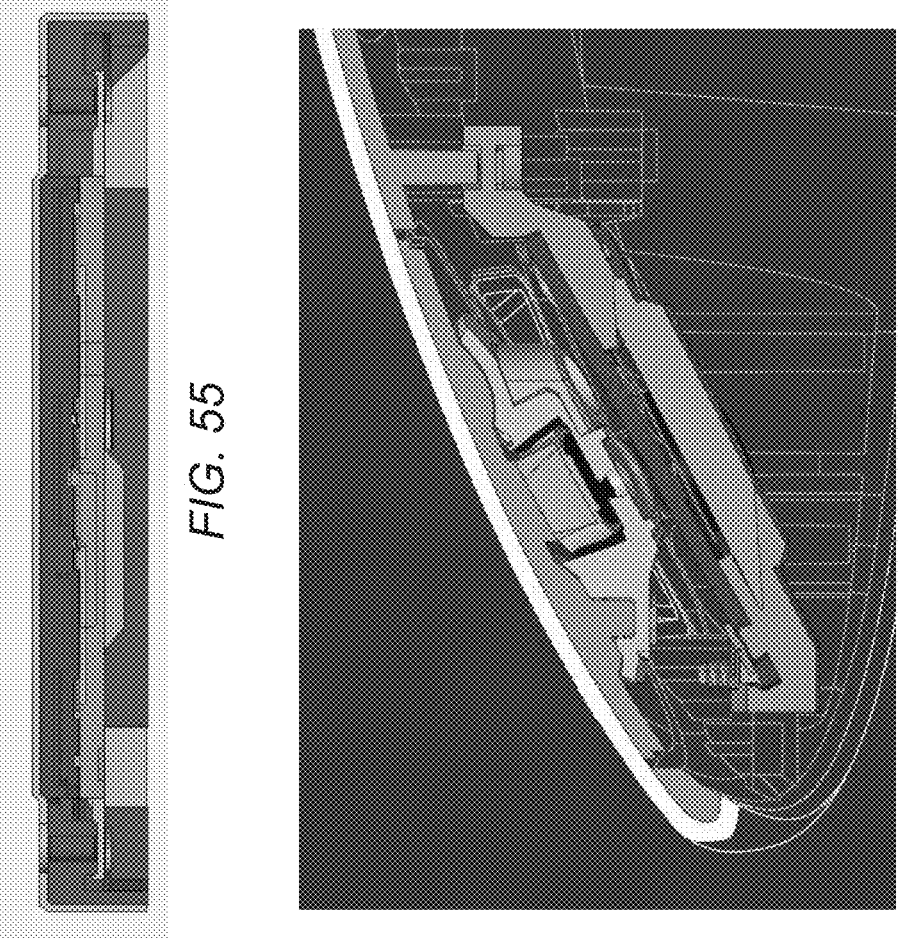
FIG. 55 shows a keyplate system utilizing a suspension membrane, according to certain embodiments.
FIG. 56 shows another keyplate system utilizing a suspension membrane, according to certain embodiments.

FIG. 55 shows a keyplate system utilizing a suspension membrane, according to certain embodiments. Keyplate system includes a keyplate, a housing, and suspension membranes coupling the keyplate to the housing, multiple haptic elements coupled to a bottom side of the keyplate and supported by support infrastructure.

FIG. 56 shows another keyplate system utilizing a suspension membrane, according to certain embodiments. The keyplate system of FIG. 56 can be similar to the keyplate system of FIG. 55, but with the keyplate and suspension membrane merged into a single elastomer part. This part can be molded and have a complex external shape (one advantage of suspending the keyplate) to allow flexibility in the product external industrial design. Thus, keyplate systems that incorporate a suspension membrane can facilitate a seamless design, a good coupling of mechanical vibrations from the haptic element to the keyplate without coupling to adjacent features (e.g., other portions of the computer mouse), and allows more flexibility of the external product industrial design.

Figure 57:
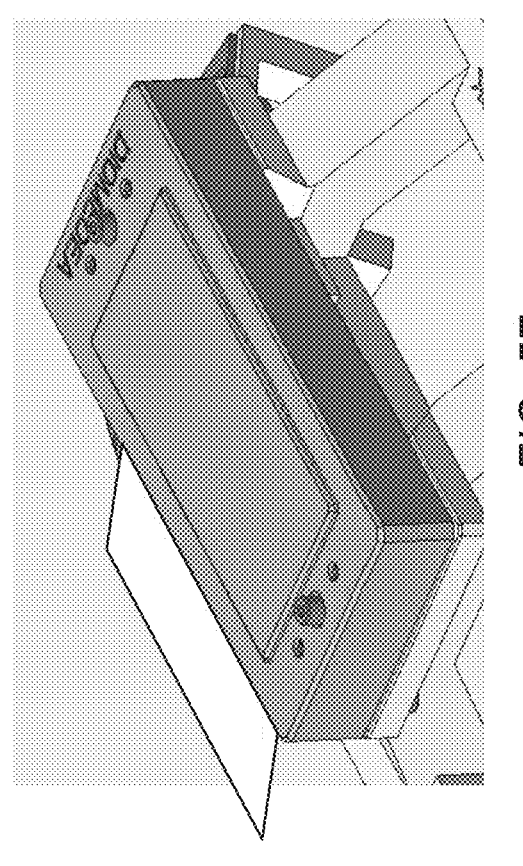
FIGS. 57-59 show examples of a dual layer haptic device, where the outer layer, the touchable surface, is comprised of a soft compliant material, according to certain embodiments.
Figure 58:
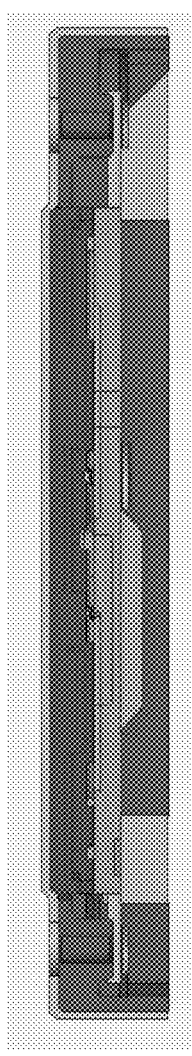
Figure 59:
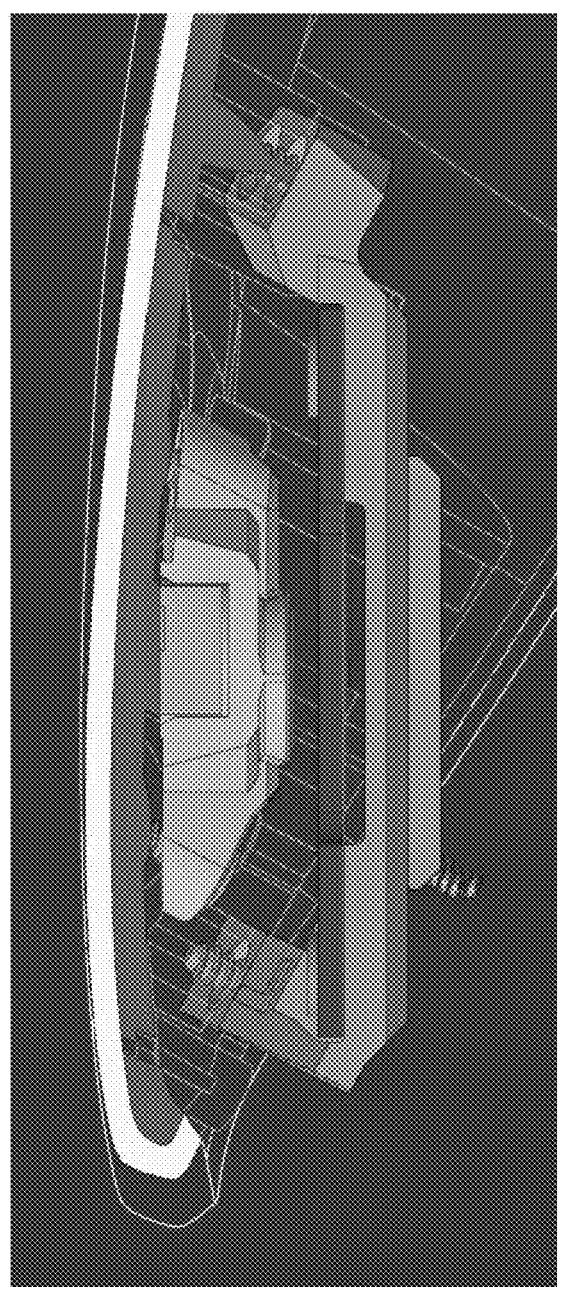

In certain embodiments, a key travel augmentation system can be used to increase keyplate travel in a keyplate system by adding a soft biasing element in series with the haptic element's stiffness, according to certain embodiments. The biasing element can be a dedicated spring, an elastic rubber or elastomer, or another suitable compliant biasing element. Furthermore, the introduction of a compliant layer, e.g., a compressible silicone, can benefit the UX in affording a user perception of keyplate movement when the surface is (mostly) static. FIGS. 57-59 show examples of a dual layer haptic device, where the outer layer, the touchable surface, is comprised of a soft compliant material, according to certain embodiments.

Figure 60:
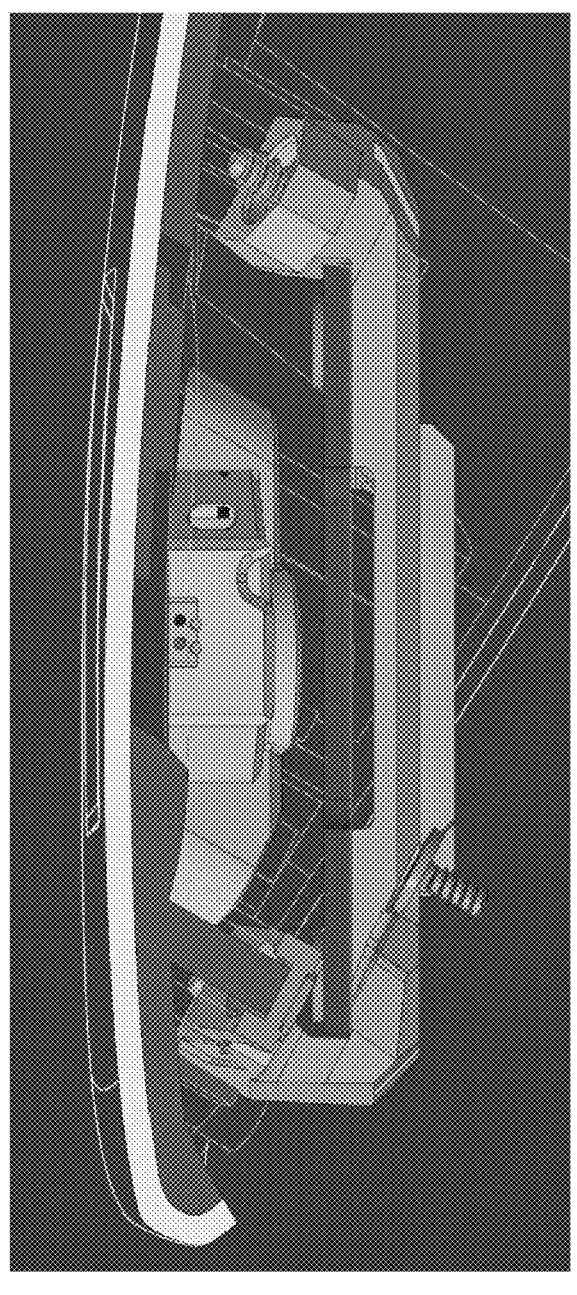
FIGS. 60 and 61 show examples of an introduction of a complaint actuator configured between the touch surface and the sensing element, according to certain embodiments.
Figure 61:
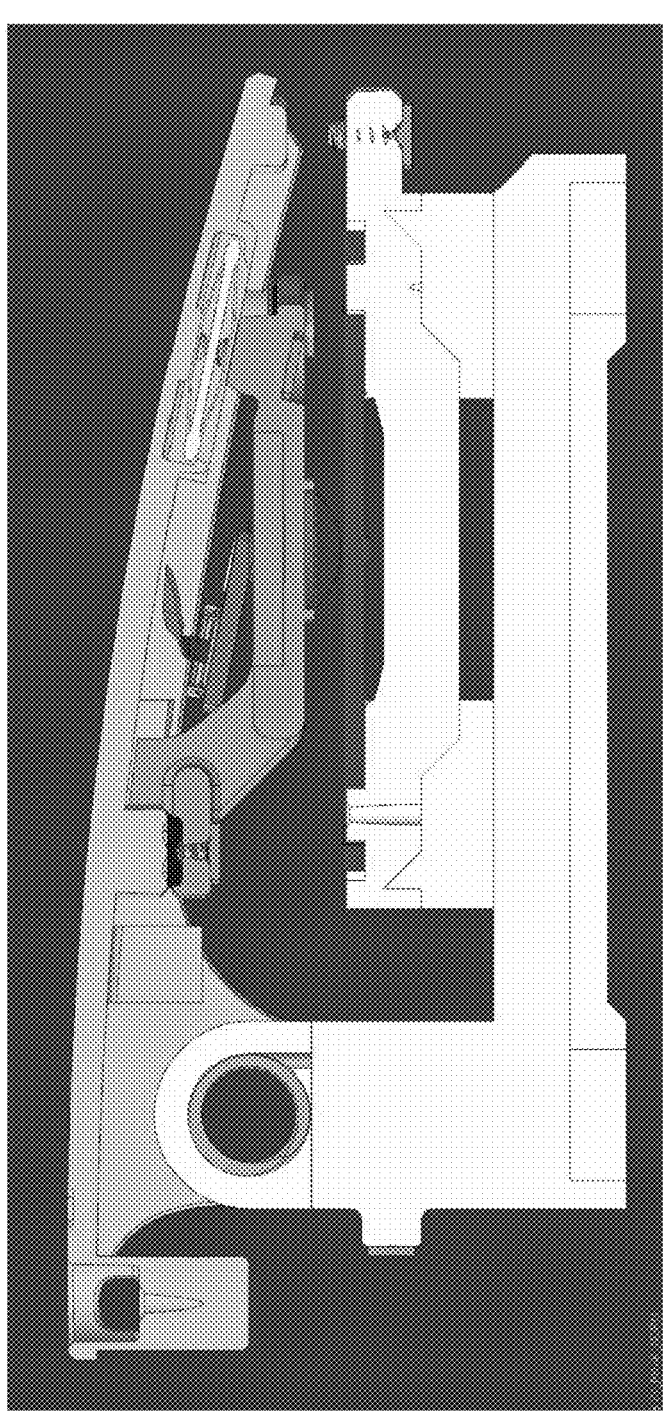
Figure 62:
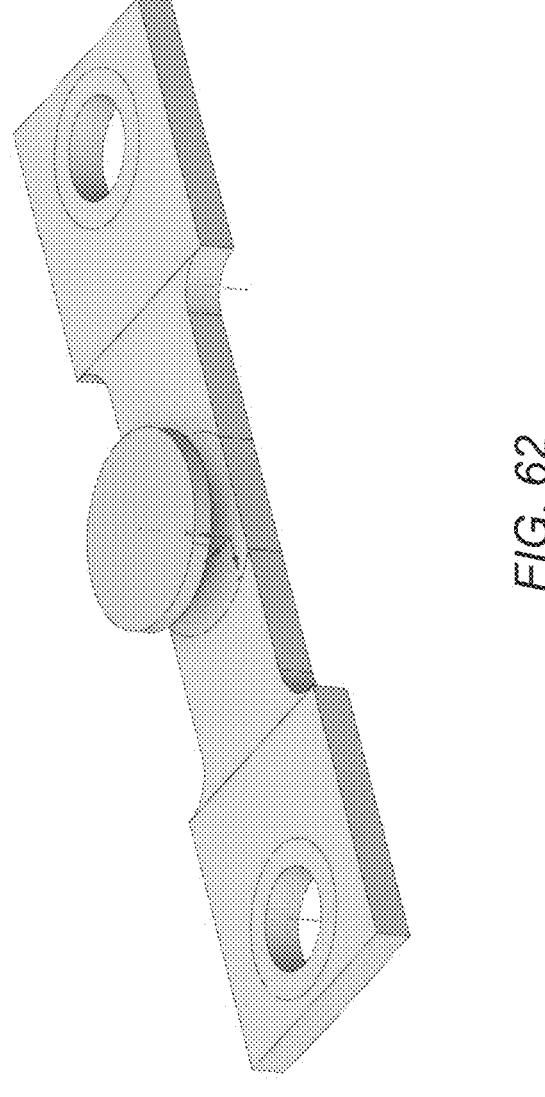
FIGS. 62-65 shows examples a compliant actuator precisely transferring loads to a sensor located in a sensing element.
Figure 63:
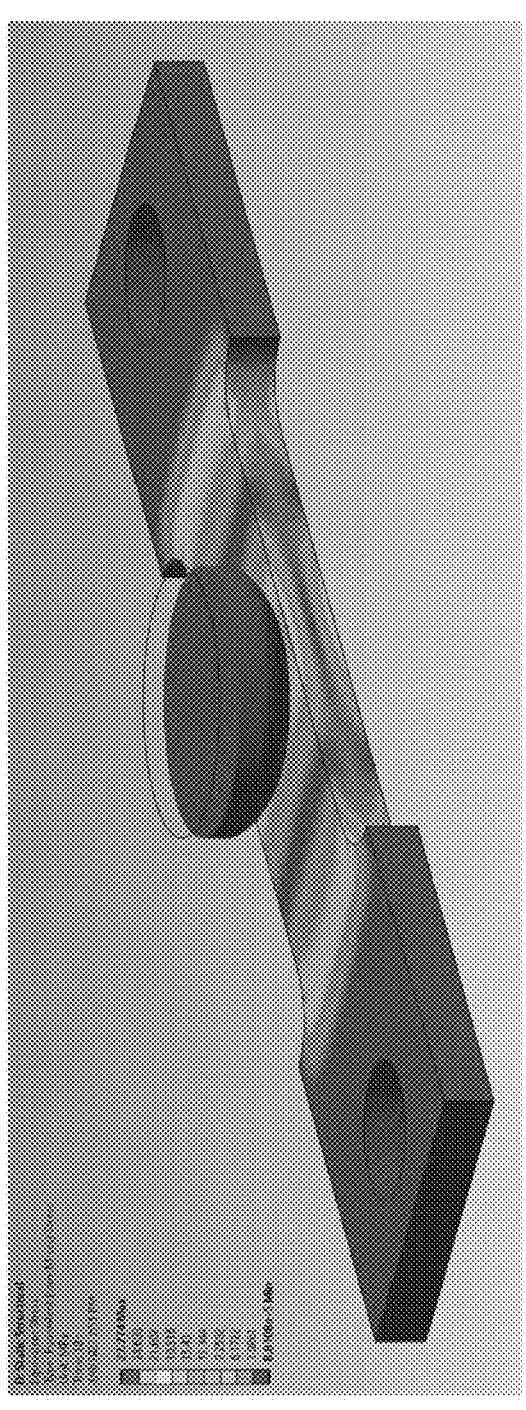
Figure 64:
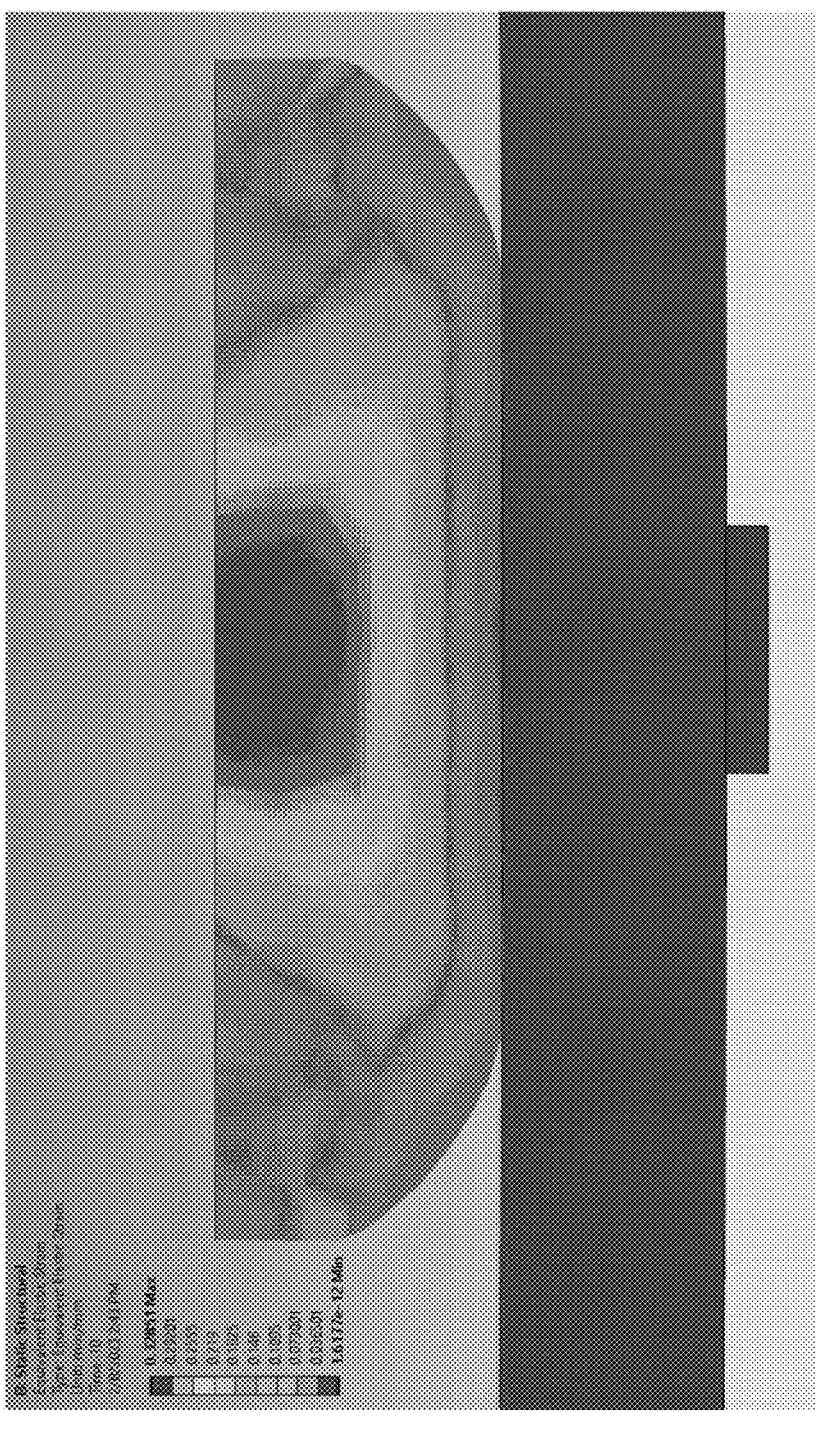
Figure 65:
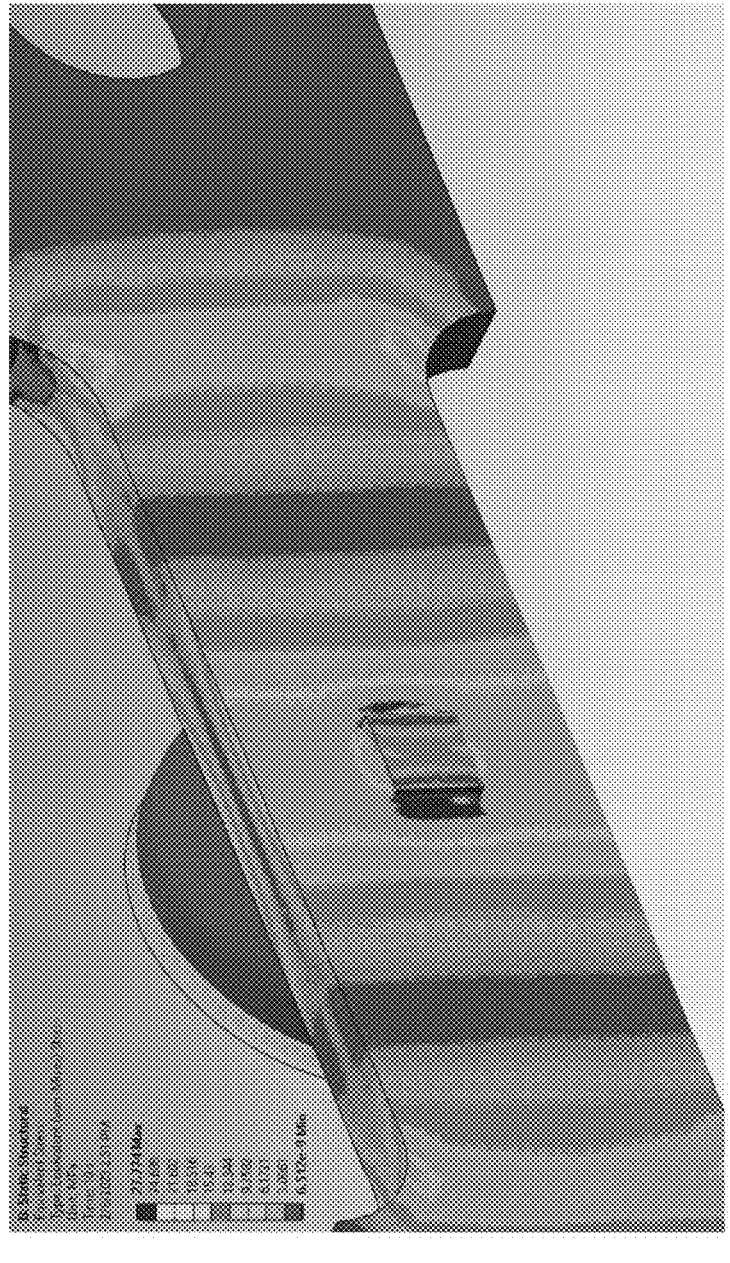

FIGS. 60 and 61 show examples of an introduction of a complaint actuator (red) configured between the touch surface (white/yellow) and the sensing element (green), according to certain embodiments.

A compliant element, as described above, facilitates transferring the load from the much larger touch area and better concentrates the input over the sensing element component. The design parameters and materials for the compliant actuator can be selected to tune the compliant actuator to introduce an intended mechanical response and progressively load a specific sensing element to, for instance, linearize the transferred load to the contact area. The design of this element also allows the adoption of a more generic design for an input architecture to any sensing element type or technology. The same input design can, thus, adopt different sensing options or technologies by simply changing the compliant element to match the new sensing element, while retaining the same structure design.

Figure 66:
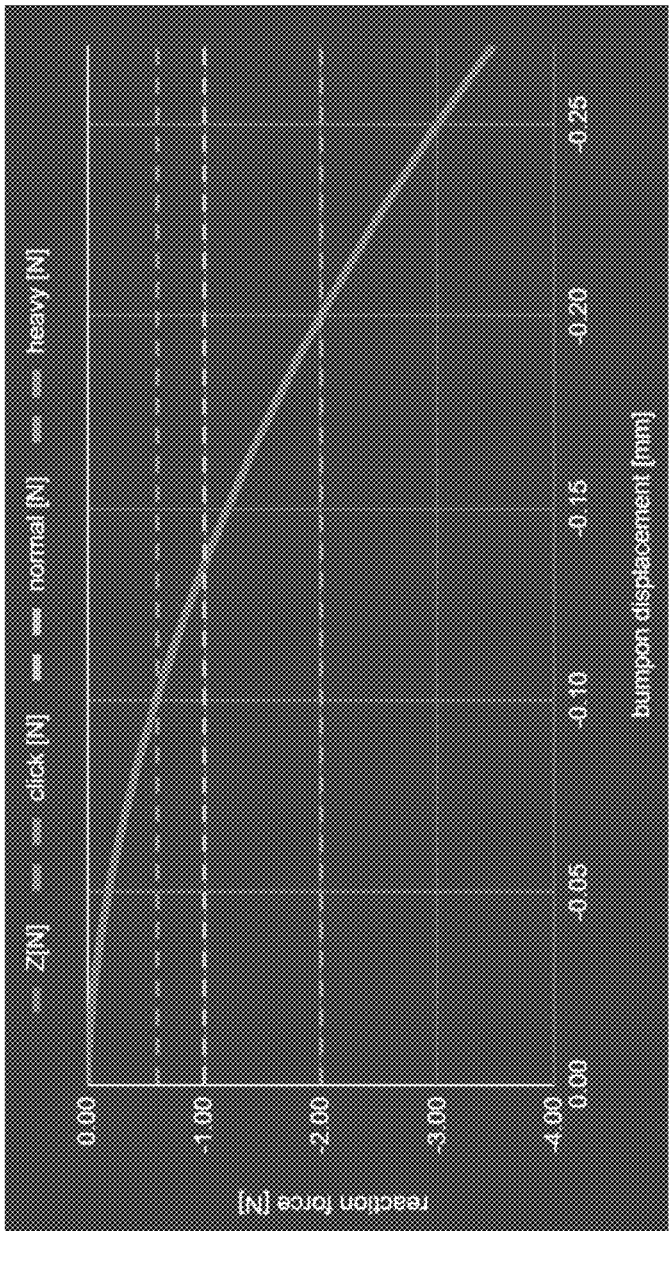
FIG. 66 is a plot showing an introduced compliance by load applied at different levels of inputs, according to certain embodiments.
Figure 67:
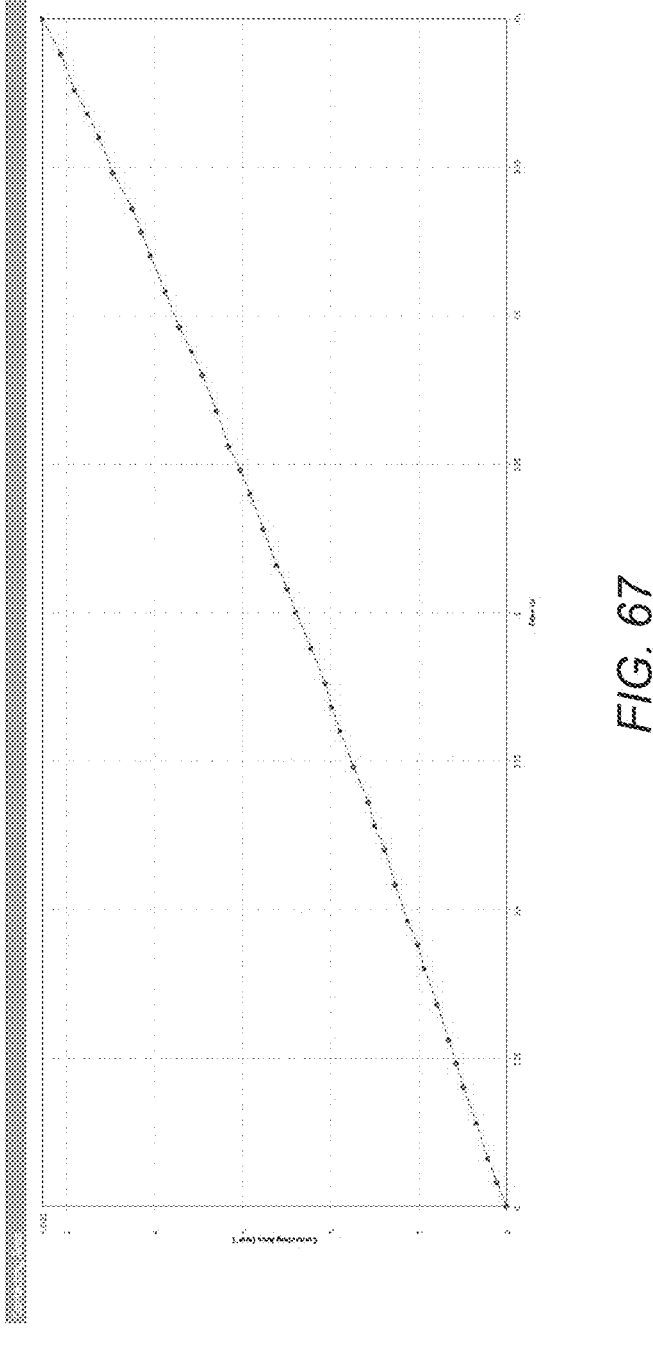
FIG. 67 is a plot showing a resultant linearized curve for applied load vs. contact area on the sensing element, according to certain embodiments.

FIGS. 62-65 shows examples a compliant actuator (red) precisely transferring loads to a sensor located in a sensing element (light green). FIG. 66 is a plot showing an introduced compliance by load applied at different levels of inputs (from click threshold to normal user input to heavy user input), according to certain embodiments. FIG. 67 is a plot showing a resultant linearized curve for applied load vs. contact area on the sensing element, according to certain embodiments.

In some embodiments, the force sensitive input element is positioned underneath the average press region on the input element (e.g., keyplate). In some embodiments, multiple force sensitive input elements are positioned around the average press region on the input element. The force sensitive input elements may be located equal distance from the central point of the average press region.

In certain embodiments, a haptic system for a computer mouse can include the addition of secondary or alternative main sensing elements, complementing any sensing from capable haptic elements. These sensing elements can stand alone as the main source of detecting user inputs, or complement sensing capabilities of existing haptic elements (e.g., load rate from piezo-electric devices). Such sensing elements are capable of detecting force, strain, displacement, rotational, or any other inputs or consequence of user input in the mouse structures as well as rates or variations of the prior.

In some embodiments, the adoption of multiple sensing elements or a sensing element capable of detecting multiple cues from users inputs, e.g., combining measuring load rate as well as absolute force, allows covering the totality of user inputs commonly available in a computer mouse, as well as covering scenarios of usability. Such is deemed essential on a novel technology that retains the same or extends beyond the current level of sensing reliability for computer mice. An example includes successfully detecting interactions such as drag and drop, or holding a key while selecting multiple items, where a user clicks, holds the click for an undefined amount of time, and releases upon completing the task. In such a scenario, simply measuring the load rate while failing to detect the hold stage, where a quasi-stationary input (accounting natural variations of user input force) will not afford any reliable or measurable change input. In such cases, combining or adding a second measurement, for instant user absolute force, via detecting the resultant strain in the mouse structures below the finger will afford a reliable metric by detecting at which level of force the quasi-stationary holding stage is occurring. Similarly, such sensing capabilities allow reliably detecting user inputs while moving the mouse, including through rough surfaces or lifting, while still avoiding undesirable clicks due to shocks or vibrations.

Such sensing elements can be embedded in the mouse structure in a multitude of layouts, optimizing the detection of intentional user inputs. In some embodiments, the sensing elements can be embedded in the touch area itself, directly integrated in the mouse shell or within layers (e.g., between a rigid and a soft layer) or directly underneath, mounted in a subchassis coupled to the mouse top case. In other arrangements, the sensing elements can be integrated in a separate structure coupled to other mouse structures, requiring a mechanical coupler between the touch area and the element itself to transfer user inputs. In other embodiments, sensing elements can be integrated in the bottom of the mouse, such as the mouse main PCB or even at other compliant structures (e.g., mouse feet). In any of the embodiments presented herein, the mouse can retain its solid state design, where no keyplate movement is apparent unlike a more traditional mechanical keyplate. Similarly, seamless designs can be achieved when an effective load transfer is allowed between structures and the sensing element.

Figure 68:
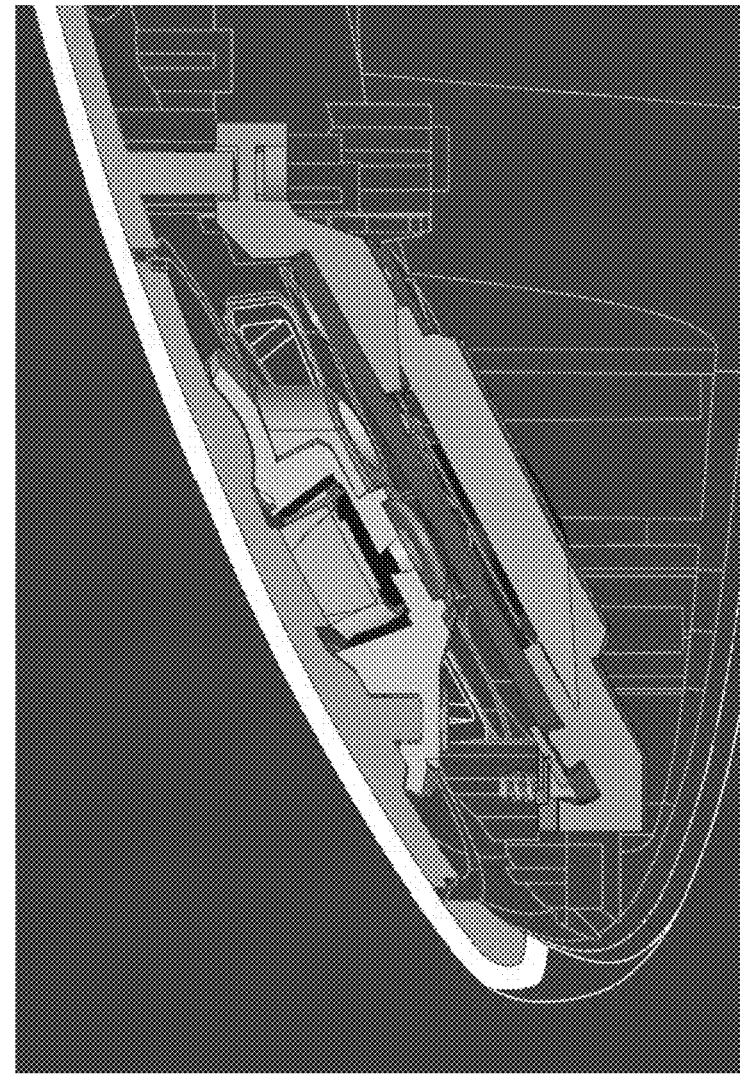
FIG. 68 shows an example of a sensing element, coupled to a sub-chassis mounted to the computer mouse topcase, where loads are transferred through a secondary chassis that simultaneously contains the haptic element, according to certain embodiments.

FIG. 68 shows an example of a sensing element (green), coupled to a subchassis mounted to the computer mouse topcase, where loads are transferred through a secondary chassis (yellow) that simultaneously contains the haptic element (gray), according to certain embodiments.

Figure 69:
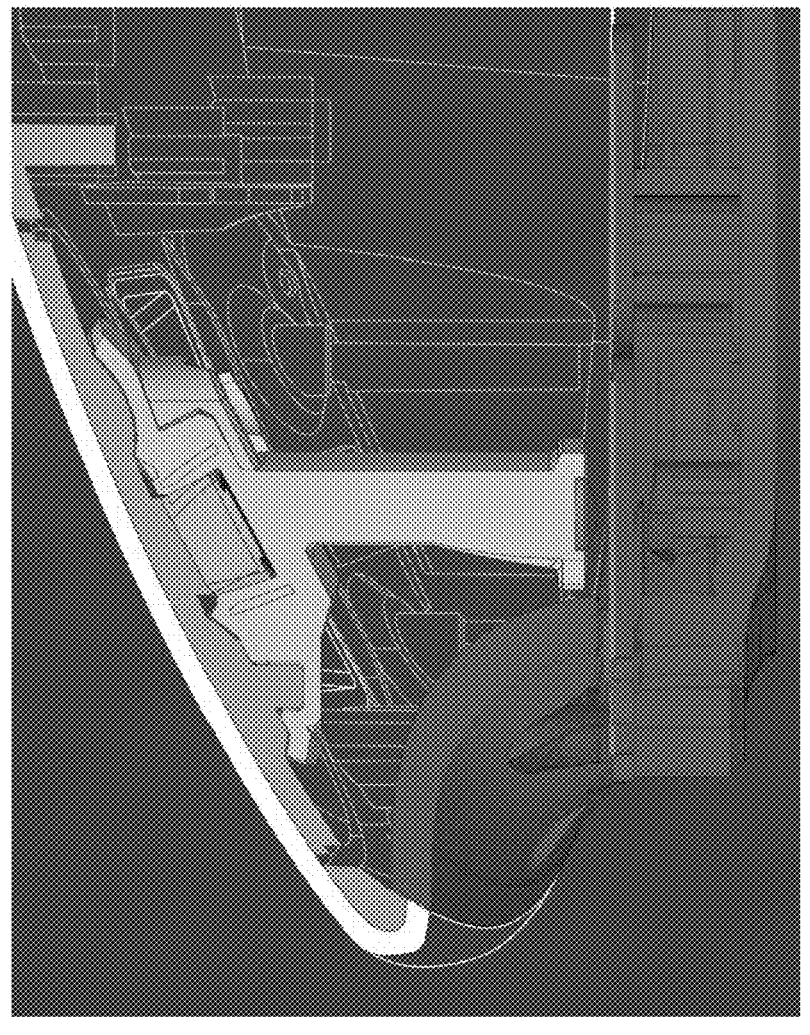
FIG. 69 shows an example of a sensing element integrated with a dedicated structure coupled to the bottom of the mouse, where loads are transferred through a secondary and extended chassis that simultaneously contains the haptic element, according to certain embodiments.

FIG. 69 shows an example of a sensing element (green) integrated with a dedicated structure coupled to the bottom of the mouse, where loads are transferred through a secondary and extended chassis (yellow) that simultaneously contains the haptic element (gray), according to certain embodiments.

Figure 70:
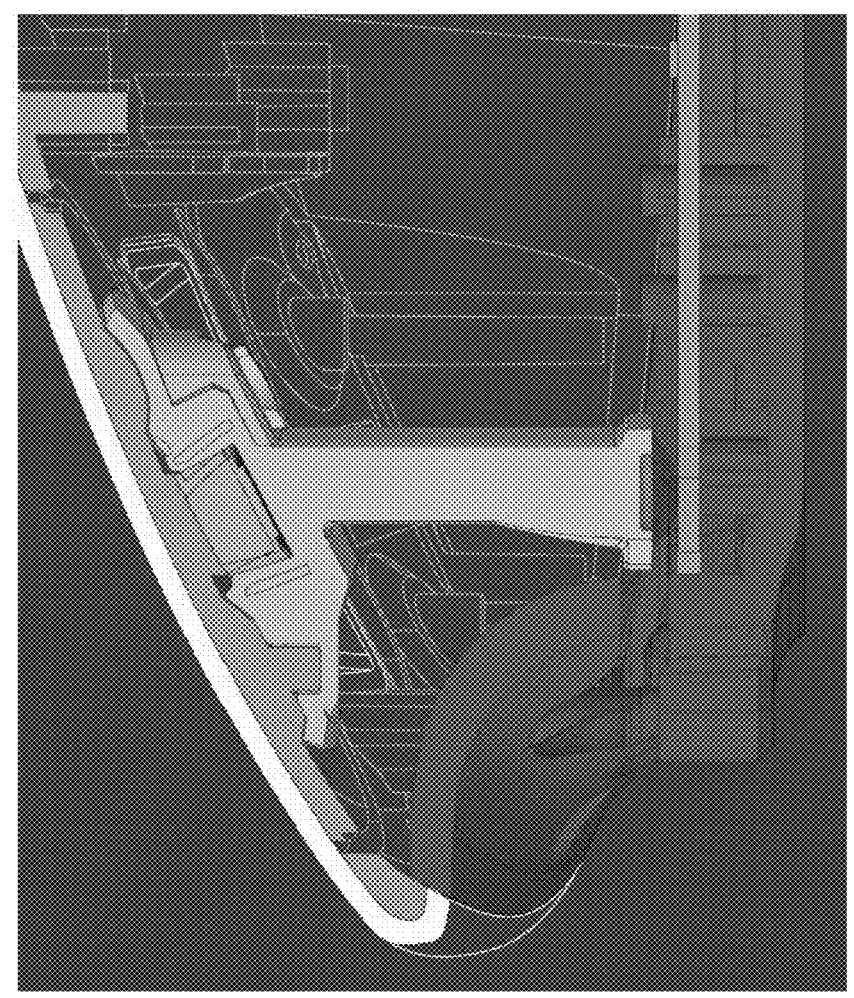
FIG. 70 shows an example of a sensing element integrated with the computer mouse main PCB and coupled to the bottom of the mouse, where loads are transferred through a secondary and extended chassis that simultaneously contains the haptic element, according to certain embodiments.

FIG. 70 shows an example of a sensing element (green) integrated with the computer mouse main PCB and coupled to the bottom of the mouse, where loads are transferred through a secondary and extended chassis (yellow) that simultaneously contains the haptic element (gray), according to certain embodiments. In any of these examples above, structures adopted to transfer user input loads to the sensing element can benefit from structural optimization, including the adoption of compliant and elastomer materials, to linearize the load transfer (e.g., load vs. compression or contact area with the sensing element) and introduce damping into the system.

In some embodiments, the haptic element(s) can be coupled to or integrated with the main touch structure (e.g., keyplate), or in a subchassis properly coupled to the touch structure. Further optimization of the haptic, towards good UX, may see the coupling being done to the entirety of the touch surface or to more localized touch areas. In some embodiments, a typical haptic click architecture may integrate any of: a touchable surface, keyplate with or without a soft layer; a preload system, with the use of springs, compliant materials or design intended stiffness of structures; a haptic element coupled to any of the structures; a main or secondary sensing element; a subchassis to transfer user inputs to the sensing element and/or contain the haptic element; any required mechanical subsystem or features for proper assembly and functionality, e.g., guiders, pivots, hinges, fasteners and screw bosses, clips, and stoppers; or other features as would be appreciated by one of ordinary skill in the art with the benefit of this disclosure.

Figure 71:
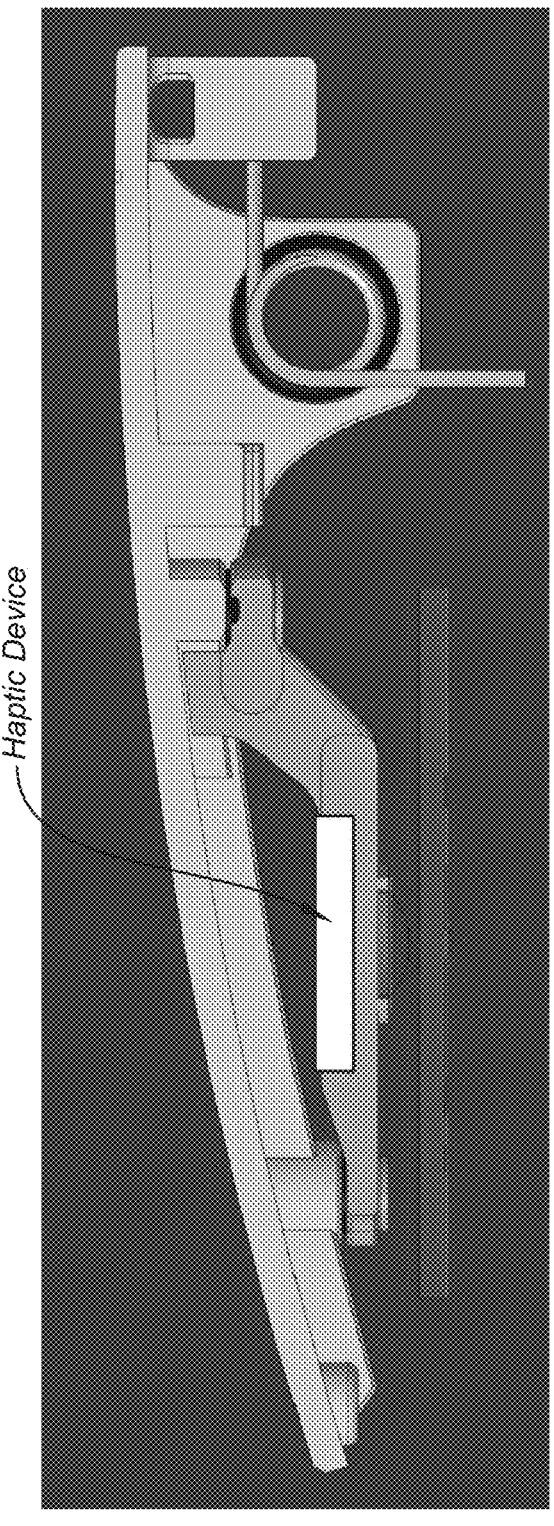
FIG. 71 shows an example of a haptic click system where the touchable area including the keyplate, has a subchassis, which also integrates the haptic element coupled to it, according to certain embodiments.

FIG. 71 shows an example of a haptic click system where the touchable area including the keyplate (yellow), has a subchassis (blue) which also integrates the haptic element (white) coupled to it, according to certain embodiments. This system may be configured to transfer the loads to a sensing element (dark green) while being preloaded against it by a mechanical spring element (gray). In this arrangement, the haptic element propogates the feedback to the user by vibrating the coupled chassis and keyplate and exciting the touch area normally to its surface.

Figure 72:
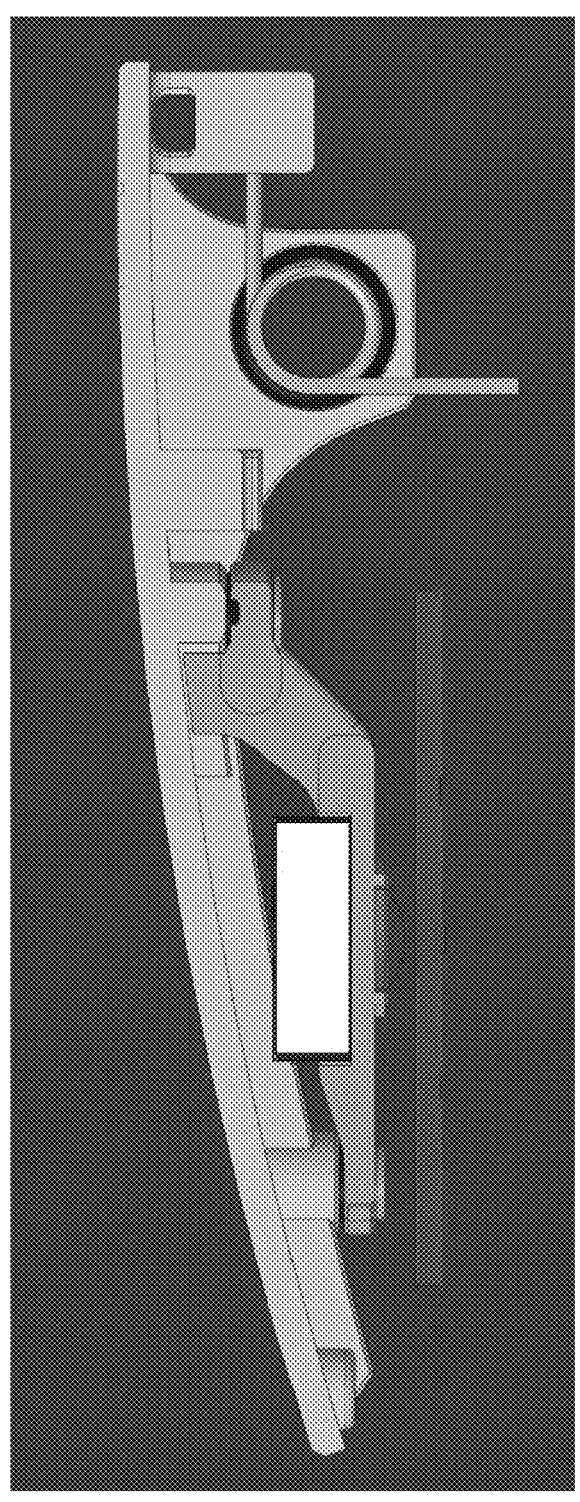
FIG. 72 example of a haptic click system where the touchable area, the keyplate, has a sub-chassis. which also integrates the haptic element coupled to it, according to certain embodiments.

FIG. 72 example of a haptic click system where the touchable area, the keyplate (yellow), has a subchassis (blue) which also integrates the haptic element (white) coupled to it, according to certain embodiments. This system transfers the loads to a sensing element (dark green) while being preloaded against it by a mechanical spring element (gray). In this arrangement, the haptic element is affording the feedback to the user by vibrating the coupled chassis and keyplate laterally and exciting the touch area tangentially to its surface.

Figure 73:
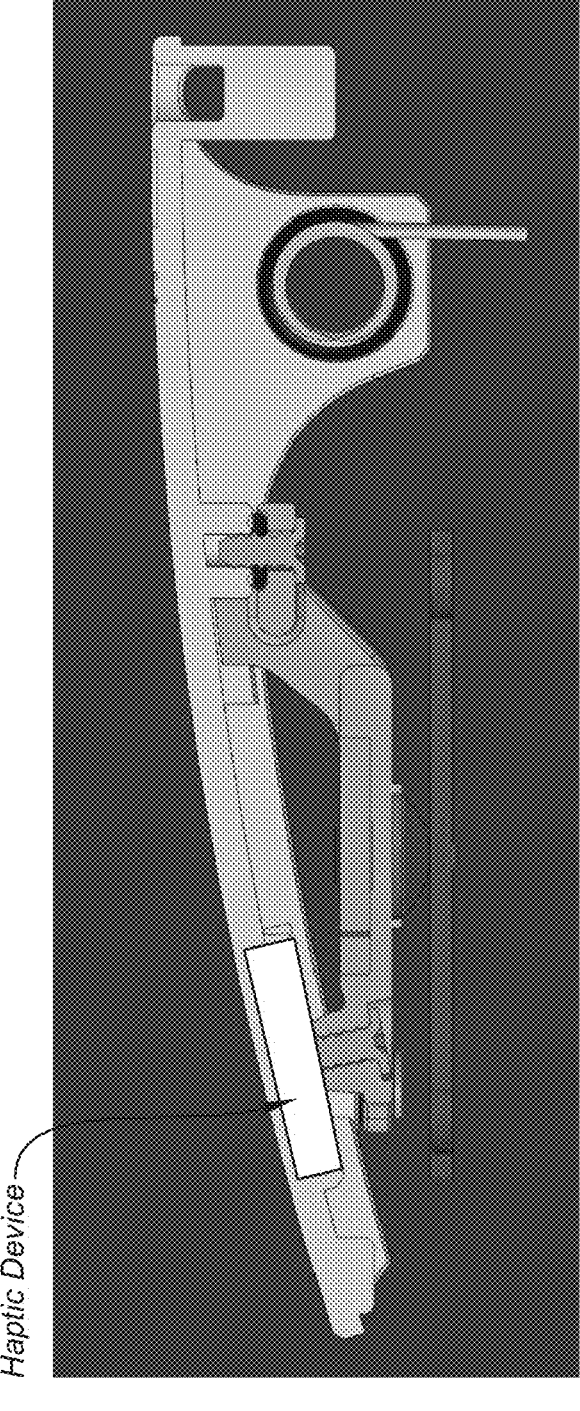
FIG. 73 shows an example of a haptic click system where the touchable area, the keyplate, has a sub-chassis transferring the loads to a sensing element while being preloaded against it by a mechanical spring element, according to certain embodiments.

FIG. 73 shows an example of a haptic click system where the touchable area, the keyplate (yellow), has a subchassis (blue) transferring the loads to a sensing element (dark green) while being preloaded against it by a mechanical spring element (gray), according to certain embodiments. In this arrangement, the haptic element (white) is directly coupled to the keyplate, affording the feedback to the user by directly exciting the touch area normally to its surface.

Figure 74:
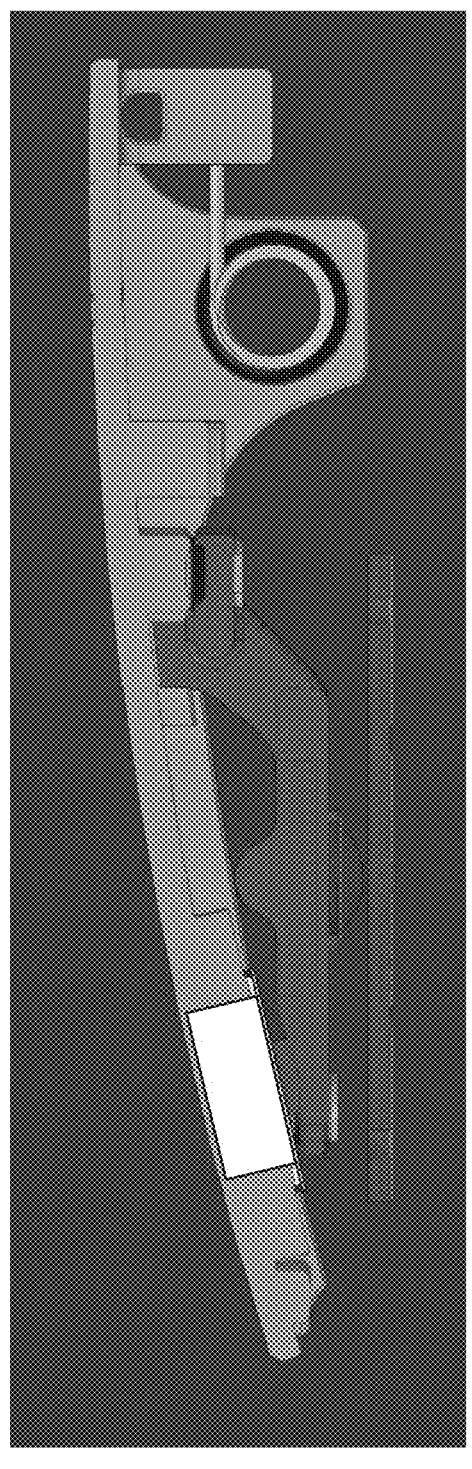
FIG. 74 shows an example of a haptic click system where the touchable area, the keyplate, has a sub-chassis transferring the loads to a sensing element while being preloaded against it by a mechanical spring element, according to certain embodiments.

FIG. 74 shows an example of a haptic click system where the touchable area, the keyplate (light green), has a subchassis (blue) transferring the loads to a sensing element (dark green) while being preloaded against it by a mechanical spring element (gray), according to certain embodiments. In this arrangement, the haptic element (white) is directly coupled to the keyplate in a tilted position, affording the feedback to the user by directly exciting the touch area tangentially to its surface.

Figure 75:
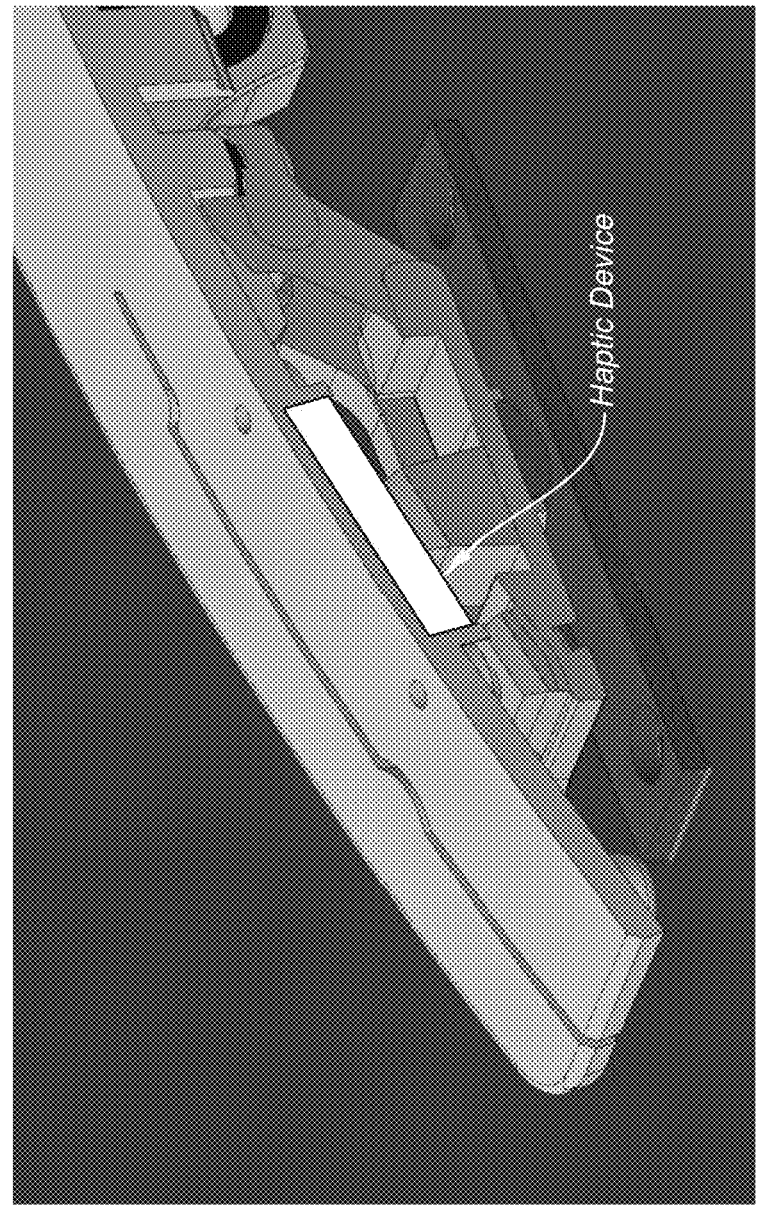
FIG. 75 shows an example of a haptic click system where the keyplate has a separate touch area by a partial hinged region, while the sub-chassis is coupled to its lateral and non-vibrating structures, according to certain embodiments.

FIG. 75 shows an example of a haptic click system where the keyplate (light green) has a separate touch area by a partial hinged region, while the subchassis (blue) is coupled to its lateral and non-vibrating structures (decoupled from the touch area), according to certain embodiments. Loads are transferred from the subchassis to a sensing element (green) while being preloaded against it by a mechanical spring element (gray). In this arrangement, the haptic element is directly coupled to the keyplate hinged region, affording the feedback to the user by directly exciting the touch area normally to its surface.

Figure 76:
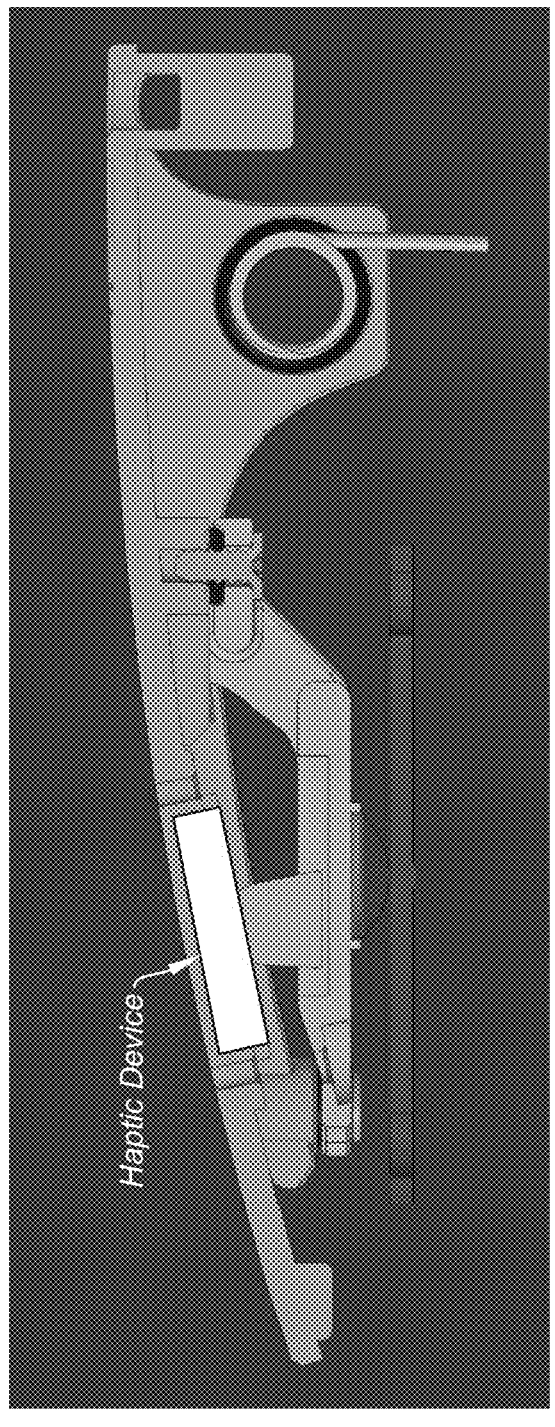
FIG. 76 shows an example of a haptic click system where the keyplate has a separate full touch area by a hinged or pivoted region, while the sub-chassis is coupled to its lateral and non-vibrating structures, according to certain embodiments.

FIG. 76 shows an example of a haptic click system where the keyplate (light green) has a separate full touch area by a hinged or pivoted region, while the subchassis (blue) is coupled to its lateral and non-vibrating structures (decoupled from the touch area), according to certain embodiments. Loads are transferred from the subchassis to a sensing element (green) while being preloaded against it by a mechanical spring element (gray). In this arrangement, the haptic element (white) is directly coupled to the keyplate hinged region, affording the feedback to the user by directly exciting the touch area normally to its surface.

Figure 77:
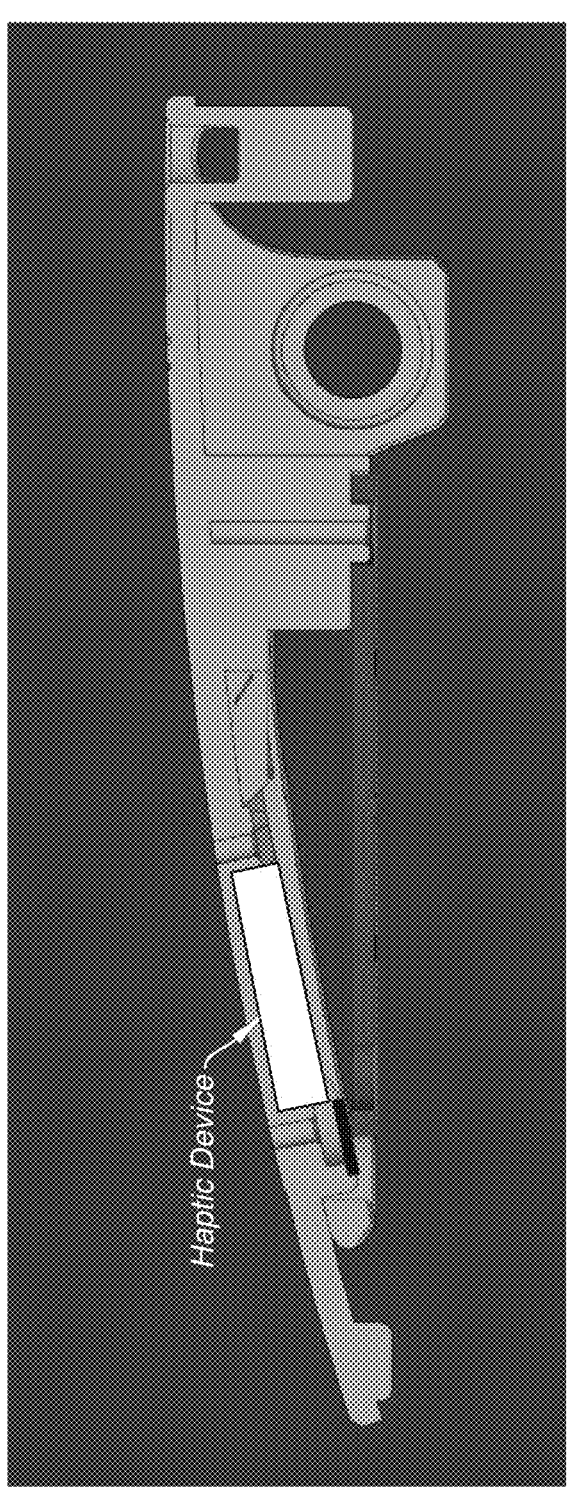
FIG. 77 shows an example of a haptic click system where the keyplate has a separate full touch area by a hinged or pivoted region and a stationary integrated chassis, according to certain embodiments.

FIG. 77 shows an example of a haptic click system where the keyplate (light green) has a separate full touch area by a hinged or pivoted region and a stationary integrated chassis, according to certain embodiments. The sensing element (dark green) is integrated in the keyplate, coupled to its stationary region and with one or more contact points at the touch (compliant or movable) region. Loads are transferred directly to the sensing element via these touch points, resulting in bending, compression or torsion of the sensing element, as would be appreciated by one of ordinary skill in the art with the benefit of this disclosure. Alternatively, the sensing element can detect user loads by measuring proximity of the keyplate via optical, inductive, capacitive and any other non-contacting technologies, as would be appreciated by one of ordinary skill in the art with the benefit of this disclosure. In this arrangement, the haptic element (white) is directly coupled to the keyplate hinged region, affording the feedback to the user by directly exciting the touch area normally to its surface.

A haptic module can typically include a carrier platform, one or more haptic elements, and supporting infrastructure. A haptic module may be coupled to an input device in a variety of different implementations, including (1) a single unified carrier platform that supports both keyplates (e.g., left and right keyplates), (2) a split carrier platform to accommodate each keyplate or corresponding individual haptic elements, (3) a foil-less design where the haptic elements are coupled directly to the carrier platform with discrete wiring arrangements (e.g., pins, wires, SMT, etc.), and (4) a combined carrier platform with a plastic holder and steel bracket for preloading force.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:
a housing;
a multi-tiered, depressible keyplate including:
  a first tier;
  a second tier; and
  a hinge coupling the first tier to the second tier,
    wherein the first and second tier are on different planes, and
    wherein the multi-tiered, depressible keyplate is a monolithic structure such that the first and second tiers move as a single unit relative to the housing when the multi-tiered depressible keyplate is depressed;
a haptic element;
a subchassis configured to support and directly couple the haptic element to a bottom surface of the first tier of the keyplate; and
a sensor,
  wherein when depressed by a threshold distance, the second tier of the multi-tiered depressible keyplate makes contact with the sensor, causing the sensor to detect that the multi-tiered depressible keyplate is depressed.

2. The computer mouse of claim 1 wherein haptic energy generated by the haptic element is coupled to the first tier of the multi-tiered, depressible keyplate, and a pressing force pushing the multi-tiered, depressible keyplate down is coupled to the sensor via the second tier of the multi-tiered depressible keyplate.

3. The computer mouse of claim 1 wherein the first and second tiers are vertically aligned such that the second tier is positioned below the first tier.

4. The computer mouse of claim 1 wherein the first tier of the multi-tiered, depressible keyplate is tuned to resonant at a frequency of operation of the haptic driving element.

5. The computer mouse of claim 4 wherein the haptic element is not directly coupled to the second tier of the keyplate, and
  wherein haptic energy generated by the haptic element is substantially localized in the first tier of the multi-tiered, depressible keyplate.

6. The computer mouse of claim 1 wherein the first tier is flexible and the second tier is stiff relative to the first tier.

7. The computer mouse of claim 1 wherein the subchassis is not directly coupled to the multi-tiered, depressible keyplate and not directly coupled to the housing of the computer mouse.

8. The computer mouse of claim 1 wherein the first tier includes a first end and the second tier includes a second end, and wherein the first tier is coupled to the second tier via the first end and the second end.

9. A computer mouse comprising:
a depressible keyplate having a bottom side;
a haptic element coupled to the bottom side of the depressible keyplate;
a flexible subchassis configured to support and provide a preloading force to push the haptic element against the bottom side of the depressible keyplate;
a sensing element; and
a load transfer element configured between and coupled to a bottom of the flexible subchassis and a top of the sensing element, the load transfer element operable to transfer a force load from the keyplate and flexible chassis to the sensing element,
  wherein the depressible keyplate is floating and decoupled from an outer housing of the computer mouse.

10. The computer mouse of claim 9 the outer housing includes an opening, the outer housing defining an outer shell of the computer mouse, wherein the depressible keyplate is configured within the opening of the outer housing; and
an inner chassis disposed within the outer housing and configured to couple to and provide structural support to the combination of the keyplate, haptic element, flexible subchassis, load transfer element, and sensor.

11. The computer mouse of claim 10 wherein a soft, compliant layer seamlessly covers the keyplate and outer housing.

12. The computer mouse of claim 9 wherein the haptic element is structurally integrated with the depressible keyplate.

13. The computer mouse of claim 9 wherein the flexible subchassis is tuned to include static portions and dynamic portions.

14. The computer mouse of claim 13 wherein the static portions have an increased stiffness and the dynamic portions are tuned to a resonant frequency of the haptic element.

15. The computer mouse of claim 9 further comprising a limiter element operable to physically limit a movable range of the keyplate in opposition to the preloading force that pushes the haptic element coupled to the flexible subchassis against the bottom side of the depressible keyplate.

16. The computer mouse of claim 9 wherein the depressible keyplate is a left or right mouse button on the computer mouse.

17. The computer mouse of claim 9 wherein the flexible subchassis is configured as a leaf spring.

18. The computer mouse of claim 9 wherein the load transfer element is comprised of a soft, compliant material that dampers vibration.

19. The computer mouse of claim 18 wherein the soft, compliant material is comprised of a foam, polyurethane, rubber, polymer, or TPE.

20. The computer mouse of claim 9 wherein the haptic element is a piezoelectric element.

\* \* \* \* \*